United States Patent
Zhou et al.

(10) Patent No.: US 12,469,162 B2
(45) Date of Patent: Nov. 11, 2025

(54) PRIMARY ANALYSIS IN NEXT GENERATION SEQUENCING

(71) Applicant: Element Biosciences, Inc., San Diego, CA (US)

(72) Inventors: Chunhong Zhou, San Diego, CA (US); Semyon Kruglyak, San Diego, CA (US); Francisco Garcia, Rancho Santa Fe, CA (US); Minghao Guo, San Diego, CA (US); Haosen Wang, San Diego, CA (US); Ryan Kelley, San Diego, CA (US)

(73) Assignee: Element Biosciences, Inc., San Diego, CA (US)

( * ) Notice: Subject to any disclaimer, the term of this patent is extended or adjusted under 35 U.S.C. 154(b) by 313 days.

(21) Appl. No.: 18/078,797

(22) Filed: Dec. 9, 2022

(65) Prior Publication Data

US 2023/0326064 A1   Oct. 12, 2023

Related U.S. Application Data

(63) Continuation-in-part of application No. 17/854,042, filed on Jun. 30, 2022, now Pat. No. 11,915,444, (Continued)

(51) Int. Cl.
*G06T 7/66*  (2017.01)
*G06F 18/232*  (2023.01)
(Continued)

(52) U.S. Cl.
CPC ............. *G06T 7/66* (2017.01); *G06F 18/232* (2023.01); *G06T 7/30* (2017.01); *G06V 10/751* (2022.01);
(Continued)

(58) Field of Classification Search
CPC .......... G06T 7/66; G06T 7/30; G06F 18/232; G06V 10/751; G06V 10/763; G06V 20/69;
(Continued)

(56) References Cited

U.S. PATENT DOCUMENTS 5,159,403 A   10/1992  Kosaka
5,558,991 A    9/1996  Trainor
(Continued)

FOREIGN PATENT DOCUMENTS

CN   108203847 B   1/2022
EP     2423325 B1   4/2019
(Continued)

OTHER PUBLICATIONS

Anonymous: "MiSEQ: Imaging and Base Calling," Available at https://support.illumina.com/training.html; video slides presented by Jeremy Peirce 2013, With Attached Transcript. 30 Pages.
(Continued)

*Primary Examiner* — Samir A Ahmed
(74) *Attorney, Agent, or Firm* — Sterne, Kessler, Goldstein & Fox P.L.L.C.

(57) ABSTRACT

Image data analysis, particularly identifying cluster locations for performing base-calling in a digital flow cell image during DNA sequencing, is described. Each nucleic acid template molecule immobilized on a support may include an insert sequence and a sample index sequence. The sample index sequence may include a k-mer sequence. A sequencing system may conduct k cycles of sequencing reactions of the k-mer sequence before conducting one or more cycles of the insert sequence sequencing reactions and generate a first plurality of flow cell images. Pixel intensities may be determined for pixels of the first plurality of flow cell images. A base calling template may be determined and include base calling locations based on the pixel intensities
(Continued)

and respective color purities of the pixel intensities. The base calling template may register a second plurality of flow cell images of the support in one or more cycles subsequent to the k cycles.

20 Claims, 18 Drawing Sheets

Specification includes a Sequence Listing.

Related U.S. Application Data which is a continuation of application No. 17/547,602, filed on Dec. 10, 2021, now Pat. No. 11,397,870, which is a continuation of application No. 17/219,556, filed on Mar. 31, 2021, now Pat. No. 11,200,446, application No. 18/078,797 is a continuation-in-part of application No. 17/725,065, filed on Apr. 20, 2022, and a continuation-in-part of application No. 17/725,042, filed on Apr. 20, 2022.

(60) Provisional application No. 63/072,649, filed on Aug. 31, 2020, provisional application No. 63/316,784, filed on Mar. 4, 2022, provisional application No. 63/316,790, filed on Mar. 4, 2022, provisional application No. 63/349,421, filed on Jun. 6, 2022.

(51) Int. Cl.
*G06T 7/30* (2017.01)
*G06V 10/75* (2022.01)
*G06V 10/762* (2022.01)
*G06V 20/69* (2022.01)

(52) U.S. Cl.
CPC ............ *G06V 10/763* (2022.01); *G06V 20/69* (2022.01); *G06V 20/693* (2022.01); *G06V 20/695* (2022.01); *G06V 2201/04* (2022.01)

(58) Field of Classification Search
CPC . G06V 20/693; G06V 20/695; G06V 2201/04
See application file for complete search history.

(56) References Cited

U.S. PATENT DOCUMENTS

| | | | |
|---|---|---|---|
| 5,576,448 A | 11/1996 | Van Daele et al. | |
| 5,750,341 A | 5/1998 | Macevicz | |
| 5,786,894 A | 7/1998 | Shields et al. | |
| 5,854,033 A | 12/1998 | Lizardi | |
| 5,871,921 A | 2/1999 | Landegren et al. | |
| 6,284,497 B1 | 9/2001 | Sabanayagam et al. | |
| 6,576,448 B2 | 6/2003 | Weissman et al. | |
| 6,608,682 B2 | 8/2003 | Ortyn et al. | |
| 6,975,400 B2 | 12/2005 | Ortyn et al. | |
| 6,977,153 B2 | 12/2005 | Kumar et al. | |
| 7,019,834 B2 | 3/2006 | Sebok et al. | |
| 7,170,050 B2 | 1/2007 | Turner et al. | |
| 7,211,390 B2 | 5/2007 | Rothberg et al. | |
| 7,244,559 B2 | 7/2007 | Rothberg et al. | |
| 7,264,929 B2 | 9/2007 | Rothberg et al. | |
| 7,279,338 B2 | 10/2007 | Kim et al. | |
| 7,302,146 B2 | 11/2007 | Turner et al. | |
| 7,315,357 B2 | 1/2008 | Ortyn et al. | |
| 7,405,281 B2 | 7/2008 | Xu et al. | |
| 7,450,229 B2 | 11/2008 | Ortyn et al. | |
| 7,522,757 B2 | 4/2009 | Tsipouras et al. | |
| 7,566,537 B2 | 7/2009 | Balasubramanian et al. | |
| 7,584,857 B2 | 9/2009 | Böhm et al. | |
| 7,640,112 B2 | 12/2009 | Tsipouras et al. | |
| 7,671,987 B2 | 3/2010 | Padmanabhan et al. | |
| 7,674,309 B2 | 3/2010 | Gargano et al. | |
| 7,709,197 B2 | 5/2010 | Drmanac | |
| 7,723,116 B2 | 5/2010 | Evans et al. | |
| 7,741,463 B2 | 6/2010 | Gormley et al. | |
| 7,745,221 B2 | 6/2010 | Butler et al. | |
| 7,890,157 B2 | 2/2011 | Jo et al. | |
| 8,045,788 B2 | 10/2011 | Watkins et al. | |
| 8,053,192 B2 | 11/2011 | Bignell et al. | |
| 8,182,989 B2 | 5/2012 | Bignell et al. | |
| 8,184,298 B2 | 5/2012 | Popescu et al. | |
| 8,189,900 B2 | 5/2012 | Sammak et al. | |
| 8,426,209 B2 | 4/2013 | Butler et al. | |
| 8,465,922 B2 | 6/2013 | Eid et al. | |
| 8,526,704 B2 | 9/2013 | Dobbe | |
| 8,563,478 B2 | 10/2013 | Gormley et al. | |
| 8,617,538 B2 | 12/2013 | Zoldhelyi et al. | |
| 8,760,756 B2 | 6/2014 | Price et al. | |
| 8,822,150 B2 | 9/2014 | Bignell et al. | |
| 8,885,912 B2 | 11/2014 | Sui | |
| 8,932,994 B2 | 1/2015 | Gormley et al. | |
| 9,068,916 B2 | 6/2015 | Heng | |
| 9,328,378 B2 | 5/2016 | Earnshaw et al. | |
| 9,383,320 B2 | 7/2016 | Naito et al. | |
| 9,493,818 B2 | 11/2016 | Kazakov et al. | |
| 9,512,478 B2 | 12/2016 | Bignell et al. | |
| 9,591,268 B2 | 3/2017 | Stoops et al. | |
| 9,650,673 B2 | 5/2017 | Drmanac et al. | |
| 9,879,312 B2 | 1/2018 | Steemers et al. | |
| 9,889,422 B2 | 2/2018 | Smith et al. | |
| 9,902,994 B2 | 2/2018 | Gormley et al. | |
| 9,944,984 B2 | 4/2018 | Drmanac et al. | |
| 10,072,260 B2 | 9/2018 | Happe et al. | |
| 10,152,776 B2 | 12/2018 | Langlois et al. | |
| 10,155,980 B2 | 12/2018 | Weng et al. | |
| 10,184,122 B2 | 1/2019 | Grunenwald et al. | |
| 10,246,744 B2 | 4/2019 | Vijayan et al. | |
| 10,287,574 B2 | 5/2019 | Goryshin et al. | |
| 10,304,189 B2 | 5/2019 | Garcia et al. | |
| 10,351,909 B2 | 7/2019 | Drmanac et al. | |
| 10,407,722 B2 | 9/2019 | Barany et al. | |
| 10,525,437 B2 | 1/2020 | Smith et al. | |
| 10,689,696 B2 | 6/2020 | Belitz et al. | |
| 10,724,069 B2 | 7/2020 | Chen et al. | |
| 10,731,141 B2 | 8/2020 | Iyidogan | |
| 10,768,173 B1 | 9/2020 | Arslan et al. | |
| 10,953,379 B2 | 3/2021 | Smith et al. | |
| 11,028,435 B2 | 6/2021 | Kelley et al. | |
| 11,028,436 B2 | 6/2021 | Singer et al. | |
| 11,028,438 B2 | 6/2021 | Rearick et al. | |
| 11,111,487 B2 | 9/2021 | Jovanovich et al. | |
| 11,168,360 B2 | 11/2021 | George et al. | |
| 11,200,446 B1 | 12/2021 | Zhou et al. | |
| 11,220,707 B1 | 1/2022 | Arslan et al. | |
| 11,255,847 B2 | 2/2022 | Schnall-Levin | |
| 11,397,870 B2 | 7/2022 | Zhou et al. | |
| 11,492,662 B2 | 11/2022 | Glezer et al. | |
| 11,915,444 B2 | 2/2024 | Zhou et al. | |
| 12,286,670 B2 | 4/2025 | Legnini et al. | |
| 2002/0076716 A1 | 6/2002 | Sabanayagam et al. | |
| 2003/0224419 A1 | 12/2003 | Corcoran et al. | |
| 2009/0018024 A1 | 1/2009 | Church et al. | |
| 2010/0035252 A1 | 2/2010 | Rothberg et al. | |
| 2010/0035454 A1 | 2/2010 | Morgan et al. | |
| 2010/0121582 A1 | 5/2010 | Pan et al. | |
| 2014/0170679 A1 | 6/2014 | Aitchison et al. | |
| 2015/0057947 A1* | 2/2015 | Drmanac ............... | G16B 30/00 702/20 |
| 2016/0102348 A1 | 4/2016 | Donnet | |
| 2017/0022553 A1 | 1/2017 | Vijayan et al. | |
| 2017/0175184 A1 | 6/2017 | Drmanac et al. | |
| 2018/0044668 A1 | 2/2018 | Jiang et al. | |
| 2018/0274023 A1 | 9/2018 | Belitz et al. | |
| 2019/0119742 A1 | 4/2019 | Zhang et al. | |
| 2019/0130999 A1 | 5/2019 | Oppenheim et al. | |
| 2019/0194737 A1 | 6/2019 | Ach et al. | |
| 2020/0080141 A1 | 3/2020 | Weng et al. | |
| 2020/0149095 A1 | 5/2020 | Arslan et al. | |
| 2020/0194098 A1 | 6/2020 | Hannigan et al. | |
| 2020/0211673 A1 | 7/2020 | Biggins et al. | |
| 2020/0216891 A1 | 7/2020 | Francais et al. | |
| 2020/0291454 A1 | 9/2020 | Belhocine et al. | |

(56) References Cited

U.S. PATENT DOCUMENTS

| | | |
|---|---|---|
| 2020/0308576 A1 | 10/2020 | Badenhorst et al. |
| 2020/0327377 A1 | 10/2020 | Jaganathan et al. |
| 2020/0392574 A1 | 12/2020 | Drmanac et al. |
| 2021/0150715 A1 | 5/2021 | Garcia et al. |
| 2024/0011022 A1 | 1/2024 | Zhao et al. |
| 2024/0052398 A1 | 2/2024 | Previte et al. |
| 2024/0084380 A1 | 3/2024 | Arslan et al. |
| 2024/0191225 A1 | 6/2024 | Zhao et al. |
| 2025/0109429 A1 | 4/2025 | Worku et al. |

FOREIGN PATENT DOCUMENTS

| | | |
|---|---|---|
| EP | 1954818 B2 | 1/2021 |
| WO | WO-2005111236 A1 | 11/2005 |
| WO | WO-2006084132 A2 | 8/2006 |
| WO | WO-2012003374 A2 | 1/2012 |
| WO | WO-2014196863 A1 | 12/2014 |
| WO | WO-2015154028 A1 | 10/2015 |
| WO | WO-2016058517 A1 | 4/2016 |
| WO | WO-2016124600 A1 | 8/2016 |
| WO | WO2018175258 A1 | 9/2018 |
| WO | WO-2019068797 A1 | 4/2019 |
| WO | WO-2019149958 A1 | 8/2019 |
| WO | WO-2020102594 A1 | 5/2020 |
| WO | WO-2020191389 A1 | 9/2020 |
| WO | WO2021178467 A1 | 9/2021 |
| WO | WO2021236792 A1 | 11/2021 |
| WO | WO2022026891 A1 | 2/2022 |
| WO | WO2023168443 A1 | 9/2023 |
| WO | WO2023168444 A1 | 9/2023 |
| WO | WO2024011145 A1 | 1/2024 |
| WO | WO2024040058 A1 | 2/2024 |
| WO | WO2024040068 A1 | 2/2024 |
| WO | WO2024059550 A1 | 3/2024 |

OTHER PUBLICATIONS

Diegelman, A.M. and Kool, E.T., "Chemical and Enzymatic Methods for Preparing Circular Single-stranded DNAs," Current Protocols in Nucleic Acid Chemistry Chapter 5:Unit 5.2.1-5.2.27, Wiley, United States (May 2001).

Eschenmoser, A., "Chemical Etiology of Nucleic Acid Structure," Science 284(5423):2118-2124, American Association for the Advancement of Science, United States (Jun. 1999).

Ferrero, M and Gotor, V., "Biocatalytic Selective Modifications of Conventional Nucleosides, Carbocyclic Nucleosides, and C-Nucleosides," Chemical Reviews 100(12):4319 4348, American Chemical Society, United States (Dec. 2000).

Fire, A and Xu, S.Q., "Rolling Replication of Short DNA Circles," Proceedings of the National Academy of Sciences of the United States of America 92(10):4641-4645, National Academy of Sciences, United States (May 1995).

Floyd, D.L., at al., "Single-particle Kinetics of Influenza Virus Membrane Fusion," Proceedings of the National Academy of Sciences of the United States of America 105(40):15382-15387, National Academy of Sciences, United States (Oct. 2008).

Harris, T.D., et al., "Single-molecule DNA Sequencing of a Viral Genome," Science 320(5872):106-109, American Association for the Advancement of Science, United States (Apr. 2008).

International Search Report and Written Opinion for International Application No. PCT/US2022/052448 mailed May 15, 2023, 16 pages.

International Search Report and Written Opinion for International Application No. PCT/US2022/052449 mailed Mar. 8, 2023, 25 pages.

International Search Report and Written Opinion for International Application No. PCT/US2023/063734 mailed Jul. 17, 2023, 11 pages.

International Search Report and Written Opinion for International Application No. PCT/US2023/063736 mailed Aug. 21, 2023, 16 pages.

Jeong, L.S., et al., "Structure-Activity Relationships of Beta-D-(2S,5R)- and Alpha-D-(2S,5S)-1,3-Oxathiolanyl Nucleosides As Potential Anti-HIV agents," Journal of Medicinal Chemistry 36(18):2627-2638, American Chemical Society, United States (Sep. 1993).

Joneja, A., et al., "Linear Nicking Endonuclease-mediated Strand-displacement DNA Amplification," Analytical Biochemistry 414(1):58-69, Elsevier, United States (Jul. 2011).

Kim, H.O., et al., "1,3-Dioxolanylpurine Nucleosides (2R,4R) and (2R,4S) with Selective Anti-HIV-1 Activity in Human Lymphocytes," Journal of Medicinal Chemistry 36(1):30-37, American Chemical Society, United States (Jan. 1993).

Korostin, D., et al., "Comparative Analysis of Novel MGISEQ-2000 Sequencing Platform vs Illumina HiSeq 2500 for Whole-genome Sequencing", PloS One 15(3):e0230301, Public Library of Science, United States (Mar. 2020).

Lizardi, P.M., et al., "Mutation Detection and Single-Molecule Counting Using isothermal Rolling-Circle Amplification," Nature Genetics 19(3):225-232, Nature Pub. Co, United States (1998).

Martinez, C.I., et al., "Acyclic Nucleoside Triphosphate Analogs as Terminators in Biocatalytic DNA Replication," Bioorganic & Medicinal Chemistry Letters 7(23):3013-3016 (Dec. 1997).

Martinez, C.I., et al., "An Allylic/acyclic Adenosine Nucleoside Triphosphate for Termination of DNA Synthesis by DNA Template-dependent Polymerases," Nucleic Acids Research 27(5):1271-1274, Oxford University Press, United Kingdom (Mar. 1999).

Mcnaughton, A.L., et al., "Illumina and Nanopore Methods for Whole Genome Sequencing of Hepatitis B Virus (HBV)," Scientific Reports 9(1):7081, Nature Publishing Group, United Kingdom (May 2019).

Ruparel, H., et al., "Design and Synthesis of a 3'-O-Allyl Photocleavable Fluorescent Nucleotide As a Reversible Terminator for DNA Sequencing by Synthesis," Proceedings of the National Academy of Sciences of the United States of America 102(17):5932-5937, National Academy of Sciences, United States (Apr. 2005).

Wang, B., et al., "An Adaptive Decorrelation Method Removes Illumina DNA Base-calling Errors Caused by Crosstalk Between Adjacent Clusters," Scientific Reports 11 pages, Nature Publishing Group, United Kingdom (Feb. 2017).

Whiteford, N., et al., "Swift: Primary Data Analysis for the Illumina Solexa Sequencing Platform," Bioinformatics 25(17):2194-2199, Oxford University Press, United Kingdom (Sep. 2009).

Lindahl, T and Nyberg, B., "Heat-induced Deamination of Cytosine Residues in Deoxyribonucleic Acid," Biochemistry 13(16):3405-3410, American Chemical Society, United States (Jul. 1974).

Wang, F., et al., "Tequila-seq: a Versatile and Low-cost Method for Targeted Long- read Rna Sequencing," Nature Communications 14(1):4760,1-15, United Kingdom (Aug. 2023).

Wang, R. Y., et al., "Heat- and Alkali-induced Deamination of Methylcytosine and Cytosine Residues in DNA," Biochimica Et Biophysica Acta 697(3):371-377, Elsevier Pub. Co, Netherlands (Jun. 30, 1982).

Bentley, David R., "Whole-genome re-sequencing," Current Opinion in Genetics & Development, vol. 16, No. 6, Dec. 2006; pp. 545-552.

Bentley, David R. et al., "Accurate whole human genome sequencing using reversible terminator chemistry," Nature, vol. 456, Nov. 6, 2008; pp. 53-59.

Levene, M.J., et al., "Zero-Mode Waveguides for Single-Molecule Analysis at High Concentrations," Science, vol. 299, Jan. 31, 2003; pp. 682-686.

Eid, John, et al., "Real-Time DNA Sequencing from Single Polymerase Molecules," Science, vol. 323, Jan. 2, 2009; pp. 133-138.

* cited by examiner

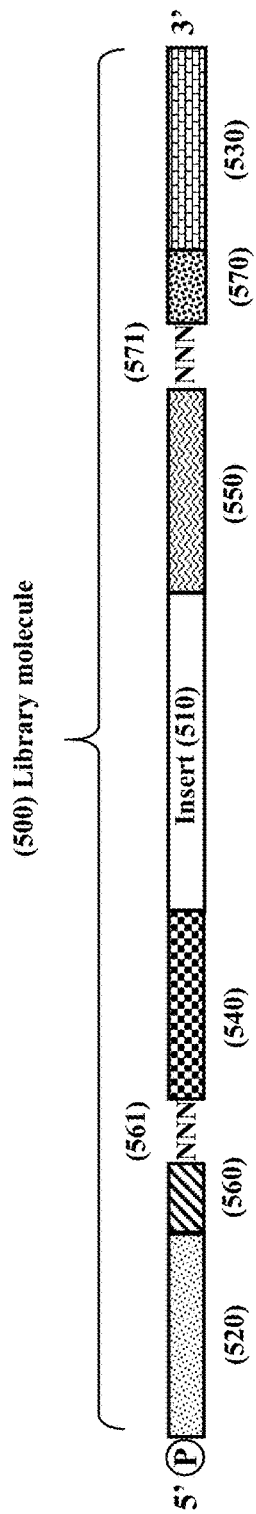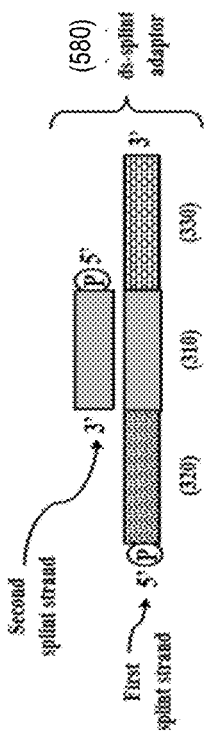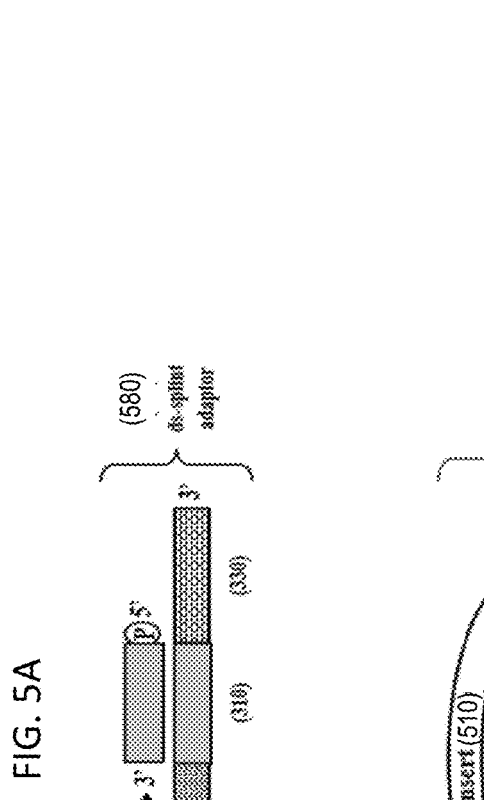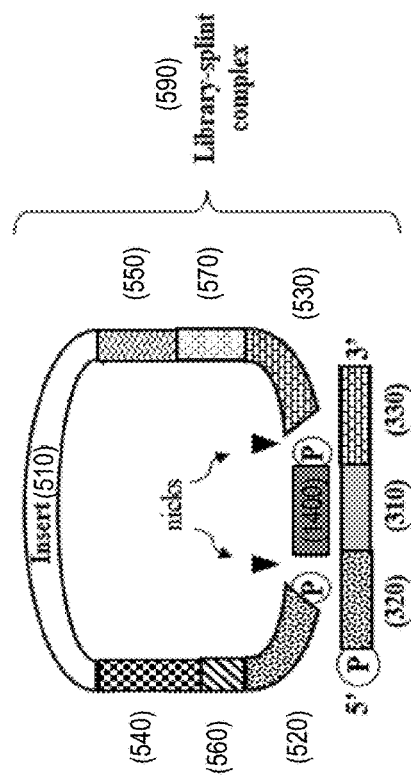
FIG. 5A
FIG. 5B

PRIMARY ANALYSIS IN NEXT GENERATION SEQUENCING

CROSS-REFERENCE TO RELATED APPLICATIONS

This application is a continuation-in-part of U.S. patent application Ser. No. 17/854,042, filed Jun. 30, 2022, which is a continuation of U.S. patent application Ser. No. 17/547,602, filed Dec. 10, 2021, which is a continuation of U.S. patent application Ser. No. 17/219,556, filed Mar. 31, 2021, which claims priority to U.S. Provisional Patent Application No. 63/072,649, filed Aug. 31, 2020. This application is a continuation-in-part of U.S. patent application Ser. No. 17/725,065, filed Apr. 20, 2022, which claims priority to U.S. Provisional Patent Application No. 63/316,784, filed Mar. 4, 2022. This application is a continuation-in-part of U.S. patent application Ser. No. 17/725,042, filed Apr. 20, 2022, which claims priority to U.S. Provisional Patent Application No. 63/316,790, filed Mar. 4, 2022. This application claims priority to U.S. Provisional Patent Application No. 63/349,421, filed Jun. 6, 2022. The entirety of the above-mentioned patent applications are hereby incorporated by reference in their entireties.

REFERENCE TO SEQUENCE LISTING SUBMITTED ELECTRONICALLY

The content of the electronically submitted Sequence Listing XML, File Name: 4585_0120004_Sequence-Listing_ST26, Size: 7,188 bytes, and Date of Creation: Jun. 26, 2023, submitted herewith, is hereby incorporated by reference in its entirety.

TECHNICAL FIELD

This disclosure relates generally to image data analysis, and particularly to identifying cluster locations for performing base-calling in a digital image of a flow cell during DNA sequencing.

BACKGROUND

Next generation sequencing-by-synthesis using a flow cell may be used for identifying sequences of DNA. As single-stranded DNA fragments from a sequencing library are flooded across a flow cell, the fragments will randomly attach to the surface of the flow cell, typically due to complementary oligomers bound to the surface of the flow cell or beads present thereon. An amplification process is then performed on the DNA fragments, such that copies of a given fragment form a cluster or polony of denatured, cloned nucleotide strands. In some aspects, a single bead may contain a cluster, and the beads may attach to the flow cell at random locations.

In order to identify the sequence of the strands, the strand pairs are re-built, one nucleotide base at a time. During each base-building cycle, a mixture of single nucleotides, each attached to a fluorescent label (or tag) and a blocker, is flooded across the flow cell. The nucleotides attach at complementary positions on the strands. Blockers are included so that only one base will attach to any given strand during a single cycle. The flow cell is exposed to excitation light, exciting the labels and causing them to fluoresce. Because the cloned strands are clustered together, the fluorescent signal for any one fragment is amplified by the signal from its cloned counterparts, such that the fluorescence for a cluster may be recorded by an imager. After the flow cell is imaged, blockers are cleaved and washed from the flowed nucleotides, more nucleotides are flooded over the flow cell, and the cycle repeats. At each flow cycle, one or more images are recorded.

A base-calling algorithm is applied to the recorded images to "read" the successive signals from each cluster, and convert the optical signals into an identification of the nucleotide base sequence added to each fragment. Accurate base-calling requires accurate identification of the cluster centers, to ensure that successive signals are attributed to the correct fragment.

SUMMARY

Provided herein are system, apparatus, article of manufacture, method and/or computer program product aspects, and/or combinations and sub-combinations thereof which computationally improve resolution of an imager beyond its physical resolution limit and/or provide higher-accuracy source location in an image.

As a particular application of such, aspects of methods and systems for identifying a set of base-calling locations in a flow cell are described. These include capturing flow cell images after each flow cycle, and identifying candidate cluster centers in at least one of the flow cell images. Intensities are determined for each candidate cluster center. Purities are determined for each candidate cluster center based on the intensities. In some aspects, intensities and/or purities are determined at a sub-pixel level. Each candidate cluster center with a purity greater than the purity of the surrounding candidate cluster centers within a distance threshold is added to a set of base-calling locations. The set of base-calling locations may be referred to herein as a template.

In some aspects, identifying the candidate cluster centers includes labeling each pixel of the flow cell image as a candidate cluster center.

In some aspects, identifying the candidate cluster centers includes detecting a set of potential cluster center locations using a spot-finding algorithm and then identifying additional cluster locations around each potential cluster center location.

Other aspects include corresponding computer systems, apparatus, and computer program product recorded on computer storage device(s), which, alone or in combination, configured to perform the actions or operations of the methods. For a computer system configured or to be configured to perform operations or actions, the computer system has installed on it software, firmware, hardware, or their combinations that in operation cause the computer system to perform the operations or actions. For a computer program product configured or to be configured to perform operations or actions, the computer program product includes instructions that, when executed, by a hardware processor, cause the hardware processor to perform the operations or actions.

Further aspects, features, and advantages of the present disclosure, as well as the structure and operation of the various aspects of the present disclosure, are described in detail below with reference to the accompanying drawings.

BRIEF DESCRIPTION OF THE DRAWINGS/FIGURES

The accompanying drawings, which are incorporated herein and form a part of the specification, illustrate aspects of the present disclosure and, together with the description, further serve to explain the principles of the disclosure and to enable a person skilled in the art(s) to make and use the aspects.

Figure 1:
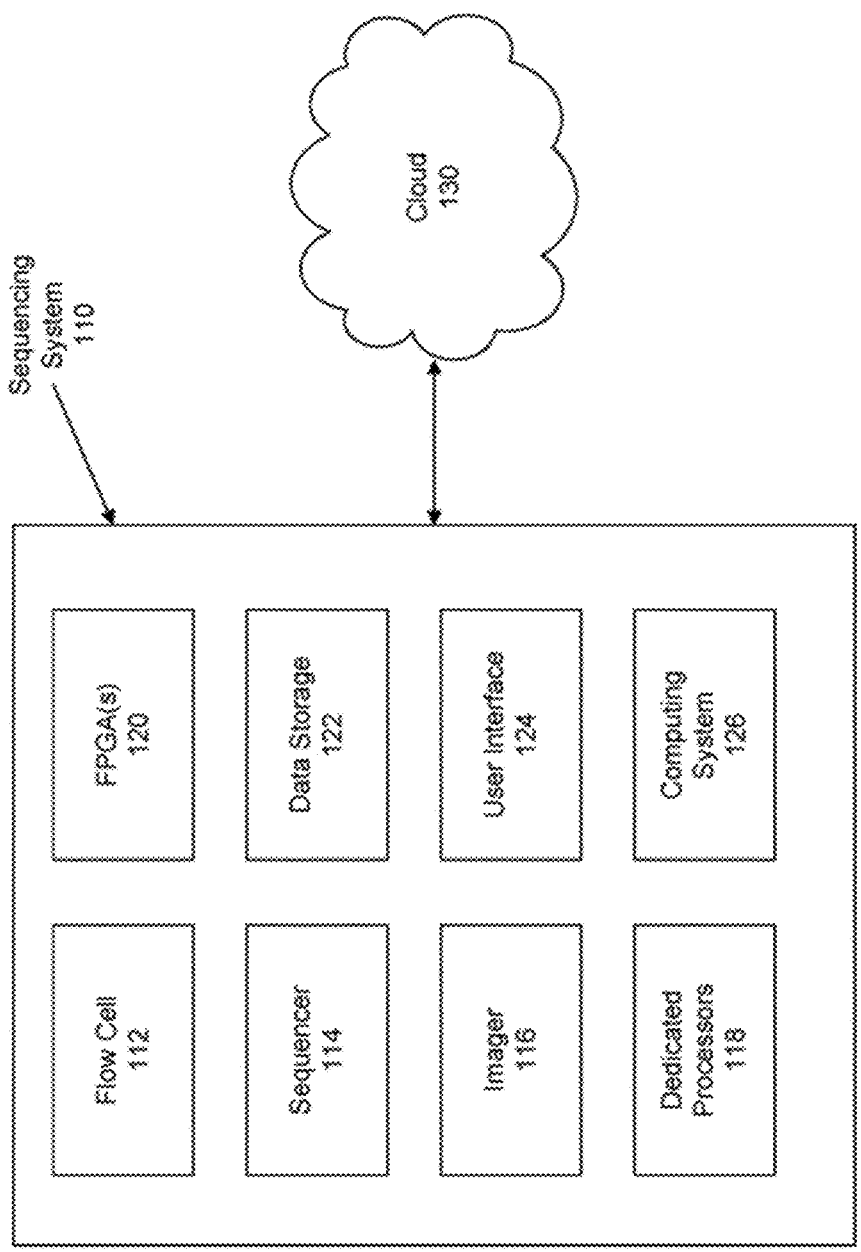
FIG. 1 illustrates a block diagram of a system for identifying cluster locations on a flow cell, according to some aspects.

FIG. 5A is a schematic showing of an exemplary linear single stranded library molecule (500) which comprises: a surface pinning primer binding site (520); a left index sequence (560) having an optional k-mer sequence (561); a forward sequencing primer binding site (540); an insert region having a sequence of interest (510); a reverse sequencing primer binding site (550); a right index sequence (570) having an optional k-mer sequence (571); and a surface capture primer binding site (530). The library molecule (500) can have an optional right unique identification sequence between the right index sequence (570) and the surface capture primer binding site (530), according to some aspects.

FIG. 5B is a schematic showing of an exemplary linear single stranded library molecule (500 in FIG. 5A) hybridizing with a double-stranded splint molecule (580) thereby circularizing the library molecule to form a library-splint complex (590) with two nicks. The library molecule (500 in FIG. 5A) can comprises one or more selected from: a first appended left universal adaptor sequence; a first left universal adaptor sequence (520); a first left junction adaptor sequence; a left index sequence (560); a second left junction adaptor sequence; a second left universal adaptor sequence (540); a third left junction adaptor sequence; a sequence of interest (510); a third right junction adaptor sequence; a second right universal adaptor sequence (540); a second right junction adaptor sequence; a right index sequence (570); a first right junction adaptor sequence; a first right unique identification sequence; a first right universal adaptor sequence (530); and a first appended right universal adaptor sequence. The double-stranded splint molecule 580 comprises a first splint strand hybridized to a second splint strand. The first splint strand comprises a first region (320) that hybridizes with a sequence on one end of the linear single stranded library molecule, and a second region (330) that hybridizes with a sequence on the other end of the linear single stranded library molecule. The internal region (310) of the first splint strand hybridizes to the second splint strand. For the sake of simplicity, the library-splint complex (580) does not show any of the junction adaptor sequences or the appended universal adaptor sequences. The skilled artisan will recognize that the linear library molecule (500) can include any one or any combination of two or more of the junction adaptors, with our without one or both of the appended universal adaptor sequences. The skilled artisan will recognize that the library-splint complex (590) can include any one or any combination of two or more of the junction adaptors, with our without one or both of the appended universal adaptor sequences, that are present in the library molecule (500), according to some aspects.

Figure 6:
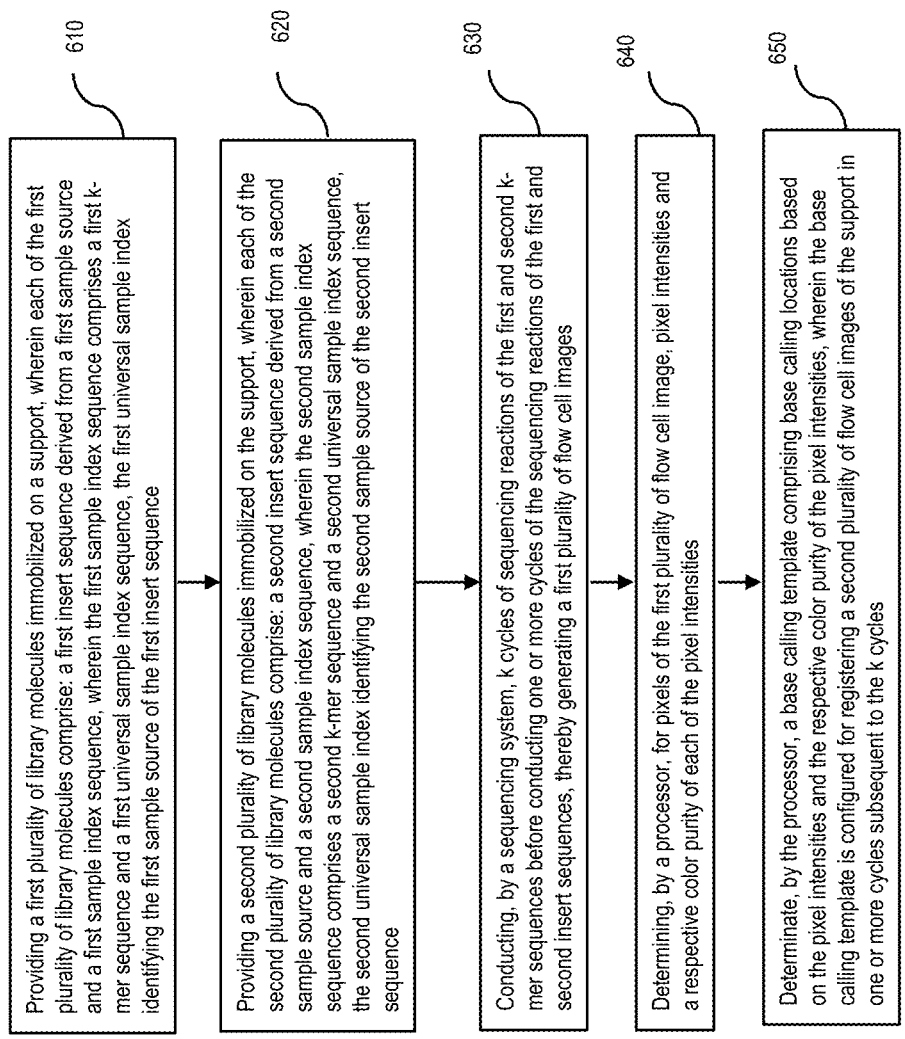

FIG. 6 is a flow chart illustrating a method for identifying locations at which to perform base-calling, according to some aspects.

Figure 7:
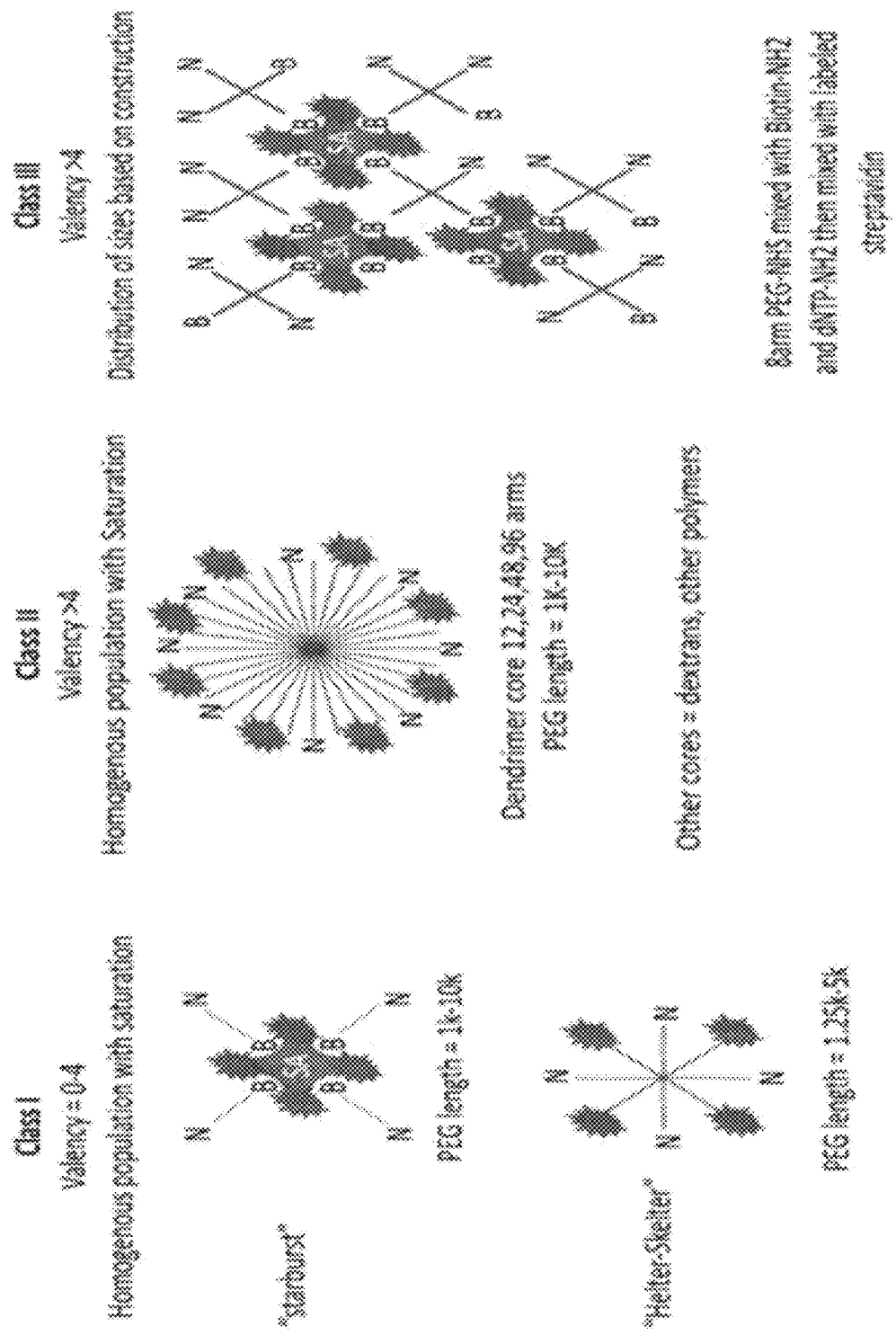

FIG. 7 is a schematic of various exemplary configurations of multivalent molecules. Left (Class I): schematics of multivalent molecules having a "starburst" or "helter-skelter" configuration. Center (Class II): a schematic of a multivalent molecule having a dendrimer configuration. Right (Class III): a schematic of multiple multivalent molecules formed by reacting streptavidin with 4-arm or 8-arm PEG-NHS with biotin and dNTPs. Nucleotide units are designated 'N', biotin is designated 'B', and streptavidin is designated 'SA', according to some aspects.

Figure 8:
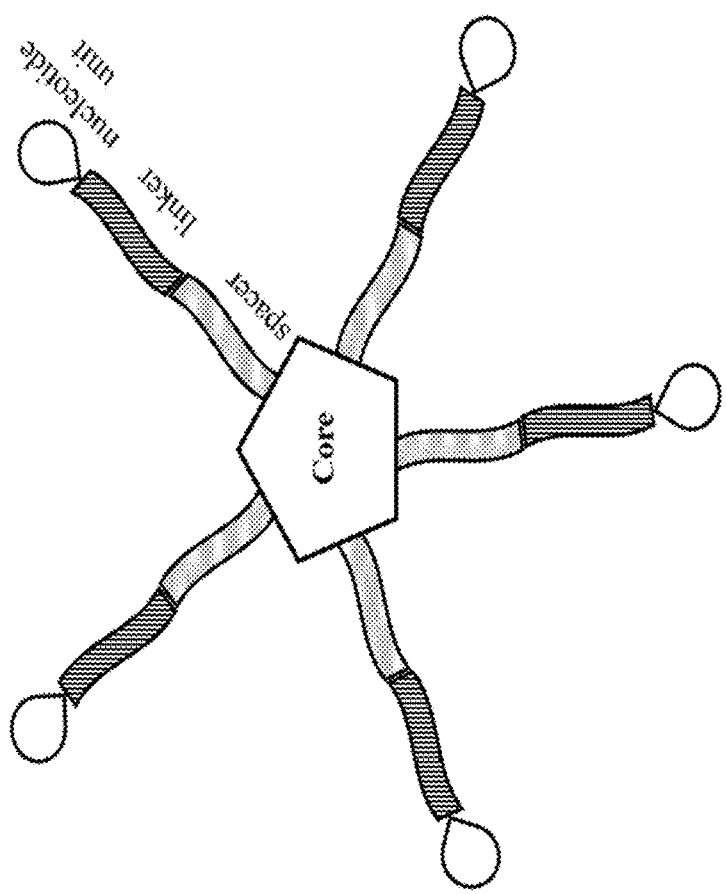

FIG. 8 is a schematic of an exemplary multivalent molecule comprising a generic core attached to a plurality of nucleotide-arms, according to some aspects.

Figure 9:
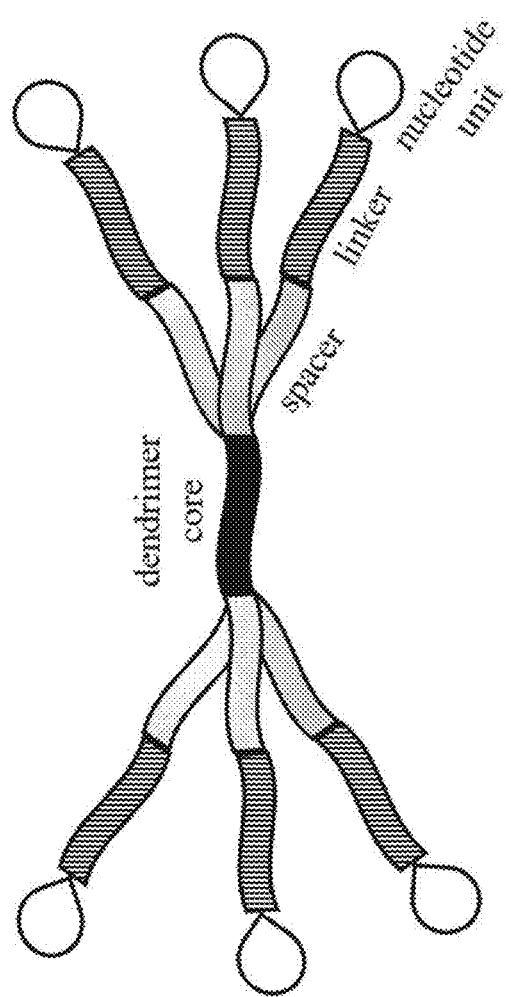

FIG. 9 is a schematic of an exemplary multivalent molecule comprising a dendrimer core attached to a plurality of nucleotide-arms, according to some aspects.

Figure 10:
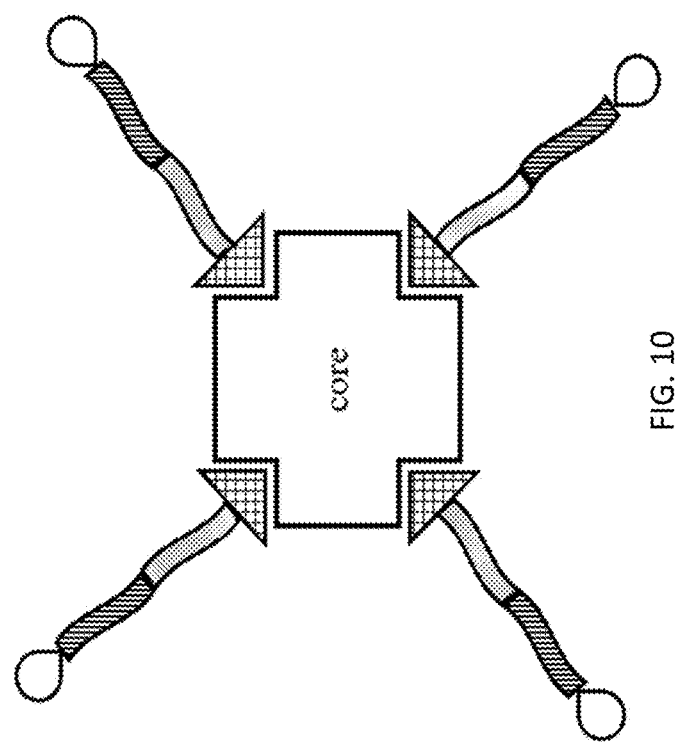

FIG. 10 shows a schematic of an exemplary multivalent molecule comprising a core attached to a plurality of nucleotide-arms, where the nucleotide arms comprise biotin, spacer, linker and a nucleotide unit, according to some aspects.

Figure 11:
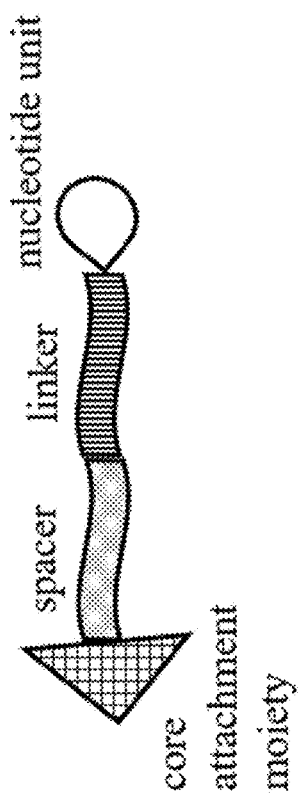

FIG. 11 is a schematic of an exemplary nucleotide-arm comprising a core attachment moiety, spacer, linker and nucleotide unit, according to some aspects.

Figure 12:
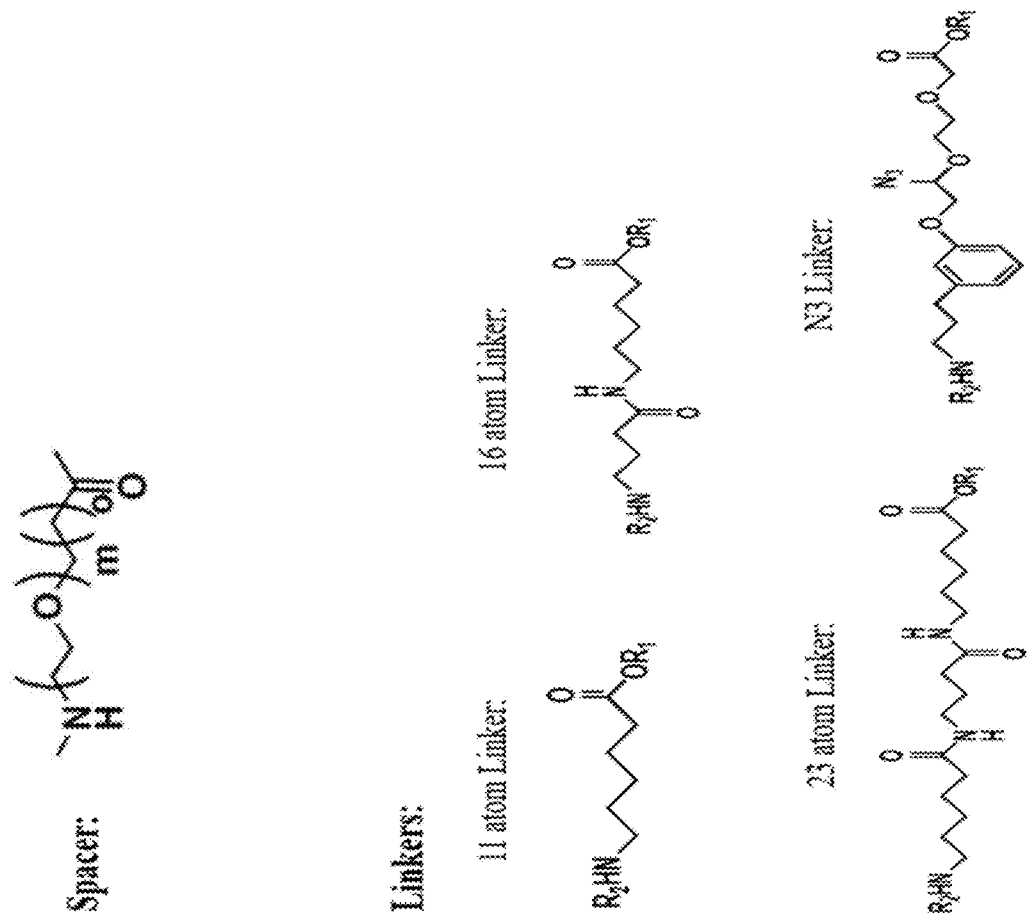

FIG. 12 shows the chemical structure of an exemplary spacer (top), and the chemical structures of various exemplary linkers, including an 11-atom Linker, 16-atom Linker, 23-atom Linker and an N3 Linker (bottom), according to some aspects.

Figure 13:
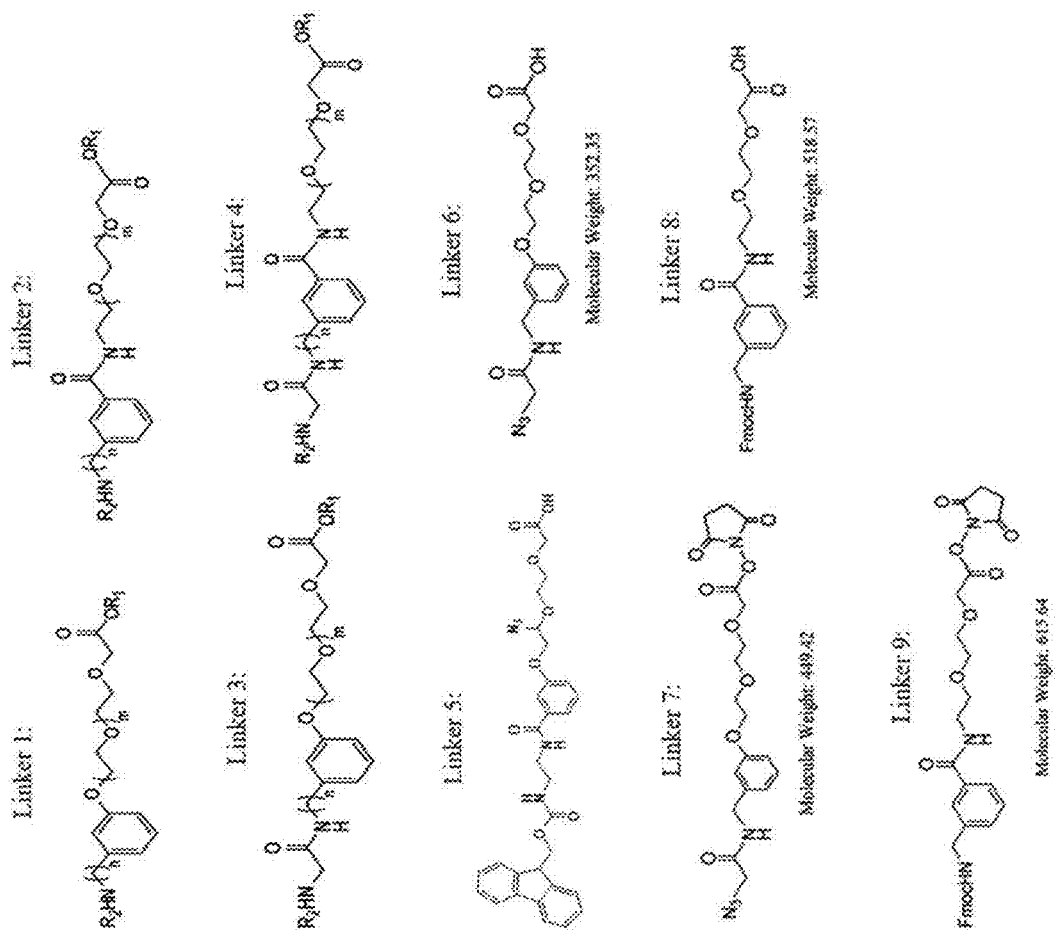

FIG. 13 shows the chemical structures of various exemplary linkers, including Linkers 1-9, according to some aspects.

Figure 14:
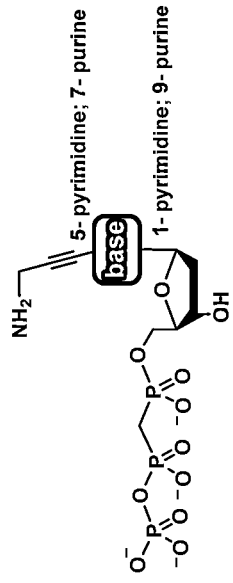
Figure 14:
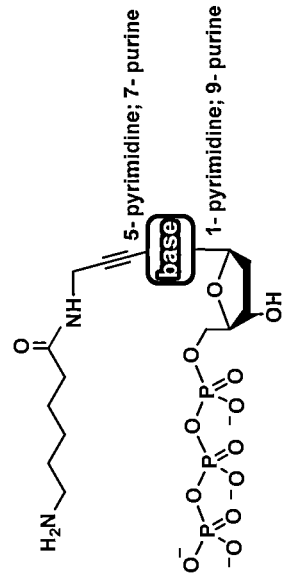

FIG. 14 shows the chemical structures of various exemplary linkers joined/attached to nucleotide units, according to some aspects.

Figure 15:
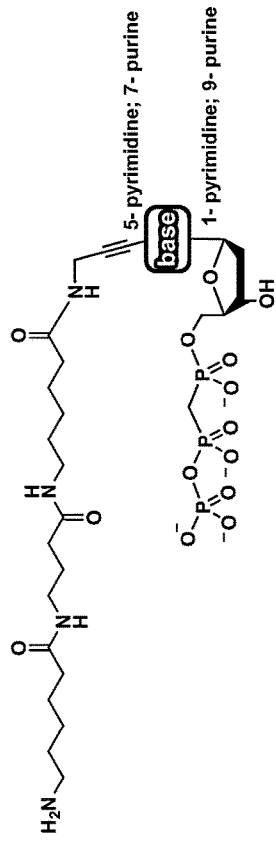
Figure 15:
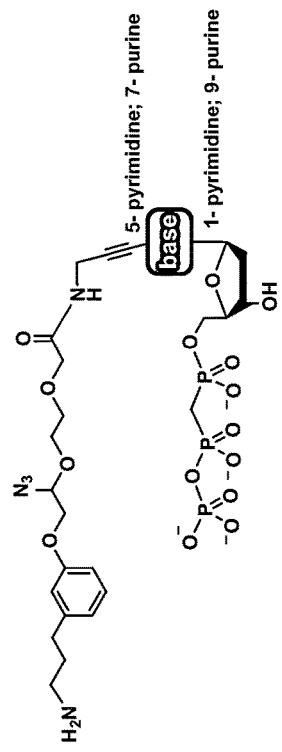
Figure 15:
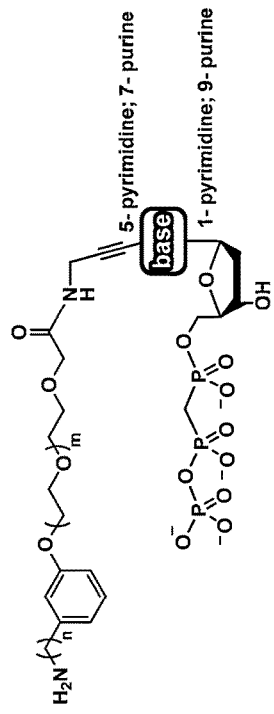

FIG. 15 shows the chemical structures of various exemplary linkers joined/attached to nucleotide units, according to some aspects.

Figure 16:
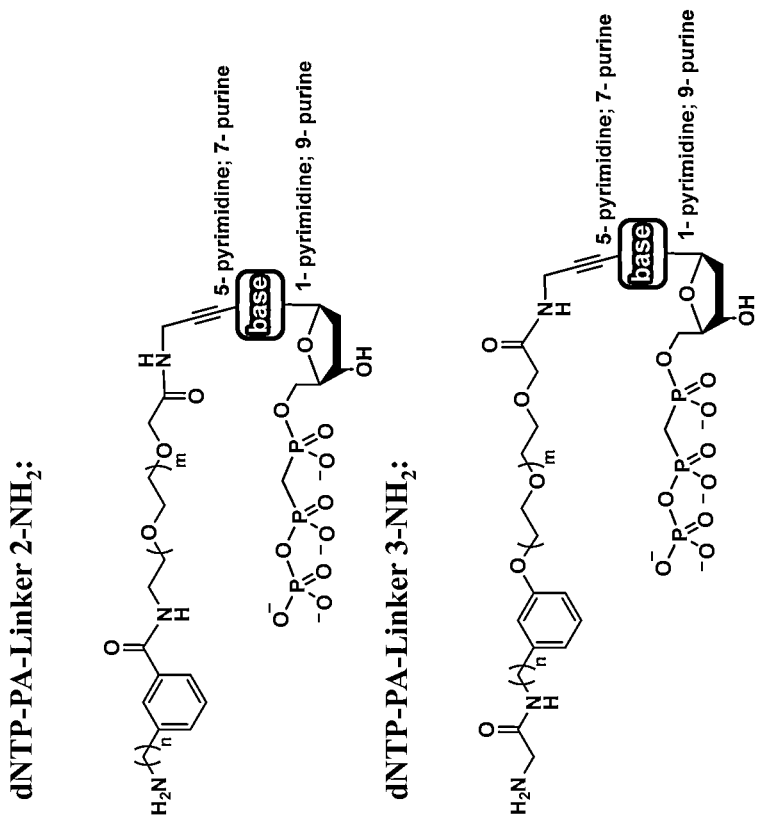

FIG. 16 shows the chemical structures of various exemplary linkers joined/attached to nucleotide units, according to some aspects.

Figure 17:
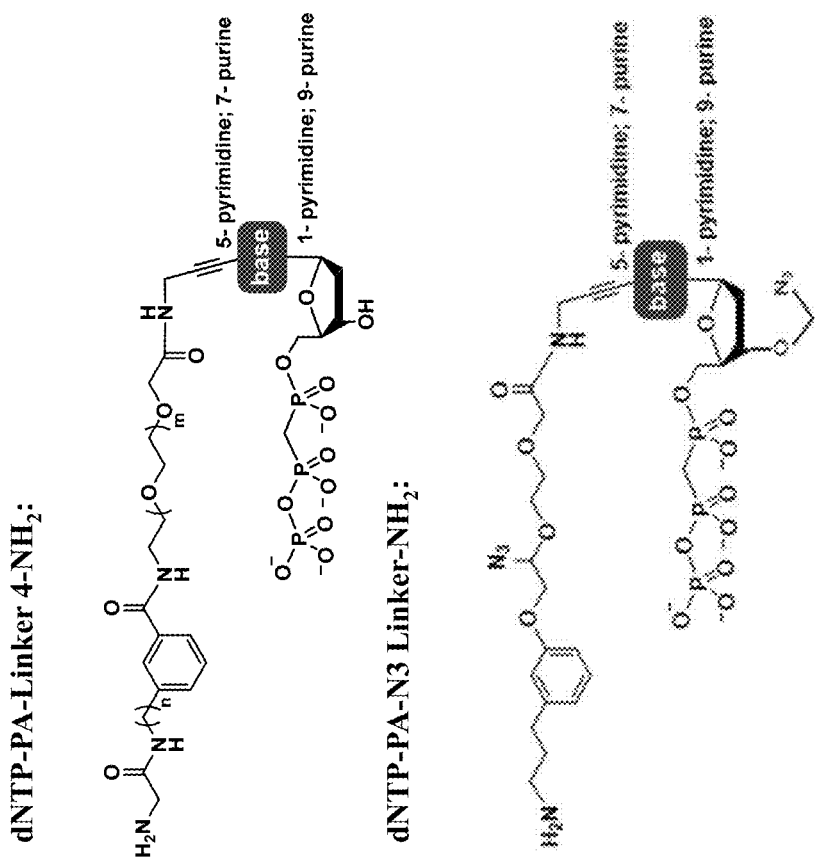

FIG. 17 shows the chemical structures of various exemplary linkers joined/attached to nucleotide units, according to some aspects.

Figure 18:
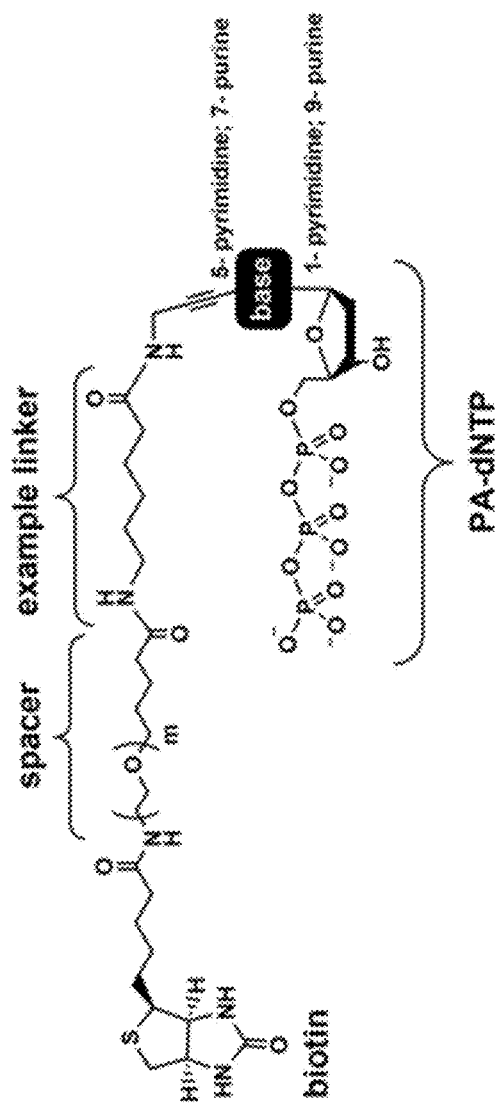

FIG. 18 shows the chemical structure of an exemplary biotinylated nucleotide-arm. In this example, the nucleotide unit is connected to the linker via a propargyl amine attachment at the 5 position of a pyrimidine base or the 7 position of a purine base, according to some aspects.

Figure 19:
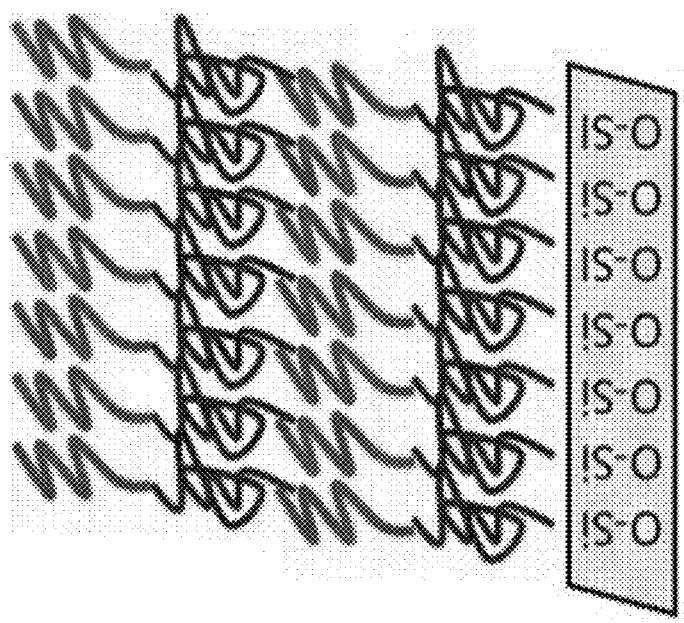

FIG. 19 provides a schematic illustration of one aspect of the low binding solid supports of the present disclosure in which the support comprises a glass substrate and alternating layers of hydrophilic coatings which are covalently or non-covalently adhered to the glass, and which further comprises chemically-reactive functional groups that serve as attachment sites for oligonucleotide primers, according to some aspects.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product aspects, and/or combinations and sub-combinations thereof which computationally improve resolution of an imager beyond its physical resolution limit and/or provide higher-accuracy source location in an image. The image processing techniques described herein are particularly useful for base-calling in next generation sequencing, and base-calling will be used as the primary example herein for describing the application of these techniques. However, such imaging analysis techniques may also be particularly useful in other applications where spot-detection and/or CCD imaging is used. For example, identifying the actual center (e.g., source location) of a perceived optical signal has utility in numerous other fields, such as location detection and tracking, astronomical imaging, heat mapping, etc. Additionally, such techniques as described herein may be useful in any other application benefiting from increasing resolution computationally once the physical resolution limits of an imager have been reached.

In DNA sequencing, identifying the centers of clusters or polonies (which are often formed on beads) is sometimes referred to as primary analysis. Primary analysis involves the formation of a template for the flow cell. The template includes the estimated locations of all detected clusters in a common coordinate system. Templates are generated by identifying cluster locations in all images in the first few flows of the sequencing process. The images may be aligned across all the images to provide the common coordinate system. Cluster locations from different images may be merged based on proximity in the coordinate system. Once the template is generated, all further images are registered against it and the sequencing is performed based on the cluster locations in the template.

A variety of algorithms exist for identifying cluster centers in an image. These existing algorithms suffer from a number of shortcomings. As discussed above, cluster centers may appear merged if they are close together. The proximity may be due to precision issues or registration problems. Different clusters may thus be treated as a single cluster, resulting in improper sequence identification or missing out on a sequence.

Additionally, algorithms may require finding clusters across several images to identify the cluster locations for the template. This may require excessive processing time.

FIG. 1 illustrates a block diagram of a system 100 for identifying cluster locations on a flow cell, according to an aspect. The system 100 has a sequencing system 110 that may include a flow cell 112, a sequencer 114, an imager 116, data storage 122, and user interface 124. The sequencing system 110 may be connected to a cloud 130. The sequencing system 110 may include one or more of dedicated processors 118, Field-Programmable Gate Array(s) (FPGA(s)) 120, and a computer system 126.

In some aspects, the flow cell 112 is configured to capture DNA fragments and form DNA sequences for base-calling on the flow cell. The sequencer 114 may be configured to flow a nucleotide mixture onto the flow cell 112, cleave blockers from the nucleotides in between flowing steps, and perform other steps for the formation of the DNA sequences on the flow cell 112. The nucleotides may have fluorescent elements attached that emit light or energy in a wavelength that indicates the type of nucleotide. Each type of fluorescent element may correspond to a particular nucleotide base (e.g., A, G, C, T). The fluorescent elements may emit light in visible wavelengths.

For example, each nucleotide base may be assigned a color. Adenine may be red, cytosine may be blue, guanine may be green, and thymine may be yellow, for example. The color or wavelength of the fluorescent element for each nucleotide may be selected so that the nucleotides are distinguishable from one another based on the wavelengths of light emitted by the fluorescent elements.

The imager 116 may be configured to capture images of the flow cell 112 after each flowing step. In an aspect, the imager 116 is a camera configured to capture digital images, such as a CMOS or a CCD camera. The camera may be configured to capture images at the wavelengths of the fluorescent elements bound to the nucleotides.

The resolution of the imager 116 controls the level of detail in the flow cell images, including pixel size. In existing systems, this resolution is very important, as it controls the accuracy with which a spot-finding algorithm identifies the cluster centers. One way to increase the accuracy of spot finding is to improve the resolution of the imager 116, or improve the processing performed on images taken by imager 116. The methods described herein may detect cluster centers in pixels other than those detected by a spot-finding algorithm. These methods allow for improved accuracy in detection of cluster centers without increasing the resolution of the imager 116. The resolution of the imager may even be less than existing systems with comparable performance, which may reduce the cost of the sequencing system 110.

In an aspect, the images of the flow cell may be captured in groups, where each image in the group is taken at a wavelength or in a spectrum that matches or includes only one of the fluorescent elements. In another aspect, the images may be captured as single images that captures all of the wavelengths of the fluorescent elements.

The sequencing system 100 may be configured to identify cluster locations on the flow cell 112 based on the flow cell images. The processing for identifying the cluster may be performed by the dedicated processors 118, the FPGA(s) 120, the computing system 126, or a combination thereof. Identifying or determining the cluster locations may involve performing traditional cluster finding in combination with the cluster finding methods described more particularly herein.

General purpose processors provide interfaces to run a variety of program in an operating system, such as Windows™ or Linux™. Such an operating system typically provides great flexibility to a user.

In some aspects, the dedicated processors 118 may be configured to perform steps of the cluster finding methods described herein. They may not be general-purpose processors, but instead custom processors with specific hardware or instructions for performing those steps. Dedicated processors directly run specific software without an operating system. The lack of an operating system reduces overhead, at the cost of the flexibility in what the processor may perform. A dedicated processor may make use of a custom programming language, which may be designed to operate more efficiently than the software run on general purpose processors. This may increase the speed at which the steps are performed and allow for real time processing.

In some aspects, the FPGA(s) 120 may be configured to perform steps of the cluster finding methods described herein. An FPGA is programmed as hardware that will only perform a specific task. A special programming language may be used to transform software steps into hardware componentry. Once an FPGA is programmed, the hardware directly processes digital data that is provided to it without running software. The FPGA instead uses logic gates and registers to process the digital data. Because there is no overhead required for an operating system, an FPGA generally processes data faster than a general purpose processors. Similar to dedicated processors, this is at the cost of flexibility.

The lack of software overhead may also allow an FPGA to operate faster than a dedicated processor, although this will depend on the exact processing to be performed and the specific FPGA and dedicated processor.

A group of FPGA(s) 120 may be configured to perform the steps in parallel. For example, a number of FPGA(s) 120 may be configured to perform a processing step for an image, a set of images, or a cluster location in one or more images. Each FPGA(s) 120 may perform its own part of the processing step at the same time, reducing the time needed to process data. This may allow the processing steps to be completed in real time. Further discussion of the use of FPGAs is provided below.

Performing the processing steps in real time may allow the system to use less memory, as the data may be processed as it is received. This improves over conventional systems may need to store the data before it may be processed, which may require more memory or accessing a computer system located in the cloud 130.

In some aspects, the data storage 122 is used to store information used in the identification of the cluster locations. This information may include the images themselves or information derived from the images captured by the imager 116. The DNA sequences determined from the base-calling may be stored in the data storage 122. Parameters identifying cluster locations may also be stored in the data storage 122.

The user interface 124 may be used by a user to operate the sequencing system or access data stored in the data storage 122 or the computer system 126.

The computer system 126 may control the general operation of the sequencing system and may be coupled to the user interface 124. It may also perform steps in the identification of cluster locations and base-calling. In some aspects, the computer system 126 is a computer system 400, as described in more detail in FIG. 4. The computer system 126 may store information regarding the operation of the sequencing system 110, such as configuration information, instructions for operating the sequencing system 110, or user information. The computer system 126 may be configured to pass information between the sequencing system 110 and the cloud 130.

As discussed above, the sequencing system 110 may have dedicated processors 118, FPGA(s) 120, or the computer system 126. The sequencing system may use one, two, or all of these elements to accomplish necessary processing described above. In some aspects, when these elements are present together, the processing tasks are split between them. For example, the FPGA(s) 120 may be used to perform the cluster center finding methods described herein, while the computer system 126 may perform other processing functions for the sequencing system 110. Those skilled in the art will understand that various combinations of these elements will allow various system aspects that balance efficiency and speed of processing with cost of processing elements.

The cloud 130 may be a network, remote storage, or some other remote computing system separate from the sequencing system 110. The connection to cloud 130 may allow access to data stored externally to the sequencing system 110 or allow for updating of software in the sequencing system 110.

Figure 3:
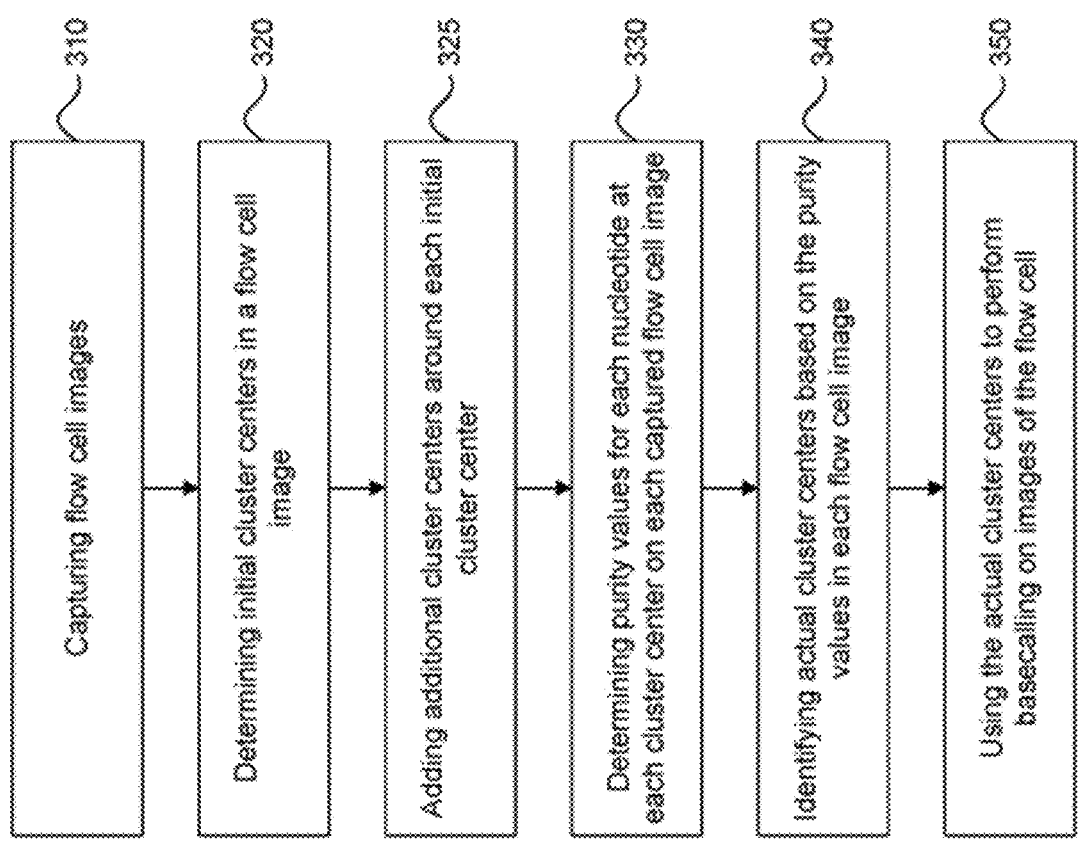
FIG. 3 is a flow chart illustrating a method for identifying locations at which to perform base-calling, according to some aspects.

FIG. 3 is a flow chart illustrating a method 300 for identifying actual cluster center locations at which to perform base-calling. A cluster center in a flow cell image is a location in the image which corresponds to the location of the clonal cluster on the physical flow cell. The wavelength of an optical signal detected at a cluster center correlates to a nucleotide base added to a fragment on the flow cell at that location. In order for a DNA sequence to be determined correctly, the sequentially detected optical signals must be consistently attributed to the correct DNA fragment. Accurately identifying the location of the cluster center thus improves the base-calling accuracy for that fragment. In some aspects, once the actual cluster centers have been identified, such locations may be mapped onto a template for use in subsequent base-call cycles using the same flow cell. The method 300 may be performed by the dedicated processors 118, the FPGA(s) 120, or the computer system 126.

In step 310, flow cell images are captured. The flow cell images may be captured by imager 116, as discussed above. Step 310 may involve capturing one image at a time to be processed by the following steps, or may involve capturing a set of images for simultaneous processing. In an example where a set of images is captured, each image in the set of images may correspond to a different detected wavelength. For example, given the above notation of colors tied to nucleotides, the set of images may include four images, each corresponding to signals captured at a respective one of red, blue, green, and yellow wavelengths, In an example where a single image is captured, that image may include all the detected wavelengths of interest. Each image or set of images may be captured for a single flowing step on the flow cell. In some aspects, the flow cell images are captured with reference to a coordinate system.

Figure 2:
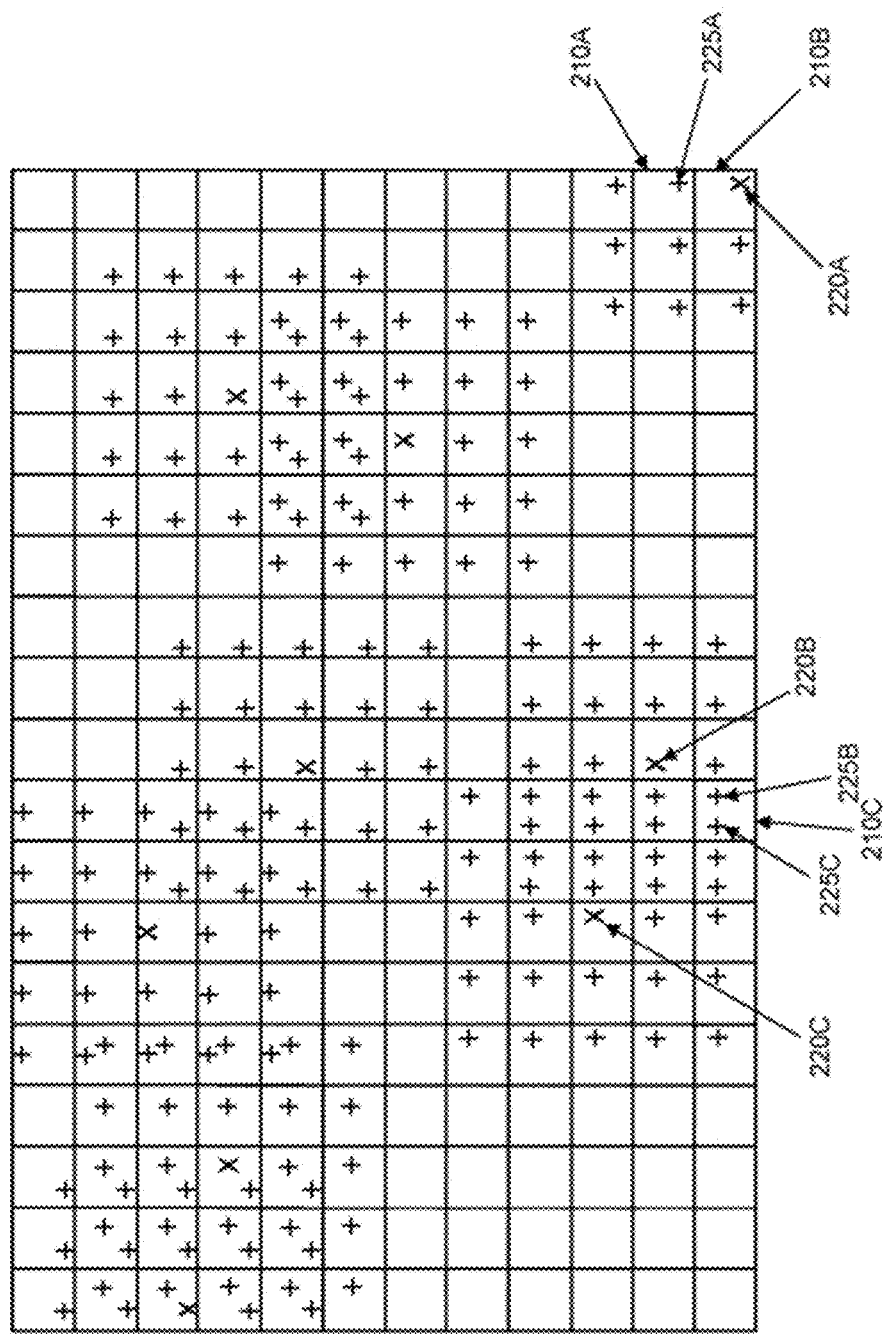
FIG. 2 illustrates an example flow cell image with candidate cluster center centers, according to some aspects.

FIG. 2 illustrates a schematic of a flow cell image 200 with signals from clusters present thereon. The flow cell image 200 is made up of pixels 210, such as pixels 210A, 210B, and 210C. During step 310, the imager records the optical signals received from the flow cell after, for example, excitation of the fluorescent elements bound to fragments on the flow cell, such fragments being located in clonal clusters of fragments.

In step 320, locations of potential cluster centers in the flow cell image are identified. For example, in some aspects, the optical signals imaged in step 310 may be input into a spot-finding algorithm, such that the spot-finding algorithm outputs a set of potential cluster centers. In some aspects, the potential cluster centers may be identified using only a single flow cell image (e.g., one image containing all wavelengths of interest). In some other aspects, the potential cluster centers may be identified from a set of images from a single flowing cycle on the flow cell (e.g., one image at each wavelength of interest). The use of only a flow cell image or set of flow cell images from a single flowing cycle advantageously reduces the amount of processing time, as the spot-finding algorithm need not wait for additional images from future flowing cycles to be obtained.

In still other aspects, the spot-finding algorithm may be applied to images from more than one flow cycle, and the potential cluster centers may be found using some combination of those images. For example, the potential cluster centers may be identified by the presence of spots occupying the same location in images from more than one flow cycle.

The potential cluster center locations identified by the spot-finding algorithm are depicted with an "X" in FIG. 2, such as potential cluster center locations 220A, 220B, and 220C, Due to the random nature of fragment attachment to the flow cell, some of the clonal clusters may be close together, while other clusters may be further apart or even stand alone. As a result, some "X"s in FIG. 2 are located more closely together than others. Additionally, some pixels may be identified as containing a potential cluster center, while others are not. For example, pixel 210A may be identified as containing a potential cluster center location 220A, while pixel 210B is not initially identified as containing a potential cluster center location 220.

In some aspects, the spot-finding algorithm may identify the potential cluster center locations 220 at a sub-pixel resolution by interpolating across the pixel 210. For example, the potential cluster center location 220A is located in the lower right side of pixel 210A, rather than the center of pixel 210A. Other potential cluster center locations may be located in different areas of their respective pixels 210. For example, potential cluster center location 220B is located in the top right of a pixel, and potential cluster center location 220C is located in the top left of a pixel. Interpolation may be performed by an interpolation function.

In some aspects, the interpolation function is a Gaussian interpolation function known to persons of skill in the art. The sub-pixel resolution may allow the potential cluster locations to be determined, for example, at one-tenth pixel resolution, although other resolutions are also considered. In aspects, for example, the resolution may be one-fourth pixel resolution, one-half pixel resolution, etc. The interpolation function may be configured to determine this resolution.

The interpolation function may be used to fit to the intensity of the light in one or more pixels 210. This interpolation allows the sub-pixel locations to be identified. The interpolation function may be applied across a set of pixels 210 that include a potential cluster center location 220. In an aspect, the interpolation function may be fit to a pixel 210 with a potential cluster center location 220 in it and the surrounding pixels 210 that touch the edges of that pixel 210.

In some aspects, the interpolation function may be determined at a number of points in the image. The resolution determines how many points are located in each pixel 210. For example, if the resolution is one-tenth of a pixel, then along a line perpendicular to the pixel edge there will be nine points calculated across the pixel 210 and one on each edge, dividing the pixel 210 into ten parts. In some aspects, the interpolation function is calculated at each point and the difference between the interpolation function at each point and the pixel intensity is determined. The center of the interpolation function is shifted to minimize the difference between the interpolation function and the intensity in each pixel 210. This sub-pixel interpolation allows the system to achieve a higher resolution with a lower-resolution imager, reducing cost and/or complexity of the system.

In some aspects, the interpolation may be performed on a five-by-five grid. The grid may be centered on pixel center 210 in a pixel with a potential cluster center location.

While some aspects of step 320 use a spot-finding algorithm to identify potential cluster center locations, some other aspects of step 320 initially identify every pixel in the captured flow cell image as a potential cluster center location. For example, in FIG. 2, every pixel 210 may be identified as a potential cluster center location 220. This approach eliminates the need for a spot-finding algorithm, which may simplify the type of processing needed to implement method 300. This approach may be advantageous when massive parallel processing is available, as each potential cluster center location may be processed in parallel. This may reduce processing time, although at the potential cost of additional hardware, such as increased dedicated processors 118 or FPGA(s) 120. In some aspects, an interpolation function may be then used as described above for identifying intensity at a sub-pixel resolution across the entirety of the flow cell image.

As discussed above, a cluster center identifies a location in the image, such as a pixel 210, which corresponds to the location of the clonal cluster on the physical flow cell. The potential cluster center locations 220 are locations in the image where light at one or more wavelengths is detected by the imager. In some cases, it is possible that the physical location of a cluster corresponds to one set of pixels 210, but that the optical signals from that cluster overflow onto additional pixels 210 that are adjacent to that one set, for example due to saturation of the corresponding sensor within the camera (also referred to as "blooming"). Additionally, when clusters are located close together, the optical signals from those clusters may overlap, even if the clusters themselves do not. Identifying the true cluster centers allows the detected signals to be attributed to the correct DNA fragments, and thus improves the accuracy of the base-calling algorithm.

Accordingly, in step 325, additional cluster signal locations 225 are identified around each potential cluster center location 220. These are depicted with a "+" in FIG. 2, such as 225A, 225B, and 225C. These additional cluster signal locations 225 correspond to other locations in the flow cell which may constitute a cluster center, instead of or in addition to locations already identified as potential cluster center locations 220.

In some aspects, additional cluster locations 225 are placed around the potential cluster center locations 220. In some aspects, these additional cluster locations 225 are not initially identified by a spot finding algorithm, but are placed in a pattern around each potential cluster center location 220 that is identified by a spot finding algorithm. The additional cluster locations 225 do not represent actual, detected cluster centers, but rather represent potential locations to check for cluster centers that might otherwise be undetected. Such cluster centers may be undetected due to mixing between signals from proximate cluster centers, errors in the spot finding algorithm, or other effects.

As an example, additional cluster location 225A may be placed in pixel 210A, based on the location of potential cluster center location 220A. In this context, this may mean that the additional cluster location 225A is placed a pixel's width away from the potential cluster center location 220A. Other additional cluster locations 225 are also located around potential cluster center location 220A. It should be understood that additional cluster locations 225 would not be located where pixels 210 do not exist, such as when a potential cluster center location 220 is near the edge of the flow cell image 200.

In some aspects, the additional cluster signal locations 225 are placed in a grid centered around a potential cluster center location 220. The additional cluster locations 225 may be placed spaced apart from each other and the potential cluster center location 220 by a pixel width. In some aspects, the additional cluster locations 225 and the potential cluster center location 220 form a square grid. The grid may have an area of five pixels by five pixels, nine by nine, fifteen by fifteen, or other dimensions.

In some aspects, potential cluster center locations 220 may be close enough together to cause the corresponding grids of additional cluster locations 225 to overlap. This may result in the same pixel 210 containing an additional cluster location 225 from more than one potential cluster center location 220, such that more than one additional cluster location 225 is attributed to the same pixel 210. For example, pixel 210C contains additional cluster location 225B (which was identified based on potential cluster center location 220B), as well as additional cluster location 225C (which was identified base on potential cluster center location 220C).

In some aspects, if the additional cluster locations 225 in the same pixel 210 are close enough together, one of the additional cluster locations 225 is discarded and the other is used to represent both. The two additional cluster locations 225 may be considered as close enough together for such treatment if they are within, for example and without limitation, two tenths of a pixel, one tenth of a pixel, or some other sub-pixel distance.

One of skill in the art will appreciate that if, in step 320, all pixel locations were identified as potential cluster center locations 220, then step 325 may be skipped as there are no other pixels left in the flow cell image to consider in addition to the identified potential cluster center locations.

In some aspects, the potential cluster center locations 220 (and the surrounding additional cluster locations 225, if identified) together constitute a set of all candidate cluster centers. These candidate cluster centers may be processed to identify the actual cluster centers for each captured flow cell image.

Accordingly, once the potential cluster center locations 220 and their surrounding grids of additional cluster locations 225 (i.e., the candidate cluster centers) have been identified, they may be used as a starting point for determining the actual locations of the cluster centers, which may or may not be the same as the originally-identified potential cluster center locations 220.

Returning to FIG. 3, in step 330, a purity value for each candidate cluster center on each captured flow cell image is determined. The purity values may be determined based on the wavelengths of the fluorescent elements bound to the nucleotides and the intensity of the pixels in the captured flow cell images.

At each candidate cluster center, the intensity of the pixel is a combination of the energy or light emitted across the spectral bandwidth of the imager. In some aspects, an amount of energy or light corresponding to the fluorescent spectral bandwidth of each nucleotide base may be found. The purity of each signal corresponding to a particular nucleotide base may be found as a ratio of the amount of energy for one nucleotide base signal to the total amount of energy for each other nucleotide base signal (e.g., the purity of a "red" signal may be determined based on relative intensities of detected red wavelengths for that pixel or sub-pixel as compared to each of detected blue, green, and yellow wavelengths). An overall purity of the pixel may be the largest ratio, the smallest ratio, a mean of the ratios, or a median of the ratios. The calculated purity may then be assigned to that pixel or sub-pixel.

As mentioned above, a set of flow cell images may be captured for a single flow cycle. Each image in the set is captured at a different wavelength, each wavelength corresponding to one of the fluorescent elements bound to the nucleotides. The purity of a given cluster center across the set of images may be the highest, lowest, median, or mean purity from the set of purities for the set of images.

In some aspects, the purity of a candidate cluster center may be determined as one minus the ratio of the second highest intensity or energy from the wavelengths for a pixel to the highest intensity or energy from the wavelengths for that pixel. A threshold may be set for what constitutes high or low purity. For example, the highest purity may be one and low purity pixels may have purity values closer to zero. The threshold may be set in between.

In some aspects, the ratio of the two intensities may be modified by adding an offset to both the second highest intensity and the highest intensity. The offset may provide improved accuracy in the quality score. For example, in some cases, the two intensities in the ratio may differ by a small amount of the absolute maximum intensity that is also a large percentage of the highest intensity. As a specific, non-limiting example, the highest intensity may be ten and the lowest intensity may be one with a maximum possible intensity of 1000. The ratio in this case will be 0.1, which results in a purity of 0.9. Without more, this potentially reads as a high quality score. This contrasts with an intensity of, for example, 500 for the highest intensity and 490 for the second highest intensity. This example has about the same absolute difference, but the ratio is close to one and the purity is close to zero. In the first case, the purity is misleading, as the low overall intensity suggests that no polony is present. In the second case, the purity is more accurate and indicates that the pixel is displaying intensity or energy from two different cluster centers that are located nearby.

The offset may be a value added to the intensities in the ratio to resolve such issues. For example, if the offset is ten percent of the maximum amplitude, in the example above, the offset is 100 and the first ratio becomes 101 over 110, which is much closer to one, resulting in a purity near zero, which accurately reflects the small delta between the two wavelength intensities. In the second ratio, the ratio is 600 over 590, which is still close to one, again resulting in a purity near zero.

As another example of incorporating the offset, if the highest intensity is 800 and the lowest intensity is one, the purity without the offset is close to one, as the ratio is almost zero. If the offset is again 100, the ratio becomes 101 over 900. This lowers the purity slightly from one to about 0.89. While this may decrease the purity, the calculated purity is still high. The offset value may be set to reduce this impact. For example, the offset in another case may be 10. Using the previous example of a highest intensity of ten and a lowest intensity of one, the purity because one minus $10/11$, or around 0.09, which is accurately reflects the small difference between the intensities. In the example where the highest intensity is 600 and the lowest intensity is 590, the purity is one minus 600/610, or around 0.016, which is again reflective of the small difference between the intensities. In the example where the highest intensity is 800 and the lowest intensity is one, the purity is one minus $11/810$, or around 0.99, which is a much smaller decrease in purity and is reflects the large difference between the intensities.

In step 340, the actual cluster centers are identified based on the purity values calculated for the candidate cluster centers for the flow cell. The actual cluster centers may be a subset of the candidate cluster locations identified in steps 320 and 325.

In some aspects, the actual cluster centers are identified by comparing the purity for each candidate cluster center across the flow cell image to nearby candidate cluster centers within that same image. In some aspects, given two candidate cluster centers that are being compared, the candidate cluster center with the greater purity is kept. In some aspects, candidate cluster centers are only compared to other candidate cluster centers within a certain distance. For example, this distance threshold may be based on the pixel size and the size of the clusters of a given nucleotide.

For example, if the average size of a cluster is four pixel widths/heights, then the distance threshold may be two pixel widths/heights, as any candidate cluster centers within two pixel widths/heights of each other likely either belong to the same cluster or have a higher intensity (indicating that the candidate cluster center is actually on the edge of two separate clusters).

In some aspects where purity is calculated across multiple flow cell cycles, determining that a candidate cluster center consistently has a purity that is higher than the surrounding candidate cluster centers across multiple flow cell images may further strengthen the likelihood that the location is an actual cluster center. Lower purity may indicate that the signal detected in the candidate cluster center is not an actual cluster center, but noise, mixing of other signals, or some other phenomenon.

In step 350, the actual cluster centers are used to perform base-calling on flow cell images. For example, the wavelength detected from an actual cluster center may be determined, which is in turn correlated to a particular nucleotide base (e.g., A, G, C, T). That nucleotide base is then logged as having been added to the sequence corresponding to the actual cluster center.

Through successive iterations of flow cycles and fluorescence wavelength identification at actual cluster centers in successive flow cell images, the sequence for the DNA fragment corresponding to each actual cluster center on the flow cell may be built.

In some aspects, a template is formed from the actual cluster centers identified for a single flow cycle. The actual cluster locations in the template may then be used to identify where to perform base-calling in images from subsequent flow cycles.

Flow cell images captured in different flow cycles may have registration issues due to shifting in the position of the flow cell or the imager between the flow cycles. Accordingly, in some aspects, step 350 may include a registration step to properly align successive images. This ensures that the actual cluster centers on the template accurately map to the same locations on each flow cell image, thus improving accuracy of the base-calling.

In some aspects where a template is used to identify actual cluster centers in subsequent images, only the data corresponding to relevant locations in those subsequent images need be maintained and/or processed. This decrease in the amount of data processed increases the speed and/or efficiency of the processing, such that accurate results may be obtained more quickly than in legacy systems. Additionally, a decrease in the amount of data stored decreases the amount of storage needed for a sequencer, thus decreasing the amount and/or cost of resources needed.

Additionally, some legacy systems require comparing different images to one another to identify cluster locations. This comparison may include applying a spot-finding algorithm to images from multiple flow cell cycles, and then comparing the spot-finding results across the images. This may require storing images or spot-finding results for each of multiple flow cycles. Method 300 may improve the processing and storage efficiency of cluster finding because the images do not need to be compared directly. Instead, the images may be processed in real time and only the purity information and/or final template location need be stored.

The sequencing flow cycle and image creation processes often run faster than the spot-finding and base-calling programs that analyze the images. This disparity in execution time may require storing the flow cell images after each flow cycle, or a delay in the sequencing flow cycle while waiting for some or all of the image analysis processes to complete.

The use of FPGAs allows for increased speed of processing without sacrificing accuracy. Implementing portions or all of the processes described herein on FPGAs reduces processor overhead and may allow for parallel processing on the FPGAs. For example, each possible cluster location may be processed by a different FPGA, or a single FPGA configured to process the possible cluster locations in parallel at the same time. When properly implemented, this may allow for real-time processing. Real-time processing has the advantage that the image may be processed as it is generated. The FPGA will be ready to process the next image by the time the sequencing system has prepared the flow cell. The sequencing system will not need to wait for the post-processing and the entire process of primary analysis may be completed in a fraction of the time. Additionally, because the entire image has been processed as it is received, the only information that need be stored is data for performing base-calling. Instead of storing every image, only the purity or intensity for particular pixels need be stored. This greatly reduces the need for data storage in the sequencing system or for remote storage of the images.

In some aspects, the entire process, including image registration, intensity extraction, purity calculation, base-calling, and other steps, is performed by FPGAs. This may provide the most compact implementation and provides the speed and throughput necessary for real-time processing.

In some aspects, the processing responsibilities are shared, such as between the FPGAs and an associated computer system. For example, in some aspects, the FPGAs may handle image registration, intensity extraction, and purity calculations. Then, the FPGAs then hand the information off to the computer system for base-calling. This approach balances the load between the FPGAs and computer system resources, including scaling down the communication between FPGAs and computer system. It also provides flexibility for software on the computer system to handle base-calling with quick algorithm tune-ups capabilities. Such an approach may provide real-time processing.

Those skilled in the art will recognize that different configurations of the FPGAs, dedicated processors, and the computer system may be used to perform the various steps. The selection of a given configuration may be based on the flow cell image size, imager resolution, the number of images to process, desired accuracy, and the necessary speed. The implementation cost and hardware cost for the FPGAs, dedicated processors, and computer system may also impact the choice of configuration.

As a non-limiting example comparing performance between existing methods and aspects of the methods described herein, tests were run on two example flow cells, one with a low density of clusters and one with a high density of clusters. For the comparison, the tests were run using each method to target a specific average error rate for false positives on clusters identified.

For the low-density flow cell, the average error rate was 0.3%. Existing methods identified around 78,000 cluster centers, while the methods described herein identified around 98,000 cluster centers. For the high-density flow cell, the average error rate was 1.1%. Existing methods identified around 63,000 cluster centers, while the methods described herein identified around 170,0000 clusters.

The results suggest that the methods described herein effectively identify more clusters than existing methods. Further, even at the same error rate, when the density of the clusters on the flow cell increases, the methods disclosed herein perform even better, identifying almost three times as many clusters. In some aspects, this may allow for flow cells to be flowed at a higher density without the performance loss that is typically experienced in existing methods.

FIG. 6 shows a flow chart of an exemplary aspect of the methods 600 for identifying base calling locations in primary analysis of NGS data analysis. The methods 600 can include some or all of the operations disclosed herein. The operations may but is not limited to be performed in the order that is described herein.

The methods 600 can be performed by one or more processors (e.g., 404 in FIG. 4) disclosed herein. In some aspects, the processor can include one or more of: a processing unit, an integrated circuit, or their combinations. For example, the processing unit can include a central processing unit (CPU) and/or a graphic processing unit (GPU). The integrated circuit can include a chip such as a field-programmable gate array (FPGA). In some aspects, the processor can include the computing system 400.

In some aspects, some or all operations in methods 600 can be performed by the FPGA(s). In aspects when some operations are performed by FPGA(s), the data after an operation performed by the FPGA(s) can be communicated by the FPGA(s)s to the CPU(s) so that CPU(s) can perform subsequent operation(s) in method 500 using such data. Similarly, data can also be communicated from the CPU(s) to the FPGA(s) for processing by the FPGA(s). In some aspects, all the operations in method 500 can be performed by CPU(s). Alternatively, the operations performed by CPU(s) can be performed by other processors such as the dedicated processors, or GPU(s). In some aspects, all the operations in methods 600 can be performed by FPGA(s).

In some aspects, some or all operations of the methods 600 are performed during or before a sequencing cycle N in a sequencing run. A base calling template, e.g., a polony map, can be generated in some or all of cycles 1 to N. Polonies or clusters from one or more channels within such cycles can be included in the template in a reference coordinate system, while flow cell images of cycle N and/or its subsequent cycles are yet to be captured or being currently captured. In some aspects, cycle N is the current cycle. N can be any non-zero integer, e.g., 3, 4, or 5.

Methods for Multiplex Library Molecules

In some aspects, the method 600 can include an operation 610 of providing a first plurality of library molecules immobilized on a support. Each of the first plurality of library molecules can comprise: a first insert sequence derived from a first sample source; and a first sample index sequence. The first sample index sequence can comprise a first k-mer sequence and a first universal sample index sequence. The first universal sample index can be configured for unique identification of the first sample source of the first insert sequence. In some aspects, the first plurality of library molecules are from the same sample source.

FIG. 5A shows an exemplary aspect of a library molecule 500 disclosed herein. The library molecule 500 can include a first insert sequence 510, i.e., the first sequence of interest, obtained from a first sample, and a first sample index sequence with at least a first universal sample sequence 570. The first sample index sequence can also include a k-mer sequence 571.

In some aspects, each library molecule 500 may include only a single insert sequence 510. In other aspects, each library molecule 500 may include multiple insert sequences, either directly adjacent to each other or separated by some other part of the library molecule.

In some aspects, different library molecules 500 immobilized on the support may have identically sized insert sequences, e.g., an insert of 120 nucleotide bases. In other aspects, different library molecules 500 immobilized on the support may have differently sized insert sequences.

In some aspects, the method 600 includes an operation 620 of providing a second plurality of library molecules immobilized on a support. Each of the second plurality of library molecules can comprise: a second insert sequence derived from a second sample source; and a second sample index sequence. The second sample index sequence can comprise a second k-mer sequence and a second universal sample index sequence. The second universal sample index can be used to uniquely identify the second sample source of the second insert sequence. In some aspects, the second sample source is different from the first sample source.

In some aspects, each of the first plurality of library molecules further comprises: a third sample index sequence having a third universal sample index sequence. The combination of the first and third universal sample index sequences can be configured for uniquely identifying the first sample source of the first insert sequence. In some aspects, the third sample index lacks a k-mer sequence or a random sequence. In some aspects, the third sample index comprises a k-mer sequence or a random sequence. The first sample index sequence may be on the left, i.e., the 5' end, of the first insert sequence, or the right, i.e., the 3' end, of the insert sequence. The third sample index sequence then can be at the opposite end of the insert sequence.

FIG. 5A shows an exemplary aspect of a library molecule 500 that includes a first insert sequence 510, i.e., the first sequence of interest, obtained from a first sample, and a third sample index sequence with at least a third universal sample sequence 560. The first sample index sequence can also include a k-mer sequence 561.

In some aspects, each of the second plurality of library molecules further comprise: a fourth sample index having a fourth universal sample index sequence. The combination of the second and fourth universal sample index sequences can uniquely identifies a second sample source of the second insert sequence. In some aspects, the fourth sample index lacks a random sequence or a random sequence. In some aspects, the fourth sample index comprises a k-mer sequence or a random sequence. The second sample index sequence may be on the left, i.e., the 5' end, of the second insert sequence, or the right, i.e., the 3' end, of the insert sequence. The third sample index sequence then can be at the opposite end of the second insert sequence.

In some aspects, each of library molecule further comprises one or more universal adaptor sequences (e.g., 520, 540 in FIGS. 5A-5B).

In some aspects, the method 600 can include repeating operation 610 and/or 620 for the third, fourth, fifth, sixth or even more pluralities of library molecules, each plurality of library molecules coming from a different sample. For example, the operation 610 can be repeated 95 times after performing the operations 610 and 620 once. Each repetition can be of a plurality of library molecules from a different sample so that 96 samples can be prepared for sequencing on the support.

For different library molecules from the same sample, each library molecule can have a different insert sequence, a different k-mer sequence, and identical universal sample index sequence(s). For different library molecules from different samples, each library molecule can have a different insert sequence, a different k-mer sequence, and different universal sample index sequence(s).

The first, second, or other sample source of the insert sequences can be genomic DNA, double-stranded cDNA, and/or cell free circulating DNA.

In some aspects, the method 600 can include operations of: pooling the first and second plurality of library molecules together; distributing the pooled library molecules onto the support; and conducting an amplification reaction to generate a plurality of nucleic acid template molecules immobilized to the support. The plurality of nucleic acid template molecules can be clonally amplified as disclosed herein. In aspects with more than two samples, e.g., 96 samples, all the pluralities of library molecules can be pooled together and distributed on the support for amplification reaction.

In some aspects, the nucleic acid template molecules are clonally amplified from corresponding library molecules. Each nucleic acid template molecule may have multiple cloned copies of the corresponding library molecule. In some aspects, each of the plurality of nucleic acid template molecules is clonally amplified from a corresponding splint complex (e.g., 590 in FIG. 5B) comprising a corresponding library molecule and a corresponding splint molecule/adaptor (e.g., 580 in FIG. 5B). The splint molecule/adaptor can be single stranded or double stranded (e.g., FIG. 5B). The details of forming the splint complex and amplification to form the template molecules are disclosed in U.S. patent application Ser. Nos. 17/725,042 and 17/725,065 (where the contents of both are hereby incorporated by reference in their entireties).

In some aspects, each nucleic acid template molecule may have a single copy of the corresponding library molecule, and multiple template molecules can be clustered together to form a "cluster."

Since each template molecule can have one or more copies of the corresponding library molecule, for different template molecules from the same sample, each template molecule can have a different insert sequence, a different k-mer sequence, and identical universal sample index sequence(s). For different template molecules from template samples, each template molecule can have a different insert sequence, a different k-mer sequence, and different universal sample index sequence(s).

In some aspects, the plurality of nucleic acid template molecules are immobilized at random locations on the support. In some aspects, the plurality of nucleic acid template molecules are immobilized at pre-determined locations on the support. Each of the plurality of nucleic acid template molecules immobilized on the support can correspond to a polony or clonal cluster. The location of the plurality of immobilized template molecules on the support can correspond to base calling locations. The nucleic acid template molecules immobilized can be sequenced when cycles of sequencing reaction is conducted.

The density of the nucleic acid template molecules on the support can be about $10^2$-$10^{12}$ per $mm^2$. The density of the nucleic acid template molecules on the support can be about $10^4$-$10^8$ per $mm^2$. The density of the nucleic acid template molecules on the support can be about $10^4$-$10^{12}$ per $mm^2$. The density of the nucleic acid template molecules on the support can be about $10^4$-$10^5$ per $mm^2$. The density of the nucleic acid template molecules on the support can be $10^2$-$10^{12}$ per $mm^2$. The density of the nucleic acid template molecules on the support can be $10^4$-$10^8$ per $mm^2$. The density of the nucleic acid template molecules on the support can be $10^4$-$10^{12}$ per $mm^2$. The density of the nucleic acid template molecules on the support can be $10^4$-$10^5$ per $mm^2$.

The support can comprise one or more substrates. The support can include a glass or plastic substrate. The support can include a transparent top substrate that is closest to the objective lens of the optical system. The support can include one or more microfluidic channels and the template molecules are immobilized to a surface of the microfluidic channels. In some aspects, the support is comprised in a flow cell device.

In some aspects, the support or a portion thereof (e.g., a surface of the microfluidic channel) is passivated with at least one hydrophilic polymer coating having a water contact angle of not more than 45 degrees. The at least one hydrophilic polymer coating can comprise a molecule selected from a group consisting of polyethylene glycol (PEG), poly(vinyl alcohol) (PVA), poly(vinyl pyridine), poly(vinyl pyrrolidone) (PVP), poly(acrylic acid) (PAA), polyacrylamide, poly(N-isopropylacrylamide) (PNIPAM), poly(methyl methacrylate) (PMA), poly(2-hydroxylethyl methacrylate) (PHEMA), poly(oligo(ethylene glycol) methyl ether methacrylate) (POEGMA), polyglutamic acid (PGA), poly-lysine, poly-glucoside, streptavidin, and dextran. In some aspects, the at least one hydrophilic polymer coating comprises branched hydrophilic polymer molecules having at least four branches. In some aspects, the at least one hydrophilic polymer coating comprises polymer molecules having a molecular weight of at least 1000 Daltons.

In some aspects, the k-mer sequence (e.g., 561 or 571 in FIG. 5A) can include 1, 2, 3, 4, 5 or more nucleotide bases. In some aspects, the k-mer sequence comprises a random sequence of at least 2 or 3 nucleotide bases of A, G, C and T/U. In some aspects, the k-mer sequence only comprises a random sequence of nucleotide bases of A, G, C and T/U.

The method 600 can include an operation 630 of conducting k cycles of sequencing reactions of the first and second k-mer sequences. The operation 630 can be performed by a sequencing system disclosed herein, thereby generating a first plurality of flow cell images. In each sequencing cycles, different k-mer sequences from different template molecules of different samples can be sequenced in parallel. For example, in a first sequencing cycle, the first nucleotide base in 96,000 k-mer sequences from 96 samples are sequenced in parallel, thereby generating a flow cell image per channel with 1000 base calling locations.

In some aspects, the operation 630 is performed before conducting one or more cycles of the sequencing reactions of the insert sequences, e.g., the first and second insert seqeunces.

In some aspects, the operation 630 is based on an order of sequencing (i.e., an read order) of a sequencing run. The order of sequencing can comprise: sequencing the k-mer sequence; then sequencing the first universal sample index sequence; then sequencing the first insert sequence. The order of sequencing can comprise: sequencing the k-mer sequences; then sequencing the first and second universal sample index sequences; then sequencing the first and second insert sequences. The order of sequencing can comprise: sequencing the first and second universal sample index sequences; then sequencing the k-mer sequences; and then sequencing the first and second insert sequences. The order of sequencing can comprise: sequencing the k-mer sequence; and then sequencing the first and second insert sequences; and then sequencing the first and second universal sample index sequences. The order of sequencing can comprise: sequencing a number of bases (e.g., first 3-8 bases) of the first and second insert sequences; sequencing the k-mer sequence; and then sequencing the first and second universal sample index sequences. In an order of sequencing, sequencing the third and fourth sample index sequences can occur after sequencing the first and second sample index sequences, when the third and fourth sample index sequences lack a random sequence.

In some aspects, the first plurality of flow cell images are from 2, 3, 4, 5, or 6 different color channels in each sequencing cycle. In some aspects, the first plurality of flow cell images are from k cycles or k+1 sequencing cycles, and one or more cycles of the k or k+1 cycles comprises: a balanced diversity of nucleotide bases of A, G, C and T/U among the plurality of nucleic acid template molecules immobilized on the support.

In some aspects, each cycle of the sequencing reactions is polymerase-mediated. The operation 630 of conducting k cycles of the sequencing reactions of the k-mer sequence can comprise: contacting polonies of nucleotide acids or the plurality of nucleic acid template molecules using a plurality of nucleotide reagents comprising a mixture of different types of nucleotide bases A, G, C and T/U. In some aspects, individual nucleotide reagent comprises a different detectable color label that corresponds with each different type of nucleotide base.

In some other aspects, the operation 630 comprises: contacting polonies of nucleotide acids or the plurality of nucleic acid template molecules with a plurality of sequencing primers, a plurality of polymerases and a mixture of different types of avidites. An individual avidite in the mixture comprise a core attached with multiple nucleotide arms and each arm of the individual avidite comprises the same type of nucleotide base.

In some aspects, the operation 630 of conducting k cycles of the sequencing reactions of the k-mer sequence comprises: imaging, by an optical system herein, optical color signals emitted from the nucleotide reagents that are bound to the template molecules. In some aspects, the operation 630 of conducting k cycles of the sequencing reactions of the k-mer sequence comprises: in the k cycles, acquiring, by an optical system herein, the first plurality of flow cell images comprising optical color signals emitted from the nucleotide reagents that are bound to the template molecules.

The first plurality of flow cell images can be generated in k cycles corresponding to the conduction of sequencing reactions in the k-mer sequences. The first plurality of flow cell images can comprise optical signals emitted from nucleotide reagents bound to a balanced diversity of nucleotide bases of A, G, C and T/U among the plurality of nucleic acid template molecules immobilized on the support in the k cycles.

The balanced diversity of nucleotide bases of A, G, C and T/U among the plurality of nucleic acid template molecules can comprises: a percentage of (1) a number of each type of nucleotide bases to (2) a total number of bases in the one or more cycles. The percentage can be more than 10%, 15%, or 20%. For example, the unbalanced diversity of nucleotide bases includes a number of nucleotide bases A, G, C, T that is 26%, 15%, 27%, and 32% respectively of the total number of all nucleotide bases among the template molecules of a cycle.

The method 600 can comprise an operation 640 of determining pixel intensities and a respective color purity of each of the pixel intensities for pixels of the first plurality of flow cell image. The operation 640 can be performed by the processor disclosed herein. Each of the pixel intensities can comprise an intensity of the pixel and/or one or more subpixel intensities of the subpixels corresponding to the pixel. The respective color purity of each of the pixel intensities can comprise: one color purity of the pixel and/or one or more color purities corresponding to the one or more subpixel intensities of the corresponding pixel. The respective color purity of each of the pixel intensities can comprise: the respective color purity for one or more color channels.

Determining the pixel intensities can comprise: determining each channel intensity in a set of channel intensities, each channel corresponding to a respective different fluorescent wavelength. Such determination can be based on a comparison of a set of channel intensities at the corresponding pixel or one or more subpixel locations.

Determining the respective color purity of each of the pixel intensities can comprise: determining a ratio of (1) a signal corresponding to a particular type of nucleotide base to (2) a total amount of signal for other types of nucleotide bases. Determining the respective color purity of each of the pixel intensities can at least partly include the operation 330 disclosed herein.

The method 600 can comprise an operation 650 of determining a base calling template comprising base calling locations based on the pixel intensities and the respective color purity of the pixel intensities determined in operation 640.

As disclosed herein, the operation of determining a base calling template based on the pixel intensities and the respective color purity of the pixel intensities can comprise: for each of the pixels or subpixels, determining whether or not the respective color purity is greater than a color purity of other pixels or subpixels within a threshold distance. In response to determining that the respective color purity is greater than the color purity of other pixels or subpixels within the threshold distance, adding a location of the corresponding pixel or subpixel to a base calling template. In response to determining that the respective color purity is no greater than the color purity of the other pixels or subpixels within the threshold distance, making no changes to the base calling template, and move on to a next pixel to repeat the determining operation until all the pixels or at least a subset of the pixels have been through the similar determining operation.

The operation of determining a base calling template can include at least partly the operation of 340.

After the base calling template is determined, it can be configured for registering flow cell images in a sequence run, e.g., the second plurality of flow cell images of the flow cell device in one or more cycles subsequent to the k cycles.

In some aspects, the method 600 can further comprise an operation of conducting the one or more cycles of sequencing reactions of the first insert sequence, thereby generating the second plurality of flow cell images. In aspects with at least two different samples, the method can further comprise an operation of conducting, by the sequencing system, the one or more cycles of sequencing reactions of the first and second insert sequences, thereby generating the second plurality of flow cell images.

The second plurality of flow cell images can be generated in one or more cycles subsequent to the k cycles corresponding to conducting sequencing reaction in the k-mer sequence. The second plurality of flow cell images can comprise optical signals emitted from nucleotide reagents bound to a unbalanced diversity of nucleotide bases of A, G, C and T/U among the plurality of nucleic acid template molecules immobilized on the support in such one or more cycles. The one or more cycles can correspond to sequencing reaction of parts of the template molecules that does not include the k-mer sequence. For example, the one or more cycles can correspond to at least part of the optional second sample index sequence or the insert sequence.

The unbalanced diversity of nucleotide bases of A, G, C and T/U among the plurality of nucleic acid template molecules can comprise: a percentage of (1) a number of one or more types of nucleotide bases to (2) a total number of bases is less than 20%, 15%, 10%, or 5% in the one or more cycles. For example, the unbalanced diversity of nucleotide bases includes a number of nucleotide base A that is about 5% of the total number of all nucleotide bases among the template molecules of a cycle. As another example, the unbalanced diversity of nucleotide bases includes a number of nucleotide base C that is about 8% and T that is about 1% of the total number of all nucleotide bases among the template molecules of a cycle.

During a single sequencing run, base calling locations, i.e., polonies or clusters, may shift, rotate, or otherwise spatially transform in flow cell images obtained from different cycles and/or cross channels. As a result, a template is needed to ensure that base calling locations in a sequencing run are spatially aligned and base calls are accurately assigned to corresponding polonies or clusters, template molecules, and samples. It can be advantageous to generate the template early in a sequencing run and allow registration of base calling locations all sequencing cycles after generating the template. Early generation of the template can also advantageously reduce delay in primary analysis of flow cell images in subsequent cycles and allow real-time analysis while the sequencing run is still in progress. For example, if the template is generated from the first 3-5 cycles, primary analysis can be performed in real-time after flow cell images in cycle 6 are acquired, and can be in parallel with sequencing and imaging operations in cycle 7. Similarly analysis of each cycle after cycle 6 can be performed while its subsequent sequencing cycles are still in progress. As such, the primary analysis can be completely shortly after if not when the sequencing run is completed.

In some aspects, the method 600 can further comprise an operation of registering or align the second plurality of flow cell images from the one or more subsequent flow cycles to the base calling template. In some aspects, the operation of registering the second plurality of flow cell images can comprise generating coordinates of polonies in the second plurality of flow cell images in a common coordinate system. The base calling template is also in the coordinate system. In some aspects, the operation of registering the second plurality of flow cell images can utilize a plurality of transformations corresponding to subtiles of a flow cell image to estimate the image transformation of an entire flow cell image. The operation of registering the flow cell images can comprise generating the transformation of subtitles which provide an estimation of the image transformation of the flow cell image. Information in the neighboring subtiles can be used when determining each individual transformation of a subtile.

In some aspects, the coordinates of polonies can be saved in a one dimensional vector or list. Each entry of the vector or list can include a unique identification of a polony, its coordinates, and other relevant information, such as the pixel intensities in one or more channels of a cycle.

In some aspects, the method 600 can further comprise an operation of performing base calling of the second plurality of flow cell images at the base calling locations in the base calling template using signals from the registered second plurality of flow cell images. The base calls in primary analysis herein can be based on registered image intensities in the common coordinate system. In some aspects, base calling are performed only at base calling locations in the template. In other words, the template functions as a polony map that identifies all the accurate polony locations on the flow cell and ignores other signal locations that are unlikely to be polonies. As disclosed herein, the base calling locations can be at subpixel locations.

The operation of performing base calling of the second plurality of flow cell images can include at least partly the operation 350 in FIG. 3.

In some aspects, instead of including operations 610 and 620, the method 600 can comprise an operation of receiving a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence. In some aspects, the methods 600 can include an operation of receiving a second plurality of library molecules immobilized on the support, wherein each of the second plurality of library molecules comprise: a second insert sequence derived from a second sample source and a second sample index sequence, wherein the second sample index sequence comprises a second k-mer sequence and a second universal sample index sequence, the second universal sample index identifying the second sample source of the second insert sequence. In such aspects, other operations of the method 600 remain similar as disclosed above.

In some aspects, instead of including operation 630, the method 600 can comprise an operation of conducting k+1 cycles of sequencing reactions of the first and second k-mer sequence and of a base position downstream the k-mer sequence (e.g., of the first universal sample index sequence and the second universal sample index sequence), thereby generating a first plurality of flow cell images. In such aspects, the k-mer sequence and the first cycle right after sequencing the k-mer sequence together are configured to generate balanced or high diversity nucleotide bases in at least 2 or 3 cycles of the k+1 cycles. The base calling template can be generated based on the k+1 cycles together. The additional cycle may but does not need to include a random base. The additional cycle can be from the universal sample index sequence. Alternatively, based on the specific order of sequencing, the additional cycle can be from the insert sequence or any other part of the template molecule. In such aspects, other operations of the method 600 remain similar as disclosed above.

In some aspects, instead of including operations 610 and 620, the method 600 can comprise an operation of receiving a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence. In such aspects, the methods 600 can include an operation of receiving a second plurality of library molecules immobilized on the support, wherein each of the second plurality of library molecules comprise: a second insert sequence derived from a second sample source and a second sample index sequence, wherein the second sample index sequence comprises a second k-mer sequence and a second universal sample index sequence, the second universal sample index identifying the second sample source of the second insert sequence. In such aspects, instead of including operation 630, the method 600 can comprise an operation of conducting k+1 cycles of sequencing reactions of the first and second k-mer sequence and of a base position of the first universal sample index sequence and the second universal sample index sequence, thereby generating a first plurality of flow cell images. In such aspects, the k-mer sequence and the first cycle right after sequencing the k-mer sequence together are configured to generate balanced or high diversity nucleotide bases in at least 2 or 3 cycles and the base calling template can be generated based on the k+1 cycles together. The additional 1 cycle may but does not need to include a random base. The additional cycle can be from the universal sample index sequence. Alternatively, based on the specific order of sequencing, the additional 1 cycle can be from the insert sequence or any other part of the template molecule. In such aspects, other operations of the method 600 remain similar as disclosed above.

In some aspects, the operations 650 can include determining, by the processor and before conducting one or more cycles of the sequencing reactions of the insert sequence, the base calling template comprising base calling locations based on the pixel intensities and the respective color purity of the pixel intensities, wherein the base calling template is configured for registering a second plurality of flow cell images of the support in one or more cycles subsequent to the k cycles. In such aspects, other operations of the method 600 remain similar as disclosed above.

Methods for Uniplex Library Molecules

In aspects disclosed above, the method 600 are configured for multiplex library molecules, i.e., library molecules from two or more samples. In some aspects, the method 600 and its operations are configured for uniplex library molecules, i.e., library molecules from a single sample. In such aspects, the method does not include operation 620. The operation 610 can remain similar as disclosed above. The operations can be adjusted accordingly to remove: the second plurality of library molecules, the second insert sequence, the second k-mer sequence, or their combinations, which corresponds to a second sample source.

In some aspects, each of the nucleic template molecule can further comprise: a second sample index sequence (e.g., 540 or 560 in FIGS. 5A-5B) having a second universal sample index sequence. In such aspects, the combination of the first and second universal sample index sequences uniquely identifies a sample source of the insert sequence (e.g., 510 in FIG. 5). In some aspects, the second sample index lacks a random sequence (e.g., 561 or 571 in FIG. 5).

In some aspects, each of the first plurality of library molecules further comprise: a third sample index sequence having a third universal sample index sequence. The combination of the first and third universal sample index sequences can uniquely identifies a first sample source of the first insert sequence. In some aspects, the third sample index lacks a k-mer sequence or a random sequence. In some aspects, the third sample index comprises a k-mer sequence or a random sequence. The first sample index sequence may be on the left, i.e., the 5' end, of the first insert sequence, or the right, i.e., the 3' end, of the insert sequence. The third sample index sequence then can be at the opposite end of the insert sequence.

In some aspects, each of library molecule further comprises one or more universal adaptor sequences (e.g., 520, 540 in FIGS. 5A-5B).

For different library molecules from the same sample, each library molecule can have different insert sequences. For different library molecules from the same sample, each library molecule can have identical universal index sequence(s). For different library molecules from the same sample, each library molecule can have different k-mer sequences.

The first sample source of the insert sequences can be genomic DNA, double-stranded cDNA or cell free circulating DNA.

In some aspects, the nucleic acid template molecules are clonally amplified from corresponding library molecules. The nucleic acid template molecules may have one or multiple cloned copies of the corresponding library molecule.

In some aspects, each of the plurality of nucleic acid template molecules is clonally amplified from a corresponding splint complex (e.g., 590 in FIG. 5B) comprising a corresponding library molecule and a corresponding splint molecule/adaptor.

In some aspects, the plurality of nucleic acid template molecules are immobilized at random locations on the support. In some aspects, the plurality of nucleic acid template molecules are immobilized at pre-determined locations on the support. Each of the plurality of nucleic acid template molecules immobilized on the support can correspond to a polony or clonal cluster. The location of the plurality of immobilized template molecules on the support can correspond to base calling locations.

The density of the nucleic acid template molecules on the support can be about $10^2$-$10^{12}$ per mm$^2$. The density of the nucleic acid template molecules on the support can be about $10^4$-$10^8$ per mm$^2$. The density of the nucleic acid template molecules on the support can be about $10^4$-$10^{12}$ per mm$^2$. The density of the nucleic acid template molecules on the support can be about $10^4$-$10^5$ per mm$^2$. The density of the nucleic acid template molecules on the support can be $10^2$-$10^{12}$ per mm$^2$. The density of the nucleic acid template molecules on the support can be $10^4$-$10^8$ per mm$^2$. The density of the nucleic acid template molecules on the support can be $10^4$-$10^{12}$ per mm$^2$. The density of the nucleic acid template molecules on the support can be $10^4$-$10^5$ per mm$^2$ The nucleic acid template molecules can be sequenced when cycles of sequencing reaction is conducted.

The support can comprise one or more substrates. The support can include a glass or plastic substrate. The support can include a transparent top substrate that is closest to the objective lens of the optical system. The support can include one or more microfluidic channels and the template molecules are immobilized to a surface of the microfluidic channels. In some aspects, the support is comprised in a flow cell device.

In some aspects, the support or a portion thereof (e.g., a surface of the microfluidic channel) is passivated with at least one hydrophilic polymer coating having a water contact angle of not more than 45 degrees. The at least one hydrophilic polymer coating can comprise a molecule selected from a group consisting of polyethylene glycol (PEG), poly(vinyl alcohol) (PVA), poly(vinyl pyridine), poly(vinyl pyrrolidone) (PVP), poly(acrylic acid) (PAA), polyacrylamide, poly(N-isopropylacrylamide) (PNIPAM), poly(methyl methacrylate) (PMA), poly(2-hydroxylethyl methacrylate) (PHEMA), poly(oligo(ethylene glycol) methyl ether methacrylate) (POEGMA), polyglutamic acid (PGA), poly-lysine, poly-glucoside, streptavidin, and dextran. In some aspects, the at least one hydrophilic polymer coating comprises branched hydrophilic polymer molecules having at least four branches. In some aspects, the at least one hydrophilic polymer coating comprises polymer molecules having a molecular weight of at least 1000 Daltons.

In some aspects, the k-mer sequence can include 1, 2, 3, 4, 5 or more nucleotide bases. In some aspects, the k-mer sequence comprises a random sequence of at least 2 or 3 nucleotide bases of A, G, C and T/U. In some aspects, the k-mer sequence is a random sequence of nucleotide bases of A, G, C and T/U.

The method 600 can include an operation 630 of conducting k cycles of sequencing reactions of the first and second k-mer sequences. The operation 630 can be performed by a sequencing system disclosed herein, thereby generating a first plurality of flow cell images.

In some aspects, the operation 630 is before conducting one or more cycles of the sequencing reactions of the first and second insert sequences.

In some aspects, the operation 630 is based on an order of sequencing of a sequencing run. The order of sequencing can comprise: sequencing the k-mer sequence; then sequencing the first universal sample index sequence; then sequencing the first insert sequence. The order of sequencing can comprise: sequencing the first universal sample index sequences; then sequencing the k-mer sequence; and then sequencing the first insert sequence. The order of sequencing can comprise: sequencing the k-mer sequence; and then sequencing the first insert sequence; and then sequencing the first universal sample index sequence. The order of sequencing can comprise: sequencing a number of bases (e.g., first 3-8 bases) the first insert sequence; sequencing the k-mer sequence; then sequencing the first universal sample index sequence. In an order of sequencing, sequencing the third sample index sequence can occur after sequencing the first sample index sequence, when the third sample index sequence lack a random sequence.

In some aspects, the first plurality of flow cell images are from 2, 3, 4, 5, or 6 different color channels in each sequencing cycle. In some aspects, the first plurality of flow cell images are from k cycles or k+1 sequencing cycles, and each cycle comprises: a balanced diversity of nucleotide bases of A, G, C and T/U among the plurality of nucleic acid template molecules immobilized on the support.

In some aspects, each cycle of the sequencing reactions is polymerase-mediated. The operation 630 of conducting k cycles of the sequencing reactions of the k-mer sequence can comprise: contacting polonies of nucleotide acids or the plurality of nucleic acid template molecules using a plurality of nucleotide reagents comprising a mixture of different types of nucleotide bases A, G, C and T/U. In some aspects, individual nucleotide reagent comprises a different detectable color label that corresponds with each different type of nucleotide base.

In some other aspects, the operation 630 of conducting k cycles of the sequencing reactions of the k-mer sequence comprises: contacting polonies of nucleotide acids or the plurality of nucleic acid template molecules with a plurality of sequencing primers, a plurality of polymerases and a mixture of different types of avidites. An individual avidite in the mixture comprise a core attached with multiple nucleotide arms and each arm of the individual avidite comprises the same type of nucleotide base.

In some aspects, the operation 630 of conducting k cycles of the sequencing reactions of the k-mer sequence comprises imaging, by an optical system herein, optical color signals emitted from the nucleotide reagents that are bound to the template molecules. In some aspects, the operation 630 of conducting k cycles of the sequencing reactions of the k-mer sequence comprises in each of the k cycles, acquiring, by an optical system herein, the first plurality of flow cell images comprising optical color signals emitted from the nucleotide reagents that are bound to the template molecules.

The first plurality of flow cell images are generated in k cycles corresponding to the conducting sequencing reaction in the k-mer sequence. The first plurality of flow cell images can comprise optical signals emitted from nucleotide reagents bound to a balanced diversity of nucleotide bases of A, G, C and T/U among the plurality of nucleic acid template molecules immobilized on the support in the k cycles.

The balanced diversity of nucleotide bases of A, G, C and T/U among the plurality of nucleic acid template molecules can comprise: a percentage of (1) a number of each type of nucleotide bases to (2) a total number of bases in the one or more cycles. The percentage can be more than 10%, 15%, or 20%. For example, the unbalanced diversity of nucleotide bases includes a number of nucleotide bases A, G, C, T that is 26%, 15%, 27%, and 32% respectively of the total number of all nucleotide bases among the template molecules of a cycle.

The method 600 can comprise an operation 640 of determining pixel intensities and a respective color purity of each of the pixel intensities for pixels of the first plurality of flow cell image. The operation 640 can be performed by the processor disclosed herein. Each of the pixel intensities can comprise an intensity of the pixel and/or one or more subpixel intensities of the subpixels corresponding to the pixel. The respective color purity of each of the pixel intensities can comprise: one color purity of the pixel and/or one or more color purities corresponding to the one or more subpixel intensities of the corresponding pixel. The respective color purity of each of the pixel intensities can comprise: the respective color purity for one or more color channels.

Determining the respective color purity of each of the pixel intensities can comprise: determining a ratio of (1) a signal corresponding to a particular type of nucleotide base to (2) a total amount of signal for other types of nucleotide bases.

Determining the pixel intensities can comprise: determining each channel intensity in a set of channel intensities, each channel corresponding to a respective different fluorescent wavelength. Such determination can be based on a comparison of a set of channel intensities at the corresponding pixel or one or more subpixel locations.

The method 600 can comprise an operation 650 of determining a base calling template comprising base calling locations based on the pixel intensities and the respective color purity of the pixel intensities determined in operation 640.

As disclosed herein, the operation of determining a base calling template based on the pixel intensities and the respective color purity of the pixel intensities can comprise: for each of the pixels or subpixels, determining whether or not the respective color purity is greater than a color purity of other pixels or subpixels within a threshold distance. In response to determining that the respective color purity is greater than the color purity of other pixels or subpixels within the threshold distance, adding a location of the corresponding pixel or subpixel to a base calling template. In response to determining that the respective color purity is no greater than the color purity of the other pixels or subpixels within the threshold distance, making no changes to the base calling template, and move on to a next pixel to repeat the determining operation until all the pixels or at least a subset of the pixels have been through the similar determining operation.

After the template is determined, the base calling template, or equivalent, the template, is configured for registering flow cell images in a sequence run, e.g., a second plurality of flow cell images of the flow cell device in one or more cycles subsequent to the k cycles.

During a single sequencing run, base calling locations, i.e., polonies or clusters, may shift, rotate, or otherwise spatially transform from cycle to cycle and/or cross channels. As a result, a template is needed to ensure that base calling locations in a sequencing run be aligned spatially and base calls are accurately assigned to corresponding polonies, template molecules, and samples. It can be advantageous to generate the template early and allow registration of base calling locations in subsequent cycles. Early generation of the template can also advantageously reduce delay in primary analysis of flow cell images in subsequent cycles and allow real-time primary analysis while a sequencing run is still running. For example, if the template is generated using first 3-5 cycles, at cycle 6, primary analysis can be performed in real-time after flow cell images in cycle are acquired and in parallel with sequencing and imaging operations in cycle 7. Similar analysis of each cycle can be performed accordingly. As such, the primary analysis can be finished shortly after if not when the sequencing run is completed.

In some aspects, the method 600 can further comprise an operation of conducting the one or more cycles of sequencing reactions of the first insert sequence, thereby generating the second plurality of flow cell images. In aspects with at least two different samples, the method can further comprise an operation of conducting, by the sequencing system, the one or more cycles of sequencing reactions of the first and second insert sequences, thereby generating the second plurality of flow cell images.

The second plurality of flow cell images are generated in one or more cycles subsequent to the k cycles corresponding to conducting sequencing reaction in the k-mer sequence. The second plurality of flow cell images can comprise optical signals emitted from nucleotide reagents bound to a unbalanced diversity of nucleotide bases of A, G, C and T/U among the plurality of nucleic acid template molecules immobilized on the support in such one or more cycles. The one or more cycles can correspond to sequencing reaction of parts of the template molecules that does not include the k-mer sequence. For example, the one or more cycles can correspond to at least part of the optional second sample index sequence or the insert sequence.

The unbalanced diversity of nucleotide bases of A, G, C and T/U among the plurality of nucleic acid template molecules can comprise: a percentage of (1) a number of one or more types of nucleotide bases to (2) a total number of bases. The percentage can be less than 20%, 15%, 10%, or 5% in the one or more cycles. For example, the unbalanced diversity of nucleotide bases includes a number of nucleotide base A that is about 5% of the total number of all nucleotide bases among the template molecules of a cycle. As another example, the unbalanced diversity of nucleotide bases includes a number of nucleotide base C that is about 8% and T that is about 1% of the total number of all nucleotide bases among the template molecules of a cycle.

In some aspects, the method 600 can further comprise an operation of registering or align the second plurality of flow cell images from the one or more subsequent flow cycles to the base calling template. In some aspects, the operation of registering the second plurality of flow cell images can comprise generating coordinates of polonies in the second plurality of flow cell images in a common coordinate system. The base calling template is also in the coordinate system. In some aspects, the coordinates of polonies can be saved in a one dimensional vector or list. Each entry of the vector or list can include a unique identification of a polony, its coordinates, and other relevant information, such as the pixel intensities in one or more channels of a cycle.

In some aspects, the method 600 can further comprise an operation of performing base calling of the second plurality of flow cell images at the base calling locations in the base calling template using signals from the registered second plurality of flow cell images. The base calls in primary analysis herein can be based on registered image intensities in the common coordinate system. In some aspects, base calling are performed only at base calling locations in the template. In other words, the template functions as a polony map that identifies all the accurate polony locations on the flow cell and ignores other signal locations that are unlikely to be polonies. As disclosed herein, the base calling locations can be at subpixel locations.

In some aspects, instead of including operations 610 and 620, the method 600 can comprise an operation of receiving a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence. In such aspects, other operations of the method 600 remain similar as disclosed above with respect to the uniplex library molecules.

In some aspects, instead of including operation 630, the method 600 can comprise an operation of conducting k+1 cycles of sequencing reactions of the first and second k-mer sequence and of a base position downstream the k-mer sequence, thereby generating a first plurality of flow cell images. In such aspects, the k-mer sequence and the first cycle right after sequencing the k-mer sequence together are configured to generate balanced or high diversity nucleotide bases in at least 2 or 3 cycles and the base calling template can be generated based on the k+1 cycles together. The additional 1 cycle may but does not need to include a random base. The additional 1 cycle can be from the universal sample index sequence. Alternatively, based on the specific order of sequencing, the additional 1 cycle can be from the insert sequence or any other part of the template molecule. In such aspects, other operations of the method 600 remain similar as disclosed above with respect to the uniplex library molecules.

In some aspects, instead of including operations 610 and 620, the method 600 can comprise an operation of receiving a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence. In such aspects, instead of including operation 630, the method 600 can comprise an operation of conducting k+1 cycles of sequencing reactions of the first and second k-mer sequence and of a base position downstream of the k-mer sequence, thereby generating a first plurality of flow cell images. In such aspects, the k-mer sequence and the first cycle right after sequencing the k-mer sequence together are configured to generate balanced or high diversity nucleotide bases in at least 2 or 3 cycles and the base calling template can be generated based on the k+1 cycles together. The additional 1 cycle may but does not need to include a random base. The additional 1 cycle can be from the universal sample index sequence. Alternatively, based on the specific order of sequencing, the additional 1 cycle can be from the insert sequence or any other part of the template molecule. In such aspects, other operations of the method 600 remain similar as disclosed above.

In some aspects, the operations 650 can include determining, by the processor and before conducting one or more cycles of the sequencing reactions of the insert sequence, the base calling template comprising base calling locations based on the pixel intensities and the respective color purity of the pixel intensities, wherein the base calling template is configured for registering a second plurality of flow cell images of the support in one or more cycles subsequent to the k cycles. In such aspects, other operations of the method 600 remain similar as disclosed above with respect to the uniplex library molecules.

Methods for Sequencing Template Molecules with Unbalanced Diversity

Generally, it is desirable to prepare nucleic acid libraries that will be distributed onto a support (e.g., coated flow cell), where the library molecules are converted into template molecules that are immobilized at a high density to the support for massively parallel sequencing. For template molecules that are immobilized at high densities e.g., at random locations on the support, resolving high density fluorescent images for accurate base calling during sequencing runs can become challenging. The methods disclosed herein allows base calling of polonies or clusters of relative high density, e.g., $10^4$-$10^{12}$ template molecules or polonies per mm$^2$.

The nucleotide diversity of a population of immobilized template molecules can refer to the relative proportion of nucleotides A, G, C and T/U that are present in a sequencing cycle. A high diversity library can generally include sequence-of-interest (insert) regions having approximately equal proportions of all four nucleotides represented in each cycle of a sequencing run. A low diversity library can generally include sequence-of-interest (insert) regions having a high proportion of certain nucleotides and low proportion of other nucleotides. To overcome the problem of low diversity libraries, a small amount of a high diversity library prepared from PhiX bacteriophage is typically mixed with the library-of-interest (e.g., PhiX spike-in library) and sequenced together on the same flow cell. While the PhiX library spike-in library can provide nucleotide diversity it also occupies space on the flow cell thereby replacing the target libraries carrying the sequence-of-interest and reduces the amount of sequencing data obtainable from the target libraries (e.g., reduces sequencing throughput). Another method to overcome the problem of low diversity libraries can be to prepare target library molecules having at least one sample index sequence that is designed to be color-balanced, thus with high diversity. However it may be desirable to design a large number of sample index sets, for example a set of single index sample sequences or paired index sample sequences for 16-plex, 24-plex, 96-plex or larger plexy levels. It can be challenging to design sample index sequences, as a single or paired sample indexes, for large sample index sets where all of the sample index sequences are color-balanced.

Another method to overcome the challenges of sequencing low diversity library molecules (e.g., at high density on the support) is to prepare libraries having at least one sample index sequence comprising a short k-mer sequence (e.g., NNN) linked directly to a universal sample index sequence, where the k-mer sequence provides nucleotide diversity and color balance. In a population of sample-indexed library molecules, the k-mer sequence of the sample index provides high nucleotide diversity which includes approximately equal proportions of all four nucleotides (e.g., A, G, C, T and/or U) that will be represented in each cycle of a sequencing run. The high nucleotide diversity of the k-mer sequence also provide color balance during each cycle of the sequencing run. The advantage of designing sample indexes to include a k-mer sequence (e.g., NNN) is that, in a low-plexy population of library molecules (e.g., 2-plex or 4-plex), the universal sample index sequences that identify the two or four different samples need not exhibit nucleotide diversity. Additionally, the nucleotide diversity of the k-mer sequence (e.g., NNN) can obviate the need to include a PhiX spike-in library, or permits use of a reduced amount of PhiX spike-in library to be distributed onto the flow cell and sequenced.

The target library molecule can include a single sample index sequence which includes a k-mer sequence (e.g., sample index) and a universal sample index sequence. FIG. 5 shows an exemplary linear library molecule (500) comprising a k-mer sequence and a second optional k-mer sequence (571) (561). The exemplary linear library molecule (500) can also comprise a universal sample index sequence and an optional second universal sample index sequence (570) (560). In some aspects, the sequencing data from only the single sample index sequence (e.g., 570 or 560 in FIG. 5) is used for polony mapping and base calling template registration because the k-mer sequence (e.g., NNN) provides sufficient nucleotide diversity and color balance. The sequencing data from the universal sample index sequence can be used to distinguish sequences of interest obtained from different sample sources in a multiplex assay.

The target library molecule can further include a second sample index sequence (e.g., dual sample index) comprising a second universal sample index sequence. In some aspects, the sequencing data from only the single sample index sequence is used for polony mapping and/or base calling template registration because the k-mer sequence provides sufficient nucleotide diversity and color balance, and also because the polony mapping and/or base calling template registration is preferred in earlier sequencing cycles of a sequence run to provide base calling template in subsequent cycles. The sequencing data from the first universal sample index sequence and the second universal sample index sequence can be used as dual sample indexes to distinguish sequences of interest obtained from different sample sources in a multiplex assay. In some aspects, the second sample index sequence (e.g., may or may not include a second k-mer sequence (e.g., NNN).

The order of sequencing the sequence-of-interest region and the sample index region(s) can also be used to improve the challenges of sequencing low diversity library molecules. For example, the sample index region can be sequenced first before sequencing the sequence-of-interest region, and the sample index sequence can be associated with the sequence-of-interest region. For example, sample index region can be sequenced first including sequencing the k-mer sequence (e.g., NNN) and optionally sequencing at least a portion of the universal sample index), and then sequencing the sequence-of-interest region. In a population of sample indexed library molecules, the k-mer sequence (e.g., NNN) provides nucleotide diversity which may not be provided the sequence-of-interest regions of the library molecules. The sequence of the sample index provides improved nucleotide diversity and color balance for polony mapping and template registration.

Additionally, when sequencing the sample index region first, the length of the sequenced sample index region is relatively short (e.g., less than 30 nucleotides in length) so that de-hybridization of the product of the sequenced sample index region is more complete. Gentler de-hybridization conditions can be used to remove most or all of the product of the sequenced sample index region which reduces the level of residual signals from any sequencing products remaining hybridized to the template molecules. By contrast, the sequence-of-interest region is typically much longer than the sample index region (e.g., more than 100 nucleotides in length). When the sequence-of-interest region is sequenced before the sample index region, the product of the sequenced sequence-of-interest region must be subjected to harsher de-hybridization conditions to remove any products remaining hybridized to the template molecules which may damage the template molecules.

The present disclosure provides nucleic acid library molecules (500) each comprising at least one sample index sequence that can be used to distinguish sequences of interest obtained from different sample sources in a multiplex assay, where the at least one sample index sequence comprises a k-mer sequence (e.g., NNN) linked to a universal sample index sequence. In some aspects, the left sample index comprises a k-mer sequence (e.g., NNN) linked to a universal left sample index sequence and/or the right sample index comprises a k-mer sequence (e.g., NNN) linked to a right universal sample index sequence. The at least one sample index sequence can include sequence diversity for improved base calling. The at least one sample index sequence can be used to improve base calling accuracy.

In some aspects, the k-mer sequence (e.g., NNN) is positioned upstream of the universal sample index sequence so that during a sequencing run the k-mer sequence portion is sequenced before the universal sample index sequence. The upstream of the universal sample index sequence can be either on the left or right side of the universal sample index sequence depending on the sequencing or read order. In other words, the upstream of the universal sample index sequence can be either on the left or right side of the universal sample index sequence depending on whether sequencing the universal sample index sequence is from the '5 end or '3 end. In some aspects, the k-mer sequence is positioned downstream of the universal sample index sequence so that during a sequencing run the k-mer portion is sequenced after the universal sample index sequence. The downstream of the universal sample index sequence can be either on the right or left side of the universal sample index sequence depending on the sequencing or read order. In other words, the downstream of the universal sample index sequence can be either on the right or left side of the universal sample index sequence depending on whether sequencing the universal sample index sequence is from the '5 end or '3 end. As shown in FIG. 5, in an exemplary aspect, the upstream of the universal sample index sequence 570 is on the left side of the index sequence when the reading or sequencing of the universal sample index sequence 570 is from the '5 end to the 3' end. In the same aspect, the upstream of the second universal sample index sequence 560 is on the right hand side there of when the reading or sequencing of the second of the second universal sample index sequence 560 is from the '5 end to the 3' end.

In some aspects, in the k-mer sequence, one or more bases are independently and randomly selected from A, G, C, T or U. In some aspects, in the k-mer sequence, one or more bases are independently and randomly selected from A, G, C, T or U such that the k-mer sequence lacks consecutive repeat sequences having 2 or 3 of the same nucleotide base, for example AA, TT, CC, GG, UU, AAA, TTT, CCC, GGG or UUU. In some aspects, in a population of library molecules the universal sample index sequences include a k-mer sequence having a high diversity sequence which includes approximately equal proportions of all four nucleotides (e.g., A, G, C, T and/or U) that will be represented in each cycle of a sequencing run.

In some aspects, the k-mer sequence comprises 1-20 nucleotides, or 1-10 nucleotides, or 2-8 nucleotides, or 3-6 nucleotides, or 3-5 nucleotides, or 3-4 nucleotides.

In some aspects, the k-mer sequence includes, but is not limited to, AGC, AGT, GAC, GAT, CAT, CAG, TAG, TAC. The skilled artisan will recognize that many more random sequences can be prepared (e.g., 64 possible combinations) where each base "N" at a given position in the k-mer sequence is independently selected from A, G, C, T or U.

In some aspects, the universal sample index sequence comprises 3-20 nucleotides, or 7-18 nucleotides, or 9-16 nucleotides.

In some aspects, the k-mer sequence include one or more random nucleotide bases. In some aspects, k is an integer that is greater than 0 and less than 10. In some aspects, k is 3 and the k-mer sequence is NNN, wherein each "N" represents a randomly and independently selected base from A, G, C, T, and U. In some aspects, k is 1, 2, 3, 4, or 5. In some aspects, k is 3 and the k-mer sequence include at least 2 random nucleotide bases. In some aspects, k is 4 and the k-mer sequence include at least 2 or 3 random nucleotide bases.

In some aspects, the k-mer sequence (e.g., 571 or 561) is combined with one or more bases from the universal sample index sequence adjacent to the k-mer sequence for providing high diversity nucleotide bases and for generating the polony map or base calling template disclosed herein. Disclosed herein, the "polony map" can be equivalent to the "base calling template" which contains base calling locations in a common coordinate system.

In some aspects, individual right sample index sequences in a population of right sample index sequences comprise a universal sample index sequence (e.g., 570 in FIG. 5) and a k-mer sequence (e.g. 571 in FIG. 5). In some aspects, the k-mer sequences in the population of right sample index sequences have an overall base composition of about 25% or about 15-35% of all four nucleotide bases (e.g., A, G, C and T/U) to provide nucleotide diversity at each sequencing cycle during sequencing the k-mer sequence.

In some aspects, in the population of right sample index sequences the proportion of adenine (A) at any given position in the k-mer sequence is about 20-30% or about 15-35% or about 10-40%. In some aspects, in the population of right sample index sequences the proportion of guanine (G) at any given position in the k-mer sequence is about 20-30% or about 15-35% or about 10-40%. In some aspects, in the population of right sample index sequences the proportion of cytosine (C) at any given position in the k-mer sequence is about 20-30% or about 15-35% or about 10-40%. In some aspects, in the population of right sample index sequences the proportion of thymine (T) or uracil (U) at any given position in the k-mer sequence is about 20-30% or about 15-35% or about 10-40%.

In some aspects, in the population of right sample index sequences the proportion of adenine (A) and thymine (T), or the proportion of adenine (A) and uracil (U), at any given position in the k-mer sequence is about 10-65%. In some aspects, in the population of right sample index sequences the proportion of guanine (G) and cytosine (C) at any given position in the k-mer sequence is about 10-65%.

In some aspects, in the population of right sample index sequences the sequence diversity of the k-mer sequences ensures that no sequencing cycle is presented with fewer than four different nucleotide bases during sequencing at least the k-mer sequence. In some aspects, in the population of right sample index sequences the sequence diversity of the k-mer sequences ensures that no sequencing cycle is presented with fewer than 3 different nucleotide bases during sequencing at least the k-mer sequence.

As disclosed herein, "unbalanced diversity" is used interchangeably as "low diversity" and "balanced diversity" is used interchangeably as "high diversity."

Exemplary sample index sequence that include a k-mer sequence linked directly to a universal sample index sequence include but are not limited to: NNNGTAGGAGCC (SEQ ID NO: 1); NNNCCGCTGCTA (SEQ ID NO: 2); NNNAACAACAAG (SEQ ID NO: 3); NNNGGTGGTCTA (SEQ ID NO: 4); NNNTTGGCCAAC (SEQ ID NO: 5); NNNCAGGAGTGC (SEQ ID NO: 6); and NNNATCACACTA (SEQ ID NO: 7). The skilled artisan will recognize that the universal sample index can be any length and have any sequence that can be used to distinguish sequences of interest obtained from different sample sources in a multiplex assay. In a population of a given sample index, for example NNNGTAGGAGCC (SEQ ID NO: 1), the population contains a mixture of individual sample index molecules each carrying the same universal sample index sequence (e.g., GTAGGAGCC) and a different k-mer sequence (e.g., NNN) where up to 64 different k-mer sequences may be present in the population of the given sample index.

In some aspects, the k-mer sequence (e.g., NNN or NNNN) provides a balanced ratio of nucleo-bases adenine, cytosine, guanine, thymine and/or uracil. In some aspects, in a population of sample-indexed library molecules, the k-mer sequence together with at least a portion of the universal sample index sequence provide a balanced ratio of nucleo-bases adenine, cytosine, guanine, thymine and/or uracil represented in each cycle of a sequencing run. In some aspects, in a population of sample-indexed library molecules, the k-mer sequence together with 1, 2, 3, or more bases of the universal sample index sequence provide a balanced ratio of nucleo-bases adenine, cytosine, guanine, thymine and/or uracil represented in each cycle of a sequencing run.

In some aspects, a sequencing reaction includes use of polymerases and nucleotides (e.g., nucleotide analogs) that are labeled with a different fluorophore that corresponds to the nucleo-base. In some aspects, sequencing the k-mer sequence (e.g., NNN) using labeled nucleotides provides a balanced ratio of fluorescent colors that correspond to the nucleo-bases adenine, cytosine, guanine, thymine and/or uracil in each cycle of a sequencing run. In some aspects, sequencing the k-mer sequence (e.g., NNN) and at least a portion of the universal sample index sequence using labeled nucleotides provides a balanced ratio of fluorescent colors that correspond to nucleo-bases adenine, cytosine, guanine, thymine and/or uracil. The labeled nucleotides emit fluorescent signals during the sequencing reactions.

In some aspects, the sequencing reaction is conducted on a sequencing system (e.g., 110 in FIG. 1) disclosed herein. The sequencing system can have an optical system that captures fluorescent images from sequencing reactions on the immobilized template molecules. The sequencing system can be configured to relay the fluorescent imaging data captured by the optical system to a processor (e.g., 400 in FIG. 4) disclosed herein. The processor can be programmed to perform one or more operations disclosed herein for determining the location (e.g., mapping) of the immobilized template molecules on the flow cell. The location (e.g., mapping) of the immobilized template molecules on the flow cell can be equivalent to the base calling locations herein. The processor can generate a template of the base calling locations of the immobilized template molecules based on the fluorescent imaging data of only the k-mer sequence (e.g., NNN), or based on the k-mer sequence (e.g., NNN) and at least a portion the universal sample index sequence. Thus the few numbers of sequencing cycles used to sequence the k-mer sequence (e.g., NNN) and optionally a portion of the universal sample index sequence can be used to generate a map of the location of the immobilized template molecules which is equivalent to a template of the base calling locations on the flow cell. The processor can be configured to extract the fluorescent color and intensity of only the k-mer sequence (e.g., NNN), or the k-mer sequence (e.g., NNN) and at least a portion of the universal sample index sequence. The processor can be configured to use the location of a given immobilized template molecule and the fluorescent color and intensity associated with the given template molecule (which were established while sequencing the k-mer sequence) for base calling while sequencing the insert region. The processor can be configured to detect phasing and pre-phasing while sequencing the k-mer sequence (e.g., NNN) and the universal sample index sequence, and the insert region. In some aspects, the balanced ratio of fluorescent colors provided by the k-mer sequence (e.g., NNN) at each sequencing cycle can improve the quality of the data which is processed from the fluorescent images captured by the optical system, and can in turn improve the capability by the processor to determine the location of the immobilized template molecules on the flow cell, and the color and intensity, all of which can improve base calling accuracy and quality scores of the sequenced insert region.

In some aspects, a sequencing reaction includes use of polymerases and multivalent molecules that are labeled with a different fluorophore that corresponds to the nucleo-base (e.g., adenine, guanine, cytosine, thymine or uracil) of the nucleotide units that are attached to the nucleotide arms in a given multivalent molecule. In some aspects, the core of individual multivalent molecules is attached to a fluorophore which corresponds to the nucleotide units (e.g., adenine, guanine, cytosine, thymine or uracil) that are attached to the nucleotide arms in a given multivalent molecule. In some aspects, at least one of the nucleotide arms of the multivalent molecule comprises a linker and/or nucleotide base that is attached to a fluorophore, and wherein the fluorophore which is attached to a given linker or nucleotide base corresponds to the nucleotide base (e.g., adenine, guanine, cytosine, thymine or uracil) of the nucleotide arm. In some aspects, sequencing the k-mer sequence (e.g., NNN) using labeled multivalent molecules provides a balanced ratio of fluorescent colors that correspond to the nucleo-bases adenine, cytosine, guanine, thymine and/or uracil in each cycle of a sequencing run. In some aspects, sequencing the k-mer sequence (e.g., NNN) and at least a portion of the universal sample index sequence using labeled multivalent molecules provides a balanced ratio of fluorescent colors that correspond to nucleo-bases adenine, cytosine, guanine, thymine and/or uracil. The labeled multivalent molecules emit fluorescent signals during the sequencing reactions.

In some aspects, the sequencing reaction is conducted on a sequencing system (e.g., 110 in FIG. 1) having an optical system that captures fluorescent images from sequencing reactions on the immobilized template molecules. The sequencing apparatus can be configured to relay the fluorescent imaging data captured by the detector to a processor (e.g., 400 in FIG. 4) that is programmed to determine the location (e.g., mapping) of the immobilized template molecules (polonies) which is equivalent to the base calling locations on the flow cell. The processor can generate a map of the locations of the immobilized template molecules based on the fluorescent imaging data of only the k-mer sequence (e.g., NNN), or based on the k-mer sequence (e.g., NNN) and at least a portion of the universal sample index sequence. Thus the few numbers of sequencing cycles used to sequence the k-mer sequence (e.g., NNN) and optionally a portion of the universal sample index sequence can be used to generate a map of the location of the immobilized template molecules. The processor can be configured to extract the fluorescent color and intensity of only the k-mer sequence (e.g., NNN) or the k-mer sequence (e.g., NNN) and the universal sample index sequence. The processor can be configured to use the location of a given immobilized template molecule and the fluorescent color and intensity associated with the given template molecule (which were established while sequencing the k-mer sequence) for base calling while sequencing the insert region. The processor can be configured to detect phasing and pre-phasing while sequencing the k-mer sequence (e.g., NNN) and the universal sample index sequence, and the insert region. In some aspects, the balanced ratio of fluorescent colors provided by the k-mer sequence (e.g., NNN) at each sequencing cycle can improve the quality of the data which is processed from the fluorescent images captured by the detector, and can in turn improve the capability by the processor to determine the location of the immobilized template molecules on the flow cell, and the color and intensity, all of which can improve base calling accuracy and quality scores of the sequenced insert region.

Orders of Sequencing

In some aspects, the order of conducting multiple cycles sequencing reactions comprises: (1) sequencing the right sample index where the right index comprises a first k-mer sequence (e.g., 571 in FIG. 5) and a right universal sample index sequence (e.g., 570 in FIG. 5); (2) sequencing the left sample index; and (3) sequencing the insert region (510). In some aspects, the left sample index comprises a left universal sample index sequence (e.g., 560 in FIG. 5). In some aspects, the left sample index comprises a second k-mer sequence (e.g., 561 in FIG. 5) and a left universal sample index sequence. In some aspects, sequencing the right sample index region, including the first k-mer sequence (e.g., NNN) and right universal sample index sequence, may provide enough nucleotide diversity for the purpose of generating the base calling template so that sequencing the left sample index can be omitted.

In some aspects, methods for conducting the sequencing reactions for multiple cycles corresponding to the template molecules immobilized to a support, wherein individual template molecules (e.g., 500 in FIG. 5) comprise: (i) a universal binding sequence for a first surface primer (520), (ii) a left sample index sequence having a universal left sample index sequence (560), (iii) a universal binding sequence for a forward sequencing primer (540), (iv) a sequence of interest (510), (v) a universal binding sequence for a reverse sequencing primer (550), (vi) a right sample index sequence having a k-mer sequence (e.g., NNN) (571) linked directly to a right universal sample index sequence (560), and (vii) a universal binding sequence for a second surface primer (130), wherein the method comprises step (a): hybridizing the template molecules with a first plurality of soluble sequencing primers that hybridize to the universal binding sequence for a reverse sequencing primer and sequencing the right sample index sequence including sequencing the k-mer sequence (e.g., NNN) and the right universal sample index sequence thereby generating a first plurality of sample index extension products that are hybridized to the immobilized template molecules, wherein the first plurality of sample index extension products are complementary to the right sample index sequence having a k-mer sequence (e.g., NNN) linked directly to a right universal sample index sequence.

In some aspects, the methods for sequencing further comprise step (b): removing the first plurality of sample index extension products and retaining the immobilized template molecules.

In some aspects, the methods for sequencing further comprise step (c): hybridizing the retained immobilized template molecules with a second plurality of soluble sequencing primers that hybridize to the universal binding sequence for the first surface primer (520) and sequencing the left sample index sequence thereby generating a second plurality of sample index extension products that are hybridized to the immobilized template molecules, wherein the second plurality of sample index extension products are complementary to the left sample index sequence having a left universal sample index sequence.

In some aspects, the methods for sequencing further comprise step (d): removing the second plurality of sample index extension products and retaining the immobilized template molecules.

In some aspects, the methods for sequencing further comprise step (e): hybridizing the retained immobilized template molecules with a third plurality of soluble sequencing primers that hybridize to the universal binding sequence for the forward sequencing primer (540) and sequencing the insert region (510) thereby generating a plurality of insert extension products that are hybridized to the immobilized template molecules, wherein the plurality of insert extension products are complementary to the sequence of interest (510).

In some aspects, the methods for sequencing further comprise step (f1): assigning the sequence of (i) the insert region (510) to (ii) the right sample index sequence having a k-mer sequence (e.g., NNN) linked directly to a right universal sample index sequence, thereby identifying the insert region as being obtained from a first source.

In some aspects, the methods for sequencing further comprise step (f2): assigning the sequence of (i) the insert region (510) to (ii) the right sample index sequence having a k-mer sequence (e.g., NNN) linked directly to a right universal sample index sequence, and (iii) the left sample index sequence, thereby identifying the insert region as being obtained from a first source.

In some aspects, the removing of the plurality of sequencing extension products of steps (b) and (d) can be conducted using a denaturation reagent comprising SSC (e.g., saline-sodium citrate) buffer with or without formamide, at a temperature that promotes nucleic acid denaturation such as for example 50-90° C.

In some aspects, the sequencing of steps (a), (c) and (e) include conducting any of the sequencing methods described herein that employ sequencing polymerases and detectably labeled nucleotide analogs. In some aspects, the sequencing of steps (a), (c) and (e) include conducting any of the two-stage sequencing methods described herein that employ sequencing polymerases, detectably labeled multivalent molecules, and nucleotide analogs. In some aspects, the sequencing of steps (a), (c) and (e) include conducting any of the sequencing-by-binding methods described herein.

In some aspects, the density of the plurality of template molecules immobilized to the support is about $10^2$-$10^{15}$ per $mm^2$. In some aspects, the density of the plurality of template molecules immobilized to the support is about $10^4$-$10^{12}$ per $mm^2$. In some aspects, the density of the plurality of template molecules immobilized to the support is about $10^4$-$10^8$ per $mm^2$. In some aspects, the density of the plurality of template molecules immobilized to the support is $10^2$-$10^{15}$ per $mm^2$. In some aspects, the density of the plurality of template molecules immobilized to the support is $10^4$-$10^{12}$ per $mm^2$. In some aspects, the density of the plurality of template molecules immobilized to the support is $10^4$-$10^8$ per $mm^2$. In some aspects, the plurality of template molecules are immobilized at random locations on the support. In some aspects, the plurality of template molecules are immobilized on the support in a predetermined pattern.

In some aspects, the order of sequencing comprises: (1) sequencing the right sample index where the right index comprises a k-mer sequence (e.g., NNN) and a universal sample index sequence; (2) sequencing the insert region; and (3) sequencing the left sample index. In some aspects, the left sample index comprises a left universal sample index sequence. In some aspects, the left sample index comprises a second k-mer sequence (e.g., NNN) and a left universal sample index sequence. In some aspects, sequencing the right sample index region, including the first random sequence (e.g., NNN) and right universal sample index sequence, may provide enough nucleotide diversity for the purpose of generating a base calling template herein so that sequencing the left sample index can be omitted.

In some aspects, methods for sequencing the template molecules immobilized to a support, wherein individual template molecules comprise: (i) a universal binding sequence for a first surface primer (520), (ii) a left sample index sequence having a left universal sample index sequence (iii) a universal binding sequence for a forward sequencing primer (540), (iv) a sequence of interest (510), (v) a universal binding sequence for a reverse sequencing primer (550), (vi) a right sample index sequence having a k-mer sequence (e.g., NNN) linked directly to a right universal sample index sequence, and (vii) a universal binding sequence for a second surface primer (530), wherein the method comprises step (a): hybridizing the template molecules with a first plurality of soluble sequencing primers that hybridize to the universal binding sequence for a reverse sequencing primer (550) and sequencing the right sample index sequence including sequencing the k-mer sequence (e.g., NNN) and the right universal sample index sequence thereby generating a first plurality of sample index extension products that are hybridized to the immobilized template molecules, wherein the first plurality of sample index extension products are complementary to the right sample index sequence having a k-mer sequence (e.g., NNN) linked directly to a right universal sample index sequence.

In some aspects, the methods for sequencing further comprise step (b): removing the first plurality of sample index extension products and retaining the immobilized template molecules.

In some aspects, the methods for sequencing further comprise step (c): hybridizing the retained immobilized template molecules with a second plurality of soluble sequencing primers that hybridize to the universal binding sequence for a forward sequencing primer (540) and sequencing the insert region (510) thereby generating a plurality of insert extension products that are hybridized to the immobilized template molecules, wherein the plurality of insert extension products are complementary to the sequence of interest (510).

In some aspects, the methods for sequencing further comprise step (d): removing the plurality of insert extension products and retaining the immobilized template molecules.

In some aspects, the methods for sequencing further comprise step (e): hybridizing the retained immobilized template molecules with a third plurality of soluble sequencing primers that hybridize to the universal binding sequence for a first surface primer (520) and sequencing the left sample index sequence thereby generating a second plurality of sample index extension products that are hybridized to the immobilized template molecules, wherein the second plurality of sample index extension products are complementary to the left sample index sequence having a left universal sample index sequence.

In some aspects, the methods for sequencing further comprise step (f1): assigning the sequence of (i) the insert region (510) to (ii) the right sample index sequence having a k-mer sequence (e.g., NNN) linked directly to a right universal sample index sequence, thereby identifying the insert region as being obtained from a first source.

In some aspects, the methods for sequencing further comprise step (f2): assigning the sequence of (i) the insert region (510) to (ii) the right sample index sequence having a k-mer sequence (e.g., NNN) linked directly to a right universal sample index sequence, and (iii) the left sample index sequence, thereby identifying the insert region as being obtained from a first source.

In some aspects, the removing of the plurality of sequencing extension products of steps (b) and (d) can be conducted using a denaturation reagent comprising SSC (e.g., saline-sodium citrate) buffer with or without formamide, at a temperature that promotes nucleic acid denaturation such as for example 50-90° C.

In some aspects, the sequencing of steps (a), (c) and (e) include conducting any of the sequencing methods described herein that employ sequencing polymerases and detectably labeled nucleotide analogs. In some aspects, the sequencing of steps (a), (c) and (e) include conducting any of the two-stage sequencing methods described herein that employ sequencing polymerases, detectably labeled multivalent molecules, and nucleotide analogs. In some aspects, the sequencing of steps (a), (c) and (e) include conducting any of the sequencing-by-binding methods described herein.

In some aspects, the density of the plurality of template molecules immobilized to the support is about $10^2$-$10^{15}$ per $mm^2$. In some aspects, the density of the plurality of template molecules immobilized to the support is about $10^4$-$10^{12}$ per $mm^2$. In some aspects, the density of the plurality of template molecules immobilized to the support is about $10^4$-$10^8$ per $mm^2$. In some aspects, the density of the plurality of template molecules immobilized to the support is $10^2$-$10^{15}$ per mm². In some aspects, the density of the plurality of template molecules immobilized to the support is $10^4$-$10^{12}$ per mm². In some aspects, the density of the plurality of template molecules immobilized to the support is $10^4$-$10^8$ per mm². In some aspects, the plurality of template molecules are immobilized at random locations on the support. In some aspects, the plurality of template molecules are immobilized on the support in a predetermined pattern.

In some aspects, the order of conducting sequencing reactions in multiple cycles corresponding to the template molecules immobilized to a support comprises: (1) sequencing the insert region (510); (2) sequencing the right sample index where the right index comprises a random sequence (e.g., NNN) and a universal sample index sequence; and (3) sequencing the left sample index. In some aspects, the left sample index comprises a left universal sample index sequence. In some aspects, the left sample index comprises a second random sequence (e.g., NNN) and a left universal sample index sequence. In some aspects, sequencing the right sample index region, including the first random sequence (e.g., NNN) and right universal sample index sequence, may provide enough nucleotide diversity for the purpose of generating base calling template so that sequencing the left sample index can be omitted.

In some aspects, methods for sequencing the template molecules immobilized to a support, wherein individual template molecules comprise: (i) a universal binding sequence for a first surface primer (520), (ii) a left sample index sequence having a left universal sample index sequence (iii) a universal binding sequence for a forward sequencing primer (540), (iv) a sequence of interest (510), (v) a universal binding sequence for a reverse sequencing primer (550), (vi) a right sample index sequence having a k-mer sequence (e.g., NNN) linked directly to a right universal sample index sequence, and (vii) a universal binding sequence for a second surface primer (530), wherein the method comprises step (a): hybridizing the template molecules with a first plurality of soluble sequencing primers that hybridize to the universal binding sequence for a forward sequencing primer (540) and sequencing the insert region (510) thereby generating a plurality of insert extension products that are hybridized to the immobilized template molecules, wherein the plurality of insert extension products are complementary to the sequence of interest (510).

In some aspects, the methods for sequencing further comprise step (b): removing the plurality of insert extension products and retaining the immobilized template molecules.

In some aspects, the methods for sequencing further comprise step (c): hybridizing the template molecules with a second plurality of soluble sequencing primers that hybridize to the universal binding sequence for a reverse sequencing primer (550) and sequencing the right sample index sequence including sequencing the k-mer sequence (e.g., NNN) and the right universal sample index sequence thereby generating a first plurality of sample index extension products that are hybridized to the immobilized template molecules, wherein the first plurality of sample index extension products are complementary to the right sample index sequence having a k-mer sequence (e.g., NNN) linked directly to a right universal sample index sequence.

In some aspects, the methods for sequencing further comprise step (d): removing the first plurality of sample index extension products and retaining the immobilized template molecules.

In some aspects, the methods for sequencing further comprise step (e): hybridizing the retained immobilized template molecules with a third plurality of soluble sequencing primers that hybridize to the universal binding sequence for a first surface primer (520) and sequencing the left sample index sequence thereby generating a second plurality of sample index extension products that are hybridized to the immobilized template molecules, wherein the second plurality of sample index extension products are complementary to the left sample index sequence having a left universal sample index sequence.

In some aspects, the methods for sequencing further comprise step (f1): assigning the sequence of (i) the insert region (510) to (ii) the right sample index sequence having a k-mer sequence (e.g., NNN) linked directly to a right universal sample index sequence, thereby identifying the insert region as being obtained from a first source.

In some aspects, the methods for sequencing further comprise step (f2): assigning the sequence of (i) the insert region (510) to (ii) the right sample index sequence having a k-mer sequence (e.g., NNN) linked directly to a right universal sample index sequence, and (iii) the left sample index sequence, thereby identifying the insert region as being obtained from a first source.

In some aspects, the removing of the plurality of sequencing extension products of steps (b) and (d) can be conducted using a denaturation reagent comprising SSC (e.g., saline-sodium citrate) buffer with or without formamide, at a temperature that promotes nucleic acid denaturation such as for example 50-90° C.

In some aspects, the sequencing of steps (a), (c) and (e) include conducting any of the sequencing methods described herein that employ sequencing polymerases and detectably labeled nucleotide analogs. In some aspects, the sequencing of steps (a), (c) and (e) include conducting any of the two-stage sequencing methods described herein that employ sequencing polymerases, detectably labeled multivalent molecules, and nucleotide analogs. In some aspects, the sequencing of steps (a), (c) and (e) include conducting any of the sequencing-by-binding methods described herein.

In some aspects, the density of the plurality of template molecules immobilized to the support is about $10^2$-$10^{15}$ per mm². In some aspects, the density of the plurality of template molecules immobilized to the support is about $10^4$-$10^{12}$ per mm². In some aspects, the density of the plurality of template molecules immobilized to the support is about $10^4$-$10^8$ per mm². In some aspects, the density of the plurality of template molecules immobilized to the support is $10^2$-$10^{15}$ per mm². In some aspects, the density of the plurality of template molecules immobilized to the support is $10^4$-$10^{12}$ per mm². In some aspects, the density of the plurality of template molecules immobilized to the support is $10^4$-$10^8$ per mm². In some aspects, the plurality of template molecules are immobilized at random locations on the support. In some aspects, the plurality of template molecules are immobilized on the support in a predetermined pattern.

In some aspects, the order of conducting sequencing reactions in multiple cycles corresponding to the template molecules comprises: (1) sequencing the first 3-5 bases of the insert region (510); (2) sequencing the right sample index where the right index comprises an optional random sequence (e.g., NNN) and a universal sample index sequence; and (3) sequencing the left sample index. In some aspects, the left sample index comprises a left universal sample index sequence. In some aspects, the left sample index comprises a second random sequence (e.g., NNN) and a left universal sample index sequence. In some aspects, sequencing the first 3-5 bases of the insert region (510) may provide enough sequence diversity so that the right sample index and the left sample index do not include a k-mer sequence (e.g., NNN). In some aspects, sequencing the right sample index region, including the first random sequence (e.g., NNN) and right universal sample index sequence, may provide enough nucleotide diversity so that sequencing the left sample index can be omitted.

In some aspects, methods for sequencing the template molecules immobilized to a support, wherein individual template molecules comprise: (i) a universal binding sequence for a first surface primer (520), (ii) a left sample index sequence having a left universal sample index sequence (iii) a universal binding sequence for a forward sequencing primer (540), (iv) a sequence of interest (510), (v) a universal binding sequence for a reverse sequencing primer (550), (vi) a right sample index sequence having a k-mer sequence (e.g., NNN) linked directly to a right universal sample index sequence, and (vii) a universal binding sequence for a second surface primer (530), wherein the method comprises step (a): hybridizing the template molecules with a first plurality of soluble sequencing primers that hybridize to the universal binding sequence for a forward sequencing primer (540) and sequencing the first 3-5 bases of the insert region (510) thereby generating a plurality of insert extension products that are hybridized to the immobilized template molecules, wherein the plurality of insert extension products are complementary to the sequence of interest (510). The sequence of the first 3-5 bases of the insert region (510) may provide sufficient sequence diversity and color balance for polony mapping and template registration.

In some aspects, the methods for sequencing further comprise step (b): removing the plurality of insert extension products and retaining the immobilized template molecules.

In some aspects, the methods for sequencing further comprise step (c): hybridizing the template molecules with a second plurality of soluble sequencing primers that hybridize to the universal binding sequence for a reverse sequencing primer (550) and sequencing the right sample index sequence including sequencing the k-mer sequence (e.g., NNN) if present and the right universal sample index sequence thereby generating a first plurality of sample index extension products that are hybridized to the immobilized template molecules, wherein the first plurality of sample index extension products are complementary to the right sample index sequence.

In some aspects, the methods for sequencing further comprise step (d): removing the first plurality of sample index extension products and retaining the immobilized template molecules.

In some aspects, the methods for sequencing further comprise step (e): hybridizing the retained immobilized template molecules with a third plurality of soluble sequencing primers that hybridize to the universal binding sequence for a first surface primer (520) and sequencing the left sample index sequence thereby generating a second plurality of sample index extension products that are hybridized to the immobilized template molecules, wherein the second plurality of sample index extension products are complementary to the left sample index sequence having a left universal sample index sequence.

In some aspects, the methods for sequencing further comprise step (f): removing the second plurality of sample index extension products and retaining the immobilized template molecules.

In some aspects, the methods for sequencing further comprise step (g): hybridizing the template molecules with a fourth plurality of soluble sequencing primers that hybridize to the universal binding sequence for a forward sequencing primer (540) and sequencing the full length of the insert region (510) thereby generating a plurality of full length insert extension products that are hybridized to the immobilized template molecules, wherein the plurality of full length insert extension products are complementary to the sequence of interest (510).

In some aspects, the methods for sequencing further comprise step (h1): assigning the full length sequence of (i) the insert region (510) to (ii) the right sample index sequence, thereby identifying the insert region as being obtained from a first source.

In some aspects, the methods for sequencing further comprise step (h2): assigning the full length sequence of (i) the insert region (510) to (ii) the right sample index sequence, and (iii) the left sample index sequence, thereby identifying the insert region as being obtained from a first source.

In some aspects, the removing of the plurality of sequencing extension products of steps (b), (d) and (f) can be conducted using a denaturation reagent comprising SSC (e.g., saline-sodium citrate) buffer with or without formamide, at a temperature that promotes nucleic acid denaturation such as for example 50-90° C.

In some aspects, the sequencing of steps (a), (c), (e) and (g) include conducting any of the sequencing methods described herein that employ sequencing polymerases and detectably labeled nucleotide analogs. In some aspects, the sequencing of steps (a), (c), (e) and (g) include conducting any of the two-stage sequencing methods described herein that employ sequencing polymerases, detectably labeled multivalent molecules, and nucleotide analogs. In some aspects, the sequencing of steps (a), (c), (e) and (g) include conducting any of the sequencing-by-binding methods described herein.

In some aspects, the density of the plurality of template molecules immobilized to the support is about $10^2$-$10^{15}$ per mm$^2$. In some aspects, the density of the plurality of template molecules immobilized to the support is about $10^4$-$10^{12}$ per mm$^2$. In some aspects, the density of the plurality of template molecules immobilized to the support is about $10^4$-$10^8$ per mm$^2$. In some aspects, the density of the plurality of template molecules immobilized to the support is $10^2$-$10^{15}$ per mm$^2$. In some aspects, the density of the plurality of template molecules immobilized to the support is $10^4$-$10^{12}$ per mm$^2$. In some aspects, the density of the plurality of template molecules immobilized to the support is $10^4$-$10^8$ per mm$^2$. In some aspects, the plurality of template molecules are immobilized at random locations on the support. In some aspects, the plurality of template molecules are immobilized on the support in a predetermined pattern.

In some aspects, the order of sequencing comprises: (1) sequencing the first 3-5 bases of the insert region (510) of the immobilized template molecule (e.g., sequencing in a forward direction); (2) sequencing the right sample index where the right index comprises a first random sequence (e.g., NNN) and a right universal sample index sequence; (3) sequencing the left sample index; (4) conducting a pairwise turn reaction so that the immobilized template molecule is replaced with an immobilized strand that is complementary to the template molecule; and (5) sequencing the full-length of the insert region (510) of the immobilized complementary strand (e.g., sequencing in the reverse direction). In some aspects, the sequences of the first 3-5 bases of the insert region (510) of a population of library molecules may provide enough sequence diversity for improved base-calling accuracy. In some aspects, the left sample index comprises a left universal sample index sequence. In some aspects, the left sample index comprises a second random sequence (e.g., NNN) and a left universal sample index sequence. In some aspects, sequencing the right sample index region, including the first random sequence (e.g., NNN) and right universal sample index sequence, may provide enough nucleotide diversity so that sequencing the left sample index can be omitted.

In some aspects, methods for sequencing the template molecules immobilized to a support, wherein individual template molecules are covalently linked to an immobilized capture primer that lacks uracil bases, and individual template molecules comprise randomly-distributed uracil bases, and individual template molecules comprise: (i) a universal binding sequence for a first surface primer (520), (ii) a left sample index sequence having a left universal sample index sequence (iii) a universal binding sequence for a forward sequencing primer (540), (iv) a sequence of interest (510), (v) a universal binding sequence for a reverse sequencing primer (550), (vi) a right sample index sequence having a k-mer sequence (e.g., NNN) linked directly to a right universal sample index sequence, and (vii) a universal binding sequence for a second surface primer (530), wherein the method comprises step (a): hybridizing the template molecules with a first plurality of soluble sequencing primers (e.g., forward sequencing primers) that hybridize to the universal binding sequence for a forward sequencing primer (540) and sequencing the first 3-5 bases of the insert region (510) thereby generating a plurality of insert extension products that are hybridized to the immobilized template molecules, wherein the plurality of insert extension products are complementary to the sequence of interest (510).

In some aspects, the methods for sequencing further comprise step (b): removing the plurality of insert extension products and retaining the immobilized template molecules.

In some aspects, the methods for sequencing further comprise step (c): hybridizing the template molecules with a second plurality of soluble sequencing primers that hybridize to the universal binding sequence for a reverse sequencing primer (550) and sequencing the right sample index sequence including sequencing the k-mer sequence (e.g., NNN) and the right universal sample index sequence thereby generating a first plurality of sample index extension products that are hybridized to the immobilized template molecules, wherein the first plurality of sample index extension products are complementary to the right sample index sequence having a k-mer sequence (e.g., NNN) linked directly to a right universal sample index sequence.

In some aspects, the methods for sequencing further comprise step (d): removing the first plurality of sample index extension products and retaining the immobilized template molecules.

In some aspects, the methods for sequencing further comprise step (e): hybridizing the retained immobilized template molecules with a third plurality of soluble sequencing primers that hybridize to the universal binding sequence for a first surface primer (520) and sequencing the left sample index sequence thereby generating a second plurality of sample index extension products that are hybridized to the immobilized template molecules, wherein the second plurality of sample index extension products are complementary to the left sample index sequence having a left universal sample index sequence.

In some aspects, the methods for sequencing further comprise step (f): replacing the second plurality of sample index extension products that are hybridized to the immobilized template molecules by conducting a primer extension reaction using strand-displacing polymerases and a plurality of nucleotides to generate an extension product that is hybridized to the immobilized template molecules including the immobilized capture primer.

In some aspects, the methods for sequencing further comprise step (g): removing the immobilized template molecules by generating abasic sites in the immobilized template molecules at the uracil sites and generating gaps at the abasic sites thereby generating gap-containing template molecules while retaining the extension products that was generated in step (f) where individual extension products are retained by being hybridized to an immobilized capture primer. In some aspects, pairwise turn is achieved by conducting steps (g) and (h).

In some aspects, the methods for sequencing further comprise step (h): hybridizing the retained extension products with a fourth plurality of soluble sequencing primers (e.g., reverse sequencing primers) that hybridize to universal binding sequence for a reverse sequencing primer (550) and sequencing the insert region (510) (e.g., sequencing at least a portion or the full length of the insert region (510)).

In some aspects, the methods for sequencing further comprise step (i1): assigning the sequence of (i) the insert region (510) to (ii) the right sample index sequence having a k-mer sequence (e.g., NNN) linked directly to a right universal sample index sequence, thereby identifying the insert region as being obtained from a first source.

In some aspects, the methods for sequencing further comprise step (i2): assigning the sequence of (i) the insert region (510) to (ii) the right sample index sequence having a k-mer sequence (e.g., NNN) linked directly to a right universal sample index sequence, and (iii) the left sample index sequence, thereby identifying the insert region as being obtained from a first source.

In some aspects, the removing of the plurality of sequencing extension products of steps (b) and (d) can be conducted using a denaturation reagent comprising SSC (e.g., saline-sodium citrate) buffer with or without formamide, at a temperature that promotes nucleic acid denaturation such as for example 50-90° C.

In some aspects, the sequencing of steps (a), (c), (e) and (h) include conducting any of the sequencing methods described herein that employ sequencing polymerases and detectably labeled nucleotide analogs. In some aspects, the sequencing of steps (a), (c), (e) and (h) include conducting any of the two-stage sequencing methods described herein that employ sequencing polymerases, detectably labeled multivalent molecules, and nucleotide analogs. In some aspects, the sequencing of steps (a), (c), (e) and (h) include conducting any of the sequencing-by-binding methods described herein.

In some aspects, the density of the plurality of template molecules immobilized to the support is about 102-1015 per $mm^2$. In some aspects, the plurality of template molecules are immobilized at random locations on the support. In some aspects, the plurality of template molecules are immobilized on the support in a predetermined pattern.

In some aspects, the present disclosure provides methods for sequencing nucleic acids comprising: (a) providing a plurality of nucleic acid template molecules immobilized on a support (e.g., immobilized at random or pre-determined locations), wherein individual immobilized template molecules comprise an insert sequence region and one sample index, wherein each sample index comprises a k-mer sequence joined to a universal sample index sequence which identifies the sample source of the insert sequence, wherein different immobilized template molecules have a different k-mer sequence and the same universal sample index sequence, and wherein the immobilized template molecules have different insert sequences; (b) conducting three cycles of polymerase-mediated sequencing reactions of the k-mer sequence of the plurality of immobilized template molecules using a plurality of detectably labeled nucleotide reagents comprising a mixture of different types of nucleo-bases A, G, C and T/U, wherein the nucleotide reagents comprise a different detectable color label that corresponds with each different type of nucleo-base, wherein the three cycles of sequencing include detecting and imaging the optical color signals emitted from the detectably labeled nucleotide reagents that are bound to the immobilized template molecules thereby determining the sequences of the k-mer sequences in individual template molecules of the plurality of immobilized template molecules, and wherein a balanced diversity of nucleo-bases of A, G, C and T/U is detected and imaged in each of the first, second and third sequencing cycles among the plurality of immobilized template molecules; and (c) generating a map of the locations of the plurality of immobilized template molecules using the images obtained in step (b), wherein the sequence of the insert region is not used to generate the map.

In some aspects, in the methods for sequencing nucleic acids, the balanced diversity of step (b) is about 5-85%, or about 5-60%, or about 10-50%, or about 15-55%, or about 25-75% of each of the nucleo-bases A, G, C and T/U that are detected and imaged in each of the first, second and third sequencing cycles.

In some aspects, in the methods for sequencing nucleic acids, the method further comprises: (a) sequencing the universal sample index sequence of the plurality of immobilized template molecules; (b) sequencing the insert sequence region of the plurality of immobilized template molecules; and (c) assigning the insert sequence of a given template molecule obtained in step (b) with the universal sample index sequence from the same given template molecule obtained in step (a), thereby identifying the sample source of the given insert sequence.

In some aspects, in the methods for sequencing nucleic acids, the plurality of nucleic acid template molecules further comprise a second sample index which comprises a second universal sample index sequence which identifies the sample source of the insert sequence and the second sample index lacks a random sequence.

In some aspects, in the methods for sequencing nucleic acids, the method further comprises: (a) sequencing the k-mer sequence of the plurality of immobilized template molecules to obtain a balanced diversity of nucleo-bases of A, G, C and T/U that are detected and imaged in each of the first, second and third sequencing cycles to generate a map of the locations of the plurality of immobilized template molecules; (b) sequencing the first universal sample index sequence of the plurality of immobilized template molecules; (c) sequencing the second universal sample index sequence of the plurality of immobilized template molecules; (d) sequencing the insert sequence region of the plurality of immobilized template molecules; and (e) assigning the insert sequence of a given template molecule obtained in step (c) with the first and second universal sample index sequences from the same given template molecule obtained in steps (a) and (b), thereby identifying the sample source of the given insert sequence.

In some aspects, the present disclosure provides methods for sequencing nucleic acids comprising: (a) providing a plurality of nucleic acid template molecules immobilized on a support (e.g., immobilized at random or pre-determined locations), wherein individual immobilized template molecules comprise an insert sequence region and one sample index, wherein each sample index comprises a k-mer sequence joined to a universal sample index sequence which identifies the sample source of the insert sequence, wherein the universal sample index sequence comprises 3-20 nucleotides, wherein different immobilized template molecules have a different k-mer sequence and the same universal sample index sequence, and wherein the immobilized template molecules have different insert sequences; (b) conducting four cycles of polymerase-mediated sequencing reactions of the k-mer sequence and the first base position of the universal sample index sequence of the plurality of immobilized template molecules using a plurality of detectably labeled nucleotide reagents comprising a mixture of different types of nucleo-bases A, G, C and T/U, wherein the nucleotide reagents comprise a different detectable color label that corresponds with each different type of nucleobase, wherein the four cycles of sequencing include detecting and imaging the optical color signals emitted from the detectably labeled nucleotide reagents that are bound to the immobilized template molecules thereby determining the sequences of the k-mer sequences and the first base position of the universal sample index sequences in individual template molecules of the plurality of immobilized template molecules, and wherein a balanced diversity of nucleo-bases of A, G, C and T/U is detected and imaged in each of the first, second, third and fourth sequencing cycles among the plurality of immobilized template molecules; and (c) generating a map of the locations of the plurality of immobilized template molecules using the images of the four cycles of polymerase-mediated sequencing reactions obtained in step (b), wherein the sequence of the insert region is not used to generate the map.

In some aspects, in the methods for sequencing nucleic acids, the balanced diversity of step (b) is about 5-85%, or about 5-60%, or about 10-50%, or about 15-55%, or about 25-75% of each of the nucleo-bases A, G, C and T/U that are detected and imaged in each of the first, second, third and fourth sequencing cycles.

In some aspects, in the methods for sequencing nucleic acids, the method further comprises: (a) sequencing the remaining base positions of the universal sample index sequence of the plurality of immobilized template molecules; (b) sequencing the insert sequence region of the plurality of immobilized template molecules; and (c) assigning the insert sequence of a given template molecule obtained in step (b) with the universal sample index sequence from the same given template molecule obtained in step (a), thereby identifying the sample source of the given insert sequence.

In some aspects, in the methods for sequencing nucleic acids, the plurality of nucleic acid template molecules further comprise: a second sample index which comprises a second universal sample index sequence which identifies the sample source of the insert sequence and the second sample index lacks a random sequence.

In some aspects, in the methods for sequencing nucleic acids, the method further comprises: (a) sequencing the k-mer sequence and the first base position of the universal sample index sequence of the plurality of immobilized template molecules to obtain a balanced diversity of nucleo-bases of A, G, C and T/U that are detected and imaged in each of the first, second, third and fourth sequencing cycles to generate a map of the locations of the plurality of immobilized template molecules; (b) sequencing the remaining base positions of the first universal sample index sequence of the plurality of immobilized template molecules; (c) sequencing the second universal sample index sequence of the plurality of immobilized template molecules; (d) sequencing the insert sequence region of the plurality of immobilized template molecules; and (e) assigning the insert sequence of a given template molecule obtained in step (c) with the first and second universal sample index sequences from the same given template molecule obtained in steps (a) and (b), thereby identifying the sample source of the given insert sequence.

In some aspects, in any of the methods for sequencing nucleic acids, the support comprises a glass or plastic substrate. In some aspects, the support is configured on a flow cell channel, a flow cell, or a capillary lumen. In some aspects, the support is passivated with at least one hydrophilic polymer coating having a water contact angle of not more than 45 degrees. In some aspects, the at least one hydrophilic polymer coating comprises a molecule selected from a group consisting of polyethylene glycol (PEG), poly(vinyl alcohol) (PVA), poly(vinyl pyridine), poly(vinyl pyrrolidone) (PVP), poly(acrylic acid) (PAA), polyacrylamide, poly(N-isopropylacrylamide) (PNIPAM), poly(methyl methacrylate) (PMA), poly(2-hydroxylethyl methacrylate) (PHEMA), poly(oligo(ethylene glycol) methyl ether methacrylate) (POEGMA), polyglutamic acid (PGA), poly-lysine, poly-glucoside, streptavidin, and dextran. In some aspects, the at least one hydrophilic polymer coating comprises branched hydrophilic polymer molecules having at least four branches. In some aspects, the at least one hydrophilic polymer coating comprises polymer molecules having a molecular weight of at least 1000 Daltons.

In some aspects, in any of the methods for sequencing nucleic acids, the immobilized template molecules comprise a plurality of immobilized concatemer molecules having tandem repeat sequences of the insert sequence and the one sample index. In some aspects, the immobilized template molecules comprise a plurality of different clustered template molecules having one copy of the insert sequence and one copy of the one sample index, wherein the clustered template molecules are generated via bridge amplification. In some aspects, the density of the immobilized nucleic acid template molecules positioned at random or pre-determined locations on the support is $10^4$-$10^8$ per mm$^2$. In some aspects, the sample source of the insert sequences is genomic DNA, double-stranded cDNA or cell free circulating DNA.

In some aspects, in any of the methods for sequencing nucleic acids, the detectably labeled nucleotide reagents comprise nucleotides each comprising an aromatic nucleo-base, a five carbon sugar moiety, 1-10 phosphate groups, and a fluorophore. In some aspects, the detectably labeled nucleotide reagents comprise nucleotides each comprising an aromatic nucleo-base, a five carbon sugar moiety having a chain terminating group at the 3' carbon sugar position, 1-10 phosphate groups, and a fluorophore. In some aspects, the detectably labeled nucleotide reagents comprise multivalent molecules each comprising (1) a core, (2) a plurality of nucleotide arms, and (3) at least one fluorophore, wherein individual nucleotide arms comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit.

In some aspects, in any of the methods for sequencing nucleic acids, the detectably labeled nucleotide reagents that are bound to the immobilized template molecules in step (b) comprise individual immobilized template molecules hybridized to a sequencing primer to form a duplex, and the duplex is bound to a polymerase to form a complexed polymerase, and the complexed polymerase is bound to a detectably labeled nucleotide reagent. In some aspects, the complexed polymerase is bound to a detectably labeled nucleotide reagent under a condition suitable for binding the detectably labeled nucleotide reagent to the complexed polymerase and incorporating the detectably labeled nucleotide into the hybridized sequencing primer, wherein the detectably labeled nucleotide reagent comprises an aromatic nucleo-base, a five carbon sugar moiety, 1-10 phosphate groups, and a fluorophore. In some aspects, the complexed polymerase is bound to a detectably labeled nucleotide reagent under a condition suitable for binding the detectably labeled nucleotide reagent to the complexed polymerase and incorporating the detectably labeled nucleotide into the hybridized sequencing primer, wherein the detectably labeled nucleotide reagent comprises an aromatic nucleo-base, a five carbon sugar moiety having a chain terminating group at the 3' carbon sugar position, 1-10 phosphate groups, and a fluorophore. In some aspects, the complexed polymerase is bound to a detectably labeled nucleotide reagent under a condition suitable for binding the detectably labeled nucleotide reagent to the complexed polymerase and the condition is suitable for inhibiting nucleotide incorporation, wherein the detectably labeled nucleotide reagent comprises a multivalent molecule which includes (1) a core, (2) a plurality of nucleotide arms, and (3) at least one fluorophore, wherein individual nucleotide arms comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit.

In some aspects, in any of the methods for sequencing nucleic acids, the immobilized template molecule comprises an immobilized concatemer molecule which is hybridized to a plurality of sequencing primers to form at least a first and second duplex on the same concatemer molecule, wherein the first and duplex is bound to a first polymerase and the second duplex is bound to a second polymerase to form first and second complexed polymerases, and wherein the method comprises: (a) contacting a plurality of multivalent molecules to the first and second complexed polymerases on the same concatemer template molecule, wherein individual multivalent molecules include (1) a core, (2) a plurality of nucleotide arms, and (3) at least one fluorophore, wherein individual nucleotide arms comprise (i) a core attachment moiety, (ii) a spacer comprising a PEG moiety, (iii) a linker, and (iv) a nucleotide unit, wherein the core is attached to the plurality of nucleotide arms, and the spacer is attached to the linker, and the linker is attached to the nucleotide unit, wherein the contacting is conducted under conditions suitable to bind a single multivalent molecule from the plurality to the first and second complexed polymerases, wherein a first nucleotide unit of the single multivalent molecule is bound to the first complexed polymerase which includes the first sequencing primer hybridized to a first portion of the concatemer template molecule thereby forming a first binding complex, and wherein a second nucleotide unit of the single multivalent molecule is bound to the second complexed polymerase which includes the second sequencing primer hybridized to a second portion of the concatemer template molecule thereby forming a second binding complex, wherein the first and second binding complexes which are bound to the same multivalent molecule forms an avidity complex, and wherein the contacting is conducted under a condition suitable to inhibit polymerase-catalyzed incorporation of the bound first and second nucleotide units in the first and second binding complexes; (b) detecting the first and second binding complexes on the same concatemer template molecule; (c) imaging the optical color signals emitted from the detectably labeled multivalent molecule which forms the first and second binding complexes on the same concatemer template molecule; and (d) identifying the first nucleotide unit in the first binding complex thereby determining the sequence of the first portion of the concatemer template molecule, and identifying the second nucleotide unit in the second binding complex thereby determining the sequence of the second portion of the concatemer template molecule.

In some aspects, the present disclosure provides methods for multiplex sequencing nucleic acids comprising: (a) providing a first plurality of library molecules each molecule in the plurality comprising (i) an insert sequence region derived from a first sample source, (ii) a first sample index having a k-mer sequence joined to a first universal sample index sequence, and (iii) a second sample index having a second universal sample index sequence which lacks a random sequence, wherein the combination of the first and second universal sample index sequences uniquely identifies a first sample source of the insert sequence, wherein different first library molecules have a different k-mer sequence and have a different insert sequence; (b) providing a second plurality of library molecules each molecule in the plurality comprising (i) an insert sequence region derived from a second sample source, (ii) a third sample index having a k-mer sequence joined to a third universal sample index sequence, and (iii) a fourth sample index having a fourth universal sample index sequence which lacks a random sequence, wherein the combination of the third and fourth universal sample index sequences uniquely identifies a second sample source of the insert sequence, wherein different second library molecules have a different k-mer sequence and have a different insert sequence; (c) pooling the first and second plurality of library molecules; (d) distributing the pooled library molecules onto a support and conducting an amplification reaction to generate a plurality of clonally amplified template molecules immobilized to the support (e.g., immobilized at random or pre-determined locations); (e) conducting three cycles of polymerase-mediated sequencing reactions of the k-mer sequence of the first and third sample indexes using a plurality of detectably labeled nucleotide reagents comprising a mixture of different types of nucleo-bases A, G, C and T/U, wherein the nucleotide reagents comprise a different detectable color label that corresponds with each different type of nucleo-base, wherein the three cycles of sequencing include detecting and imaging the optical color signals emitted from the detectably labeled nucleotide reagents that are bound to the immobilized amplified template molecules thereby determining the sequences of the k-mer sequences in individual template molecules of the plurality of immobilized template molecules, and wherein a balanced diversity of nucleo-bases of A, G, C and T/U is detected and imaged in each of the first, second and third sequencing cycles among the plurality of immobilized amplified template molecules; and (f) generating a map of the locations of the plurality of immobilized template molecules using the images obtained in step (e), wherein the sequence of the insert regions are not used to generate the map.

In some aspects, in the methods for multiplex sequencing nucleic acids, the balanced diversity of step (e) is about 5-85%, or about 5-60%, or about 10-50%, or about 15-55%, or about 25-75% of each of the nucleo-bases A, G, C and T/U that are detected and imaged in each of the first, second and third sequencing cycles.

In some aspects, in the methods for multiplex sequencing nucleic acids, the method further comprises: (a) sequencing the first universal sample index sequences of the plurality of immobilized template molecules; (b) sequencing the second universal sample index sequences of the plurality of immobilized template molecules; (c) sequencing the insert sequence regions of the plurality of immobilized template molecules derived from the first library molecules; and (d) assigning the insert sequence of a given template molecule obtained in step (c) with the first and second universal sample index sequences from the same given template molecule thereby identifying the first sample source of the given insert sequence.

In some aspects, in the methods for multiplex sequencing nucleic acids, the method further comprises: (a) sequencing the third universal sample index sequences of the plurality of immobilized template molecules; (b) sequencing the fourth universal sample index sequences of the plurality of immobilized template molecules; (c) sequencing the insert sequence regions of the plurality of immobilized template molecules derived from the second library molecules; and (d) assigning the insert sequence of a given template molecule obtained in step (c) with the third and fourth universal sample index sequences from the same given template molecule thereby identifying the second sample source of the given insert sequence.

In some aspects, the present disclosure provides methods for multiplex sequencing nucleic acids comprising: (a) providing a first plurality of library molecules each molecule in the plurality comprising (i) an insert sequence region derived from a first sample source, (ii) a first sample index having a k-mer sequence joined to a first universal sample index sequence, and (iii) a second sample index having a second universal sample index sequence which lacks a random sequence, wherein the combination of the first and second universal sample index sequences uniquely identifies a first sample source of the insert sequence, wherein the first universal sample index sequence comprises 3-20 nucleotides, wherein different first library molecules have a different k-mer sequence and have a different insert sequence; (b) providing a second plurality of library molecules each molecule in the plurality comprising (i) an insert sequence region derived from a second sample source, (ii) a third sample index having a k-mer sequence joined to a third universal sample index sequence, and (iii) a fourth sample index having a fourth universal sample index sequence which lacks a random sequence, wherein the combination of the third and fourth universal sample index sequences uniquely identifies a second sample source of the insert sequence, wherein the third universal sample index sequence comprises 3-20 nucleotides, wherein different second library molecules have a different k-mer sequence and have a different insert sequence; (c) pooling the first and second plurality of library molecules; (d) distributing the pooled library molecules onto a support and conducting an amplification reaction to generate a plurality of clonally amplified template molecules immobilized to the support (e.g., immobilized at random or pre-determined locations); (e) conducting four cycles of polymerase-mediated sequencing reactions of the k-mer sequence of the first and third sample indexes and sequencing the first base position of the first and third universal sample index sequences using a plurality of detectably labeled nucleotide reagents comprising a mixture of different types of nucleo-bases A, G, C and T/U, wherein the nucleotide reagents comprise a different detectable color label that corresponds with each different type of nucleo-base, wherein the three cycles of sequencing include detecting and imaging the optical color signals emitted from the detectably labeled nucleotide reagents that are bound to the immobilized amplified template molecules thereby determining the sequences of the k-mer sequences in individual template molecules of the plurality of immobilized template molecules, and wherein a balanced diversity of nucleo-bases of A, G, C and T/U is detected and imaged in each of the first, second, third and fourth sequencing cycles among the plurality of immobilized amplified template molecules; and (f) generating a map of the locations of the plurality of immobilized template molecules using the images obtained in step (e), wherein the sequence of the insert regions are not used to generate the map.

In some aspects, in the methods for multiplex sequencing nucleic acids, the balanced diversity of step (e) is about 5-85%, or about 5-60%, or about 10-50%, or about 15-55%, or about 25-75% of each of the nucleo-bases A, G, C and T/U that are detected and imaged in each of the first, second, third and fourth sequencing cycles.

In some aspects, in the methods for multiplex sequencing nucleic acids, the method further comprises: (a) sequencing the remaining base positions of the first universal sample index sequences of the plurality of immobilized template molecules; (b) sequencing the second universal sample index sequences of the plurality of immobilized template molecules; (c) sequencing the insert sequence regions of the plurality of immobilized template molecules derived from the first library molecules; and (d) assigning the insert sequence of a given template molecule obtained in step (c) with the first and second universal sample index sequences from the same given template molecule thereby identifying the first sample source of the given insert sequence.

In some aspects, in the methods for multiplex sequencing nucleic acids, the method further comprises: (a) sequencing the remaining base positions of the third universal sample index sequences of the plurality of immobilized template molecules; (b) sequencing the fourth universal sample index sequences of the plurality of immobilized template molecules; (c) sequencing the insert sequence regions of the plurality of immobilized template molecules derived from the second library molecules; and (d) assigning the insert sequence of a given template molecule obtained in step (c) with the third and fourth universal sample index sequences from the same given template molecule thereby identifying the second sample source of the given insert sequence.

In some aspects, in any of the methods for multiplex sequencing nucleic acids, the support comprises a glass or plastic substrate. In some aspects, the support is configured on a flow cell channel, a flow cell, or a capillary lumen. In some aspects, the support is passivated with at least one hydrophilic polymer coating having a water contact angle of not more than 45 degrees. In some aspects, the at least one hydrophilic polymer coating comprises a molecule selected from a group consisting of polyethylene glycol (PEG), poly(vinyl alcohol) (PVA), poly(vinyl pyridine), poly(vinyl pyrrolidone) (PVP), poly(acrylic acid) (PAA), polyacrylamide, poly(N-isopropylacrylamide) (PNIPAM), poly(methyl methacrylate) (PMA), poly(2-hydroxylethyl methacrylate) (PHEMA), poly(oligo(ethylene glycol) methyl ether methacrylate) (POEGMA), polyglutamic acid (PGA), poly-lysine, poly-glucoside, streptavidin, and dextran. In some aspects, the at least one hydrophilic polymer coating comprises branched hydrophilic polymer molecules having at least four branches. In some aspects, the at least one hydrophilic polymer coating comprises polymer molecules having a molecular weight of at least 1000 Daltons.

In some aspects, in any of the methods for multiplex sequencing nucleic acids, the immobilized template molecules comprise a plurality of immobilized concatemer molecules having tandem repeat sequences of the insert sequence and the one sample index. In some aspects, the immobilized template molecules comprise a plurality of different clustered template molecules having one copy of the insert sequence and one copy of the one sample index, wherein the clustered template molecules are generated via bridge amplification. In some aspects, the density of the immobilized nucleic acid template molecules (e.g., immobilized at random or pre-determined locations) on the support is $10^4$-$10^8$ per mm$^2$. In some aspects, the sample source of the insert sequences is genomic DNA, double-stranded cDNA or cell free circulating DNA.

In some aspects, in any of the methods for multiplex sequencing nucleic acids, the detectably labeled nucleotide reagents comprise nucleotides each comprising an aromatic nucleo-base, a five carbon sugar moiety, 1-10 phosphate groups, and a fluorophore. In some aspects, the detectably labeled nucleotide reagents comprise nucleotides each comprising an aromatic nucleo-base, a five carbon sugar moiety having a chain terminating group at the 3' carbon sugar position, 1-10 phosphate groups, and a fluorophore. In some aspects, the detectably labeled nucleotide reagents comprise multivalent molecules each comprising (1) a core, (2) a plurality of nucleotide arms, and (3) at least one fluorophore, wherein individual nucleotide arms comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit.

In some aspects, in any of the methods for multiplex sequencing nucleic acids, the detectably labeled nucleotide reagents that are bound to the immobilized template molecules in step (e) comprise individual immobilized template molecules hybridized to a sequencing primer to form a duplex, and the duplex is bound to a polymerase to form a complexed polymerase, and the complexed polymerase is bound to a detectably labeled nucleotide reagent. In some aspects, the complexed polymerase is bound to a detectably labeled nucleotide reagent under a condition suitable for binding the detectably labeled nucleotide reagent to the complexed polymerase and incorporating the detectably labeled nucleotide into the hybridized sequencing primer, wherein the detectably labeled nucleotide reagent comprises an aromatic nucleo-base, a five carbon sugar moiety, 1-10 phosphate groups, and a fluorophore. In some aspects, the complexed polymerase is bound to a detectably labeled nucleotide reagent under a condition suitable for binding the detectably labeled nucleotide reagent to the complexed polymerase and incorporating the detectably labeled nucleotide into the hybridized sequencing primer, wherein the detectably labeled nucleotide reagent comprises an aromatic nucleo-base, a five carbon sugar moiety having a chain terminating group at the 3' carbon sugar position, 1-10 phosphate groups, and a fluorophore. In some aspects, the complexed polymerase is bound to a detectably labeled nucleotide reagent under a condition suitable for binding the detectably labeled nucleotide reagent to the complexed polymerase and the condition is suitable for inhibiting nucleotide incorporation, wherein the detectably labeled nucleotide reagent comprises a multivalent molecule which includes (1) a core, (2) a plurality of nucleotide arms, and (3) at least one fluorophore, wherein individual nucleotide arms comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit.

In some aspects, in any of the methods for multiplex sequencing nucleic acids, the immobilized template molecule comprises an immobilized concatemer molecule which is hybridized to a plurality of sequencing primers to form at least a first and second duplex on the same concatemer molecule, wherein the first and duplex is bound to a first polymerase and the second duplex is bound to a second polymerase to form first and second complexed polymerases, and wherein the method comprises: (a) contacting a plurality of multivalent molecules to the first and second complexed polymerases on the same concatemer template molecule, wherein individual multivalent molecules include (1) a core, (2) a plurality of nucleotide arms, and (3) at least one fluorophore, wherein individual nucleotide arms comprise (i) a core attachment moiety, (ii) a spacer comprising a PEG moiety, (iii) a linker, and (iv) a nucleotide unit, wherein the core is attached to the plurality of nucleotide arms, and the spacer is attached to the linker, and the linker is attached to the nucleotide unit, wherein the contacting is conducted under conditions suitable to bind a single multivalent molecule from the plurality to the first and second complexed polymerases, wherein a first nucleotide unit of the single multivalent molecule is bound to the first complexed polymerase which includes the first sequencing primer hybridized to a first portion of the concatemer template molecule thereby forming a first binding complex, and wherein a second nucleotide unit of the single multivalent molecule is bound to the second complexed polymerase which includes the second sequencing primer hybridized to a second portion of the concatemer template molecule thereby forming a second binding complex, wherein the first and second binding complexes which are bound to the same multivalent molecule forms an avidity complex, and wherein the contacting is conducted under a condition suitable to inhibit polymerase-catalyzed incorporation of the bound first and second nucleotide units in the first and second binding complexes; (b) detecting the first and second binding complexes on the same concatemer template molecule; (c) imaging the optical color signals emitted from the detectably labeled multivalent molecule which forms the first and second binding complexes on the same concatemer template molecule; and (d) identifying the first nucleotide unit in the first binding complex thereby determining the sequence of the first portion of the concatemer template molecule, and identifying the second nucleotide unit in the second binding complex thereby determining the sequence of the second portion of the concatemer template molecule.

Example Computer System

Figure 4:
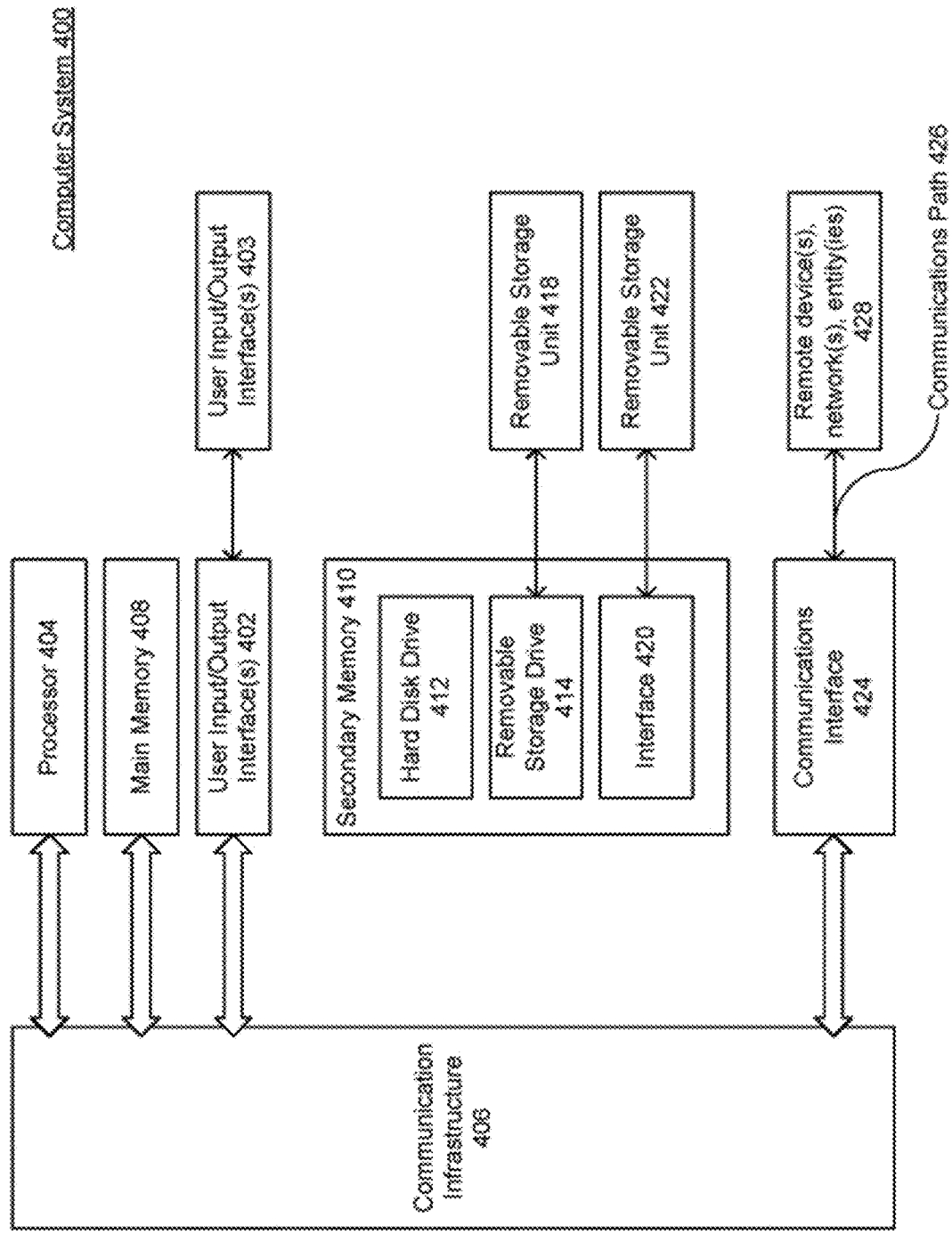
FIG. 4 illustrates a block diagram of a computer that may be used to perform various aspects of the present disclosure, according to some aspects.

Various aspects may be implemented, for example, using one or more computer systems, such as computer system 400 shown in FIG. 4. One or more computer systems 400 may be used, for example, to implement any of the aspects discussed herein, as well as combinations and sub-combinations thereof.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402. The user input/output devices 403 may be coupled to the user interface 124 in FIG. 1.

One or more of processors 404 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image recognition and machine learning aspects described herein.

Additionally, one or more of processors 404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a main storage drive 412 and/or a removable storage device or drive 414. Main storage drive 412 may be a hard disk drive or solid-state drive, for example. Removable storage drive 414 may be a floppy disk drive, a magnetic tape drive, a compact disk drive, an optical storage device, tape backup device, and/or any other storage device/drive.

Removable storage drive 414 may interact with a removable storage unit 418.

Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communication path 426, which may be wired and/or wireless (or a combination thereof), and which may include any combination of LANs, WANs, the Internet, etc. Control logic and/or data may be transmitted to and from computer system 400 via communication path 426. In some aspects, communication path 426 is the connection to the cloud 130, as depicted in FIG. 1. The external devices, etc. referred to by reference number 428 may be devices, networks, entities, etc. in the cloud 130.

Computer system 400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PUP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Expressjs, Backbone.js, Ember.js, DHTMLX, Vue, React, Electron, and so on, among many other non-limiting examples.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 4. In particular, aspects may operate with software, hardware, and/or operating system implementations other than those described herein.

The imager 116 in FIG. 1 can include one or more optical systems. Further disclosed herein are optical system design guidelines and high-performance fluorescence imaging methods and systems that provide improved optical resolution and image quality for fluorescence imaging-based genomics applications. The disclosed optical imaging system designs provide for larger fields-of-view, increased spatial resolution, improved modulation transfer, contrast-to-noise ratio, and image quality, higher spatial sampling frequency, faster transitions between image capture when repositioning the sample plane to capture a series of images (e.g., of different fields-of-view), and improved imaging system duty cycle, and thus enable higher throughput image acquisition and analysis.

In some instances, improvements in imaging performance, e.g., for dual-side (flow cell) imaging applications, may be achieved by using an electro-optical phase plate in combination with an objective lens to compensate for the optical aberrations induced by the layer of fluid separating the upper (near) and lower (far) interior surfaces of a flow cell. In some instances, this design approach may also compensate for vibrations introduced by, e.g., a motion-actuated compensator that is moved in or out of the optical path depending on which surface of the flow cell is being images.

In some instances, improvements in imaging performance, e.g., for dual-side (flow cell) imaging applications comprising the use of thick flow cell walls (e.g., wall (or coverslip) thickness >700 µm) and fluid channels (e.g., fluid channel height or thickness of 50-200 µm) may be achieved even when using commercially-available, off-the-shelf objectives by using a tube lens design that corrects for the optical aberrations induced by the thick flow cell walls and/or intervening fluid layer in combination with the objective.

In some instances, improvements in imaging performance, e.g., for multichannel (e.g., two-color or four-color) imaging applications, may be achieved by using multiple tube lenses, one for each imaging channel, where each tube lens design has been optimized for the specific wavelength range used in that imaging channel.

Exemplary aspects disclosed herein may comprise fluorescence imaging systems, said systems comprising: a) at least one light source configured to provide excitation light within one or more specified wavelength ranges; b) an objective lens configured to collect fluorescence arising from within a specified field-of-view of a sample plane upon exposure of the sample plane to the excitation light, wherein a numerical aperture of the objective lens is at least 0.1, at least 0.2, at least 0.3, at least 0.4, at least 0.5, at least 0.6, at least 0.7, at least 0.8, or at least 0.9 or a numerical aperture value falling within a range defined by any two of the foregoing; wherein a working distance of the objective lens is at least 400 m, at least 500 m, at least 600 m, at least 700 m, at least 800 m, at least 900 m, at least 1000 m, or a working distance falling within a range defined by any two of the foregoing; and wherein the field-of-view has an area of at least 0.1 mm$^2$, at least 0.2 mm$^2$, at least 0.5 mm$^2$, at least 0.7 mm$^2$, at least 1 mm$^2$, at least 2 mm$^2$, at least 3 mm$^2$, at least 5 mm$^2$, or at least 10 mm$^2$, or a field of view falling within a range defined by any two of the foregoing; and c) at least one image sensor, wherein the fluorescence collected by the objective lens is imaged onto the image sensor, and wherein a pixel dimension for the image sensor is chosen such that a spatial sampling frequency for the fluorescence imaging system is at least twice an optical resolution of the fluorescence imaging system.

In some aspects, the numerical aperture may be at least 0.75. In some aspects, the numerical aperture is at least 1.0. In some aspects, the working distance is at least 850 am. In some aspects, the working distance is at least 1,000 m. In some aspects, the field-of-view may have an area of at least 2.5 mm$^2$. In some aspects, the field-of-view may have an area of at least 3 mm$^2$. In some aspects, the spatial sampling frequency may be at least 2.5 times the optical resolution of the fluorescence imaging system. In some aspects, the spatial sampling frequency may be at least 3 times the optical resolution of the fluorescence imaging system. In some aspects, the system may further comprise an X-Y-Z translation stage such that the system is configured to acquire a series of two or more fluorescence images in an automated fashion, wherein each image of the series is or can be acquired for a different field-of-view. In some aspects, a position of the sample plane may be simultaneously adjusted in an X direction, a Y direction, and a Z direction to match the position of an objective lens focal plane in between acquiring images for different fields-of-view. In some aspects, the time required for the simultaneous adjustments in the X direction, Y direction, and Z direction may be less than 0.3 seconds, less than 0.4 seconds, less than 0.5 seconds, less than 0.7 seconds, or less than 1 second, or a time falling within a range defined by any two of the foregoing. In some aspects, the system further comprises an autofocus mechanism configured to adjust the focal plane position prior to acquiring an image of a different field-of-view if an error signal indicates that a difference in the position of the focal plane and the sample plane in the Z direction is greater than a specified error threshold. In some aspects, the specified error threshold is 100 nm or greater. In some aspects, the specified error threshold is 50 nm or less. In some aspects, the system comprises three or more image sensors, and wherein the system is configured to image fluorescence in each of three or more wavelength ranges onto a different image sensor. In some aspects, a difference in the position of a focal plane for each of the three or more image sensors and the sample plane is less than 100 nm. In some aspects, a difference in the position of a focal plane for each of the three or more image sensors and the sample plane is less than 50 nm. In some aspects, the total time required to reposition the sample plane, adjust focus if necessary, and acquire an image is less than 0.4 seconds per field-of-view. In some aspects, the total time required to reposition the sample plane, adjust focus if necessary, and acquire an image is less than 0.3 seconds per field-of-view.

Also disclosed herein are fluorescence imaging systems for dual-side imaging of a flow cell comprising: a) an objective lens configured to collect fluorescence arising from within a specified field-of-view of a sample plane within the flow cell; b) at least one tube lens positioned between the objective lens and at least one image sensor, wherein the at least one tube lens is configured to correct an imaging performance metric for a combination of the objective lens, the at least one tube lens, and the at least one image sensor when imaging an interior surface of the flow cell, and wherein the flow cell has a wall thickness of at least 700 µm and a gap between an upper interior surface and a lower interior surface of at least 50 µm; wherein the imaging performance metric is substantially the same for imaging the upper interior surface or the lower interior surface of the flow cell without moving an optical compensator into or out of an optical path between the flow cell and the at least one image sensor, without moving one or more optical elements of the tube lens along the optical path, and without moving one or more optical elements of the tube lens into or out of the optical path.

In some aspects, the objective lens may be a commercially-available microscope objective. In some aspects, the commercially-available microscope objective may have a numerical aperture of at least 0.3. In some aspects, the objective lens may have a working distance of at least 700 µm. In some aspects, the objective lens may be corrected to compensate for a cover slip thickness (or flow cell wall thickness) of 0.17 mm or of greater or lesser thickness than 0.17 mm. In some aspects, the optical system may be corrected to compensate for cover slip thickness, flow cell thickness, or distance between desired focal planes. In some aspects, said correction may be made by inserting a corrective optic, such as a lens or optical assembly into the light path of the optical system. In some aspects, said correction may be made without inserting a corrective optic, such as a lens or optical assembly into the light path of the optical system. In some aspects, the fluorescence imaging system may further comprise an electro-optical phase plate positioned adjacent to the objective lens and between the objective lens and the tube lens, wherein the electro-optical phase plate may provide correction for optical aberrations caused by a fluid filling the gap between the upper interior surface and the lower interior surface of the flow cell. In some aspects, the at least one tube lens may be a compound lens comprising three or more optical components. In some aspects, the at least one tube lens is a compound lens comprising four optical components, which may comprise one or more of a first asymmetric convex-convex lens, a second convex-plano lens, a third asymmetric concave-concave lens, and a fourth asymmetric convex-concave lens which may be present in the order as listed above, or in any alternate order. In some aspects, the at least one tube lens is configured to correct an imaging performance metric for a combination of the objective lens, the at least one tube lens, and the at least one image sensor when imaging an interior surface of a flow cell having a wall thickness of at least 1 mm. In some aspects, the at least one tube lens is configured to correct an imaging performance metric for a combination of the objective lens, the at least one tube lens, and the at least one image sensor when imaging an interior surface of a flow cell having a gap of at least 100 µm. In some aspects, the at least one tube lens is configured to correct an imaging performance metric for a combination of the objective lens, the at least one tube lens, and the at least one image sensor when imaging an interior surface of a flow cell having a gap of at least 200 µm. In some aspects, the system comprises a single objective lens, two tube lenses, and two image sensors, and each of the two tube lenses is designed to provide optimal imaging performance at a different fluorescence wavelength. In some aspects, the system comprises a single objective lens, three tube lenses, and three image sensors, and each of the three tube lenses is designed to provide optimal imaging performance at a different fluorescence wavelength. In some aspects, the system comprises a single objective lens, four tube lenses, and four image sensors, and each of the four tube lenses is designed to provide optimal imaging performance at a different fluorescence wavelength. In some aspects, the design of the objective lens or the at least one tube lens is configured to optimize the modulation transfer function in the mid to high spatial frequency range. In some aspects, the imaging performance metric comprises a measurement of modulation transfer function (MTF) at one or more specified spatial frequencies, defocus, spherical aberration, chromatic aberration, coma, astigmatism, field curvature, image distortion, contrast-to-noise ratio (CNR), or any combination thereof. In some aspects, the difference in the imaging performance metric for imaging the upper interior surface and the lower interior surface of the flow cell is less than 10%. In some aspects, the difference in imaging performance metric for imaging the upper interior surface and the lower interior surface of the flow cell is less than 5%. In some aspects, the use of the at least one tube lens provides for an at least equivalent or better improvement in the imaging performance metric for dual-side imaging compared to that for a conventional system comprising an objective lens, a motion-actuated compensator, and an image sensor. In some aspects, the use of the at least one tube lens provides for an at least 10% improvement in the imaging performance metric for dual-side imaging compared to that for a conventional system comprising an objective lens, a motion-actuated compensator, and an image sensor.

Disclosed herein are illumination systems for use in imaging-based solid-phase genotyping and sequencing applications, the illumination system comprising: a) a light source; and b) a liquid light-guide configured to collect light emitted by the light source and deliver it to a specified field-of-illumination on a support surface comprising tethered biological macromolecules.

In some aspects, the illumination system further comprises a condenser lens. In some aspects, the specified field-of-illumination has an area of at least 2 mm$^2$. In some aspects, the light delivered to the specified field-of-illumination is of uniform intensity across a specified field-of-view for an imaging system used to acquire images of the support surface. In some aspects, the specified field-of-view has an area of at least 2 mm$^2$. In some aspects, the light delivered to the specified field-of-illumination is of uniform intensity across the specified field-of-view when a coefficient of variation (CV) for light intensity is less than 10%. In some aspects, the light delivered to the specified field-of-illumination is of uniform intensity across the specified field-of-view when a coefficient of variation (CV) for light intensity is less than 5%. In some aspects, the light delivered to the specified field-of-illumination has a speckle contrast value of less than 0.1. In some aspects, the light delivered to the specified field-of-illumination has a speckle contrast value of less than 0.05.

Imaging modules and systems: It will be understood by those of skill in the art that the disclosed optical systems, imaging systems, or modules may, in some instances, be stand-alone optical systems designed for imaging a sample or substrate surface. In some instances, they may comprise one or more processors or computers. In some instances, they may comprise one or more software packages that provide instrument control functionality and/or image processing functionality. In some instances, in addition to optical components such as light sources (e.g., solid-state lasers, dye lasers, diode lasers, arc lamps, tungsten-halogen lamps, etc.), lenses, prisms, mirrors, dichroic reflectors, optical filters, optical bandpass filters, apertures, and image sensors (e.g., complementary metal oxide semiconductor (CMOS) image sensors and cameras, charge-coupled device (CCD) image sensors and cameras, etc.), they may also include mechanical and/or optomechanical components, such as an X-Y translation stage, an X-Y-Z translation stage, a piezoelectic focusing mechanism, and the like. In some instances, they may function as modules, components, sub-assemblies, or sub-systems of larger systems designed for genomics applications (e.g., genetic testing and/or nucleic acid sequencing applications). For example, in some instances, they may function as modules, components, sub-assemblies, or sub-systems of larger systems that further comprise light-tight and/or other environmental control housings, temperature control modules, fluidics control modules, fluid dispensing robotics, pick-and-place robotics, one or more processors or computers, one or more local and/or cloud-based software packages (e.g., instrument/ system control software packages, image processing software packages, data analysis software packages), data storage modules, data communication modules (e.g., Bluetooth, WiFi, intranet, or internet communication hardware and associated software), display modules, or any combination thereof.

Methods for Sequencing

Some aspects of the present disclosure provide methods for sequencing immobilized or non-immobilized template molecules. The methods can be operated in system 100, for example, in sequencer 114. In some aspects, the immobilized template molecules comprise a plurality of nucleic acid template molecules having one copy of a target sequence of interest. In some aspects, nucleic acid template molecules having one copy of a target sequence of interest can be generated by conducting bridge amplification using linear library molecules. In some aspects, the immobilized template molecules comprise a plurality of nucleic acid template molecules each having two or more tandem copies of a target sequence of interest (e.g., concatemers). In some aspects, nucleic acid template molecules comprising concatemer molecules can be generated by conducting rolling circle amplification of circularized linear library molecules. In some aspects, the non-immobilized template molecules comprise circular molecules. In some aspects, methods for sequencing employ soluble (e.g., non-immobilized) sequencing polymerases or sequencing polymerases that are immobilized to a support.

In some aspects, the sequencing reactions employ detectably labeled nucleotide analogs. In some aspects, the sequencing reactions employ a two-stage sequencing reaction comprising binding detectably labeled multivalent molecules, and incorporating nucleotide analogs. In some aspects, the sequencing reactions employ non-labeled nucleotide analogs. In some aspects, the sequencing reactions employ phosphate chain labeled nucleotides.

In some aspects, the immobilized concatemers each comprise tandem repeat units of the sequence-of-interest (e.g., insert region) and any adaptor sequences. For example, the tandem repeat unit comprises: (i) a left universal adaptor sequence having a binding sequence for a first surface primer (720) (e.g., surface pinning primer), (ii) a left universal adaptor sequence having a binding sequence for a first sequencing primer (740) (e.g., forward sequencing primer), (iii) a sequence-of-interest (710), (iv) a right universal adaptor sequence having a binding sequence for a second sequencing primer (750) (e.g., reverse sequencing primer), (v) a right universal adaptor sequence having a binding sequence for a second surface primer (730) (e.g., surface capture primer), and (vii) a left sample index sequence (760) and/or a right sample index sequence (770). In some aspects, the tandem repeat unit further comprises a left unique identification sequence (780) and/or a right unique identification sequence (790). In some aspects, the tandem repeat unit further comprises at least one binding sequence for a compaction oligonucleotide. In some aspects, FIGS. 6 and 7 show linear library molecules or a unit of a concatemer molecule.

The immobilized concatemer can self-collapse into a compact nucleic acid nanoball. Inclusion of one or more compaction oligonucleotides during the RCA reaction can further compact the size and/or shape of the nanoball. An increase in the number of tandem repeat units in a given concatemer increases the number of sites along the concatemer for hybridizing to multiple sequencing primers (e.g., sequencing primers having a universal sequence) which serve as multiple initiation sites for polymerase-catalyzed sequencing reactions. When the sequencing reaction employs detectably labeled nucleotides and/or detectably labeled multivalent molecules (e.g., having nucleotide units), the signals emitted by the nucleotides or nucleotide units that participate in the parallel sequencing reactions along the concatemer yields an increased signal intensity for each concatemer. Multiple portions of a given concatemer can be simultaneously sequenced. Furthermore, a plurality of binding complexes can form along a particular concatemer molecule, each binding complex comprising a sequencing polymerase bound to a template/primer duplex and bound to a multivalent molecule, wherein the plurality of binding complexes remain stable without dissociation resulting in increased persistence time which increases signal intensity and reduces imaging time.

Methods for Sequencing Using Nucleotide Analogs

Some aspects of the present disclosure provide methods for sequencing any of the immobilized template molecules described herein, the methods comprising step (a): contacting a sequencing polymerase to (i) a nucleic acid template molecule and (ii) a nucleic acid sequencing primer, wherein the contacting is conducted under a condition suitable to bind the sequencing polymerase to the nucleic acid template molecule which is hybridized to the nucleic acid primer, wherein the nucleic acid template molecule hybridized to the nucleic acid primer forms the nucleic acid duplex. In some aspects, the sequencing polymerase comprises a recombinant mutant sequencing polymerase that can bind and incorporate nucleotide analogs.

In some aspects, in the methods for sequencing template molecules, the sequencing primer comprises a 3' extendible end or a 3' non-extendible end. In some aspects, the plurality of nucleic acid template molecules comprise amplified template molecules (e.g., clonally amplified template molecules). In some aspects, the plurality of nucleic acid template molecules comprise one copy of a target sequence of interest. In some aspects, the plurality of nucleic acid molecules comprise two or more tandem copies of a target sequence of interest (e.g., concatemers). In some aspects, the plurality of nucleic acid template molecules comprise the same target sequence of interest or different target sequences of interest. In some aspects, the plurality of nucleic acid primers are in solution or are immobilized to a support. In some aspects, when the plurality of nucleic acid template molecules and/or the plurality of nucleic acid primers are immobilized to a support, the binding with the first sequencing polymerase generates a plurality of immobilized first complexed polymerases. In some aspects, the plurality of nucleic acid template molecules and/or nucleic acid primers are immobilized to 102-1015 different sites on a support. In some aspects, the binding of the plurality of template molecules and nucleic acid primers with the plurality of first sequencing polymerases generates a plurality of first complexed polymerases immobilized to 102-1015 different sites on the support. In some aspects, the plurality of immobilized first complexed polymerases on the support are immobilized to pre-determined or to random sites on the support. In some aspects, the plurality of immobilized first complexed polymerases are in fluid communication with each other to permit flowing a solution of reagents (e.g., enzymes including sequencing polymerases, multivalent molecules, nucleotides, and/or divalent cations) onto the support so that the plurality of immobilized complexed polymerases on the support are reacted with the solution of reagents in a massively parallel manner.

In some aspects, the methods for sequencing further comprise step (b): contacting the sequencing polymerase with a plurality of nucleotides under a condition suitable for binding at least one nucleotide to the sequencing polymerase which is bound to the nucleic acid duplex and suitable for polymerase-catalyzed nucleotide incorporation which extends the sequencing primer by one nucleotide. In some aspects, the sequencing polymerase is contacted with the plurality of nucleotides in the presence of at least one catalytic cation comprising magnesium and/or manganese. In some aspects, the plurality of nucleotides comprises at least one nucleotide analog having a chain terminating moiety at the sugar 2' or 3' position. In some aspects, the chain terminating moiety is removable from the sugar 2' or 3' position to convert the chain terminating moiety to an OH or H group. In some aspects, the plurality of nucleotides comprises at least one nucleotide that lacks a chain terminating moiety. In some aspects, at least on nucleotide is labeled with a detectable reporter moiety (e.g., fluorophore) that emits a detectable signal. The detectable reporter moiety comprises a fluorophore. In some aspects, the fluorophore is attached to the nucleo-base. In some aspects, the fluorophore is attached to the nucleo-base with a linker which is cleavable/removable from the base. In some aspects, at least one of the nucleotides in the plurality is not labeled with a detectable reporter moiety. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleo-base. When the incorporated chain terminating nucleotide is detectably labeled, step (b) further comprises detecting the emitted signal from the incorporated chain terminating nucleotide. In some aspects, step (b) further comprises identifying the nucleo-based of the incorporated chain terminating nucleotide.

In some aspects, the methods for sequencing further comprise step (c): removing the chain terminating moiety from the incorporated chain terminating nucleotide to generate an extendible 3'OH group. In some aspects, step (c) further comprises removing the detectable label from the incorporated chain terminating nucleotide. In some aspects, the sequencing polymerase remains bound to the template molecule which is hybridized to the sequencing primer which is extended by one nucleo-base.

In some aspects, the methods for sequencing further comprise step (d): repeating steps (b) and (c) at least once.

Two-Stage Methods for Nucleic Acid Sequencing

Some aspects of the present disclosure provide a two-stage method for sequencing any of the immobilized template molecules described herein. In some aspects, the first stage generally comprises binding multivalent molecules to complexed polymerases to form multivalent-complexed polymerases, and detecting the multivalent-complexed polymerases.

In some aspects, the first stage comprises step (a): contacting a plurality of a first sequencing polymerase to (i) a plurality of nucleic acid template molecules and (ii) a plurality of nucleic acid sequencing primers, wherein the contacting is conducted under a condition suitable to bind the plurality of first sequencing polymerases to the plurality of nucleic acid template molecules and the plurality of nucleic acid primers thereby forming a plurality of first complexed polymerases each comprising a first sequencing polymerase bound to a nucleic acid duplex wherein the nucleic acid duplex comprises a nucleic acid template molecule hybridized to a nucleic acid primer. In some aspects, the first polymerase comprises a recombinant mutant sequencing polymerase.

In some aspects, in the methods for sequencing template molecules, the sequencing primer comprises an oligonucleotide having a 3' extendible end or a 3' non-extendible end. In some aspects, the plurality of nucleic acid template molecules comprise amplified template molecules (e.g., clonally amplified template molecules). In some aspects, the plurality of nucleic acid template molecules comprise one copy of a target sequence of interest. In some aspects, the plurality of nucleic acid molecules comprise two or more tandem copies of a target sequence of interest (e.g., concatemers). In some aspects, the nucleic acid template molecules in the plurality of nucleic acid template molecules comprise the same target sequence of interest or different target sequences of interest. In some aspects, the plurality of nucleic acid template molecules and/or the plurality of nucleic acid primers are in solution or are immobilized to a support. In some aspects, when the plurality of nucleic acid template molecules and/or the plurality of nucleic acid primers are immobilized to a support, the binding with the first sequencing polymerase generates a plurality of immobilized first complexed polymerases. In some aspects, the plurality of nucleic acid template molecules and/or nucleic acid primers are immobilized to 102-1015 different sites on a support. In some aspects, the binding of the plurality of template molecules and nucleic acid primers with the plurality of first sequencing polymerases generates a plurality of first complexed polymerases immobilized to 102-1015 different sites on the support. In some aspects, the plurality of immobilized first complexed polymerases on the support are immobilized to pre-determined or to random sites on the support. In some aspects, the plurality of immobilized first complexed polymerases are in fluid communication with each other to permit flowing a solution of reagents (e.g., enzymes including sequencing polymerases, multivalent molecules, nucleotides, and/or divalent cations) onto the support so that the plurality of immobilized complexed polymerases on the support are reacted with the solution of reagents in a massively parallel manner.

In some aspects, the methods for sequencing further comprise step (b): contacting the plurality of first complexed polymerases with a plurality of multivalent molecules to form a plurality of multivalent-complexed polymerases (e.g., binding complexes). In some aspects, individual multivalent molecules in the plurality of multivalent molecules comprise a core attached to multiple nucleotide arms and each nucleotide arm is attached to a nucleotide (e.g., nucleotide unit) (e.g., FIGS. 9-13). In some aspects, the contacting of step (b) is conducted under a condition suitable for binding complementary nucleotide units of the multivalent molecules to at least two of the plurality of first complexed polymerases thereby forming a plurality of multivalent-complexed polymerases. In some aspects, the condition is suitable for inhibiting polymerase-catalyzed incorporation of the complementary nucleotide units into the primers of the plurality of multivalent-complexed polymerases. In some aspects, the plurality of multivalent molecules comprise at least one multivalent molecule having multiple nucleotide arms (e.g., FIGS. 9-12) each attached with a nucleotide analog (e.g., nucleotide analog unit), where the nucleotide analog includes a chain terminating moiety at the sugar 2' and/or 3' position. In some aspects, the plurality of multivalent molecules comprises at least one multivalent molecule comprising multiple nucleotide arms each attached with a nucleotide unit that lacks a chain terminating moiety. In some aspects, at least one of the multivalent molecules in the plurality of multivalent molecules is labeled with a detectable reporter moiety that emits a signal. In some aspects, the detectable reporter moiety comprises a fluorophore. In some aspects, the contacting of step (b) is conducted in the presence of at least one non-catalytic cation comprising strontium, barium and/or calcium.

In some aspects, the methods for sequencing further comprise step (c): detecting the plurality of multivalent-complexed polymerases. In some aspects, the detecting includes detecting the signals emitted by the multivalent molecules that are bound to the complexed polymerases, where the complementary nucleotide units of the multivalent molecules are bound to the primers but incorporation of the complementary nucleotide units is inhibited. In some aspects, the multivalent molecules are labeled with a detectable reporter moiety to permit detection. In some aspects, the labeled multivalent molecules comprise a fluorophore attached to the core, linker and/or nucleotide unit of the multivalent molecules.

In some aspects, the methods for sequencing further comprise step (d): identifying the nucleo-base of the complementary nucleotide units that are bound to the plurality of first complexed polymerases, thereby determining the sequence of the template molecule. In some aspects, the multivalent molecules are labeled with a detectable reporter moiety that corresponds to the particular nucleotide units attached to the nucleotide arms to permit identification of the complementary nucleotide units (e.g., nucleotide base adenine, guanine, cytosine, thymine or uracil) that are bound to the plurality of first complexed polymerases.

In some aspects, the methods for sequencing further comprise step (e): dissociating the plurality of multivalent-complexed polymerases and removing the plurality of first sequencing polymerases and their bound multivalent molecules, and retaining the plurality of nucleic acid duplexes.

In some aspects, the second stage of the two-stage sequencing method generally comprises nucleotide incorporation. In some aspects, the methods for sequencing further comprises step (f): contacting the plurality of the retained nucleic acid duplexes of step (e) with a plurality of second sequencing polymerases, wherein the contacting is conducted under a condition suitable for binding the plurality of second sequencing polymerases to the plurality of the retained nucleic acid duplexes, thereby forming a plurality of second complexed polymerases each comprising a second sequencing polymerase bound to a nucleic acid duplex. In some aspects, the second sequencing polymerase comprises a recombinant mutant sequencing polymerase.

In some aspects, the plurality of first sequencing polymerases of step (a) have an amino acid sequence that is 100% identical to the amino acid sequence as the plurality of the second sequencing polymerases of step (f). In some aspects, the plurality of first sequencing polymerases of step (a) have an amino acid sequence that differs from the amino acid sequence of the plurality of the second sequencing polymerases of step (f).

In some aspects, the methods for sequencing further comprise step (g): contacting the plurality of second complexed polymerases with a plurality of nucleotides, wherein the contacting is conducted under a condition suitable for binding complementary nucleotides from the plurality of nucleotides to at least two of the second complexed polymerases thereby forming a plurality of nucleotide-complexed polymerases. In some aspects, the contacting of step (g) is conducted under a condition that is suitable for promoting polymerase-catalyzed incorporation of the bound complementary nucleotides into the primers of the nucleotide-complexed polymerases thereby extending the sequencing primer by one nucleo-base. In some aspects, the incorporating the nucleotide into the 3' end of the sequencing primer in step (g) comprises a primer extension reaction. In some aspects, the contacting of step (g) is conducted in the presence of at least one catalytic cation comprising magnesium and/or manganese. In some aspects, the plurality of nucleotides comprise native nucleotides (e.g., non-analog nucleotides) or nucleotide analogs. In some aspects, the plurality of nucleotides comprise a 2' and/or 3' chain terminating moiety which is removable or is not removable. In some aspects, at least one of the nucleotides in the plurality is not labeled with a detectable reporter moiety. In some aspects, the plurality of nucleotides are non-labeled. In some aspects, the plurality of nucleotides comprises a plurality of nucleotides labeled with detectable reporter moiety. The detectable reporter moiety comprises a fluorophore. In some aspects, the fluorophore is attached to the nucleotide base. In some aspects, the fluorophore is attached to the nucleotide base with a linker which is cleavable/removable from the base or is not removable from the base. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleotide base.

In some aspects, when the plurality of nucleotides in step (g) are detectably labeled, the methods for sequencing further comprise step (h): detecting the complementary nucleotides which are incorporated into the primers of the nucleotide-complexed polymerases. In some aspects, the plurality of nucleotides are labeled with a detectable reporter moiety to permit detection. In some aspects, when the plurality of nucleotides in step (g) are non-labeled, the detecting of step (h) is omitted.

In some aspects, when the plurality of nucleotides in step (g) are detectably labeled, the methods for sequencing further comprise step (i): identifying the bases of the complementary nucleotides which are incorporated into the primers of the nucleotide-complexed polymerases. In some aspects, the identification of the incorporated complementary nucleotides in step (i) can be used to confirm the identity of the complementary nucleotides of the multivalent molecules that are bound to the plurality of first complexed polymerases in step (d). In some aspects, the identifying of step (i) can be used to determine the sequence of the nucleic acid template molecules. In some aspects, when the plurality of nucleotides in step (g) are non-labeled, the identifying of step (i) is omitted.

In some aspects, the methods for sequencing further comprise step (j): removing the chain terminating moiety from the incorporated nucleotide when step (g) is conducted by contacting the plurality of second complexed polymerases with a plurality of nucleotides that comprise at least one nucleotide having a 2' and/or 3' chain terminating moiety.

In some aspects, the methods for sequencing further comprise step (k): repeating steps (a)-(j) at least once. In some aspects, the sequence of the nucleic acid template molecules can be determined by detecting and identifying the multivalent molecules that bind the sequencing polymerases but do not incorporate into the 3' end of the primer at steps (c) and (d). In some aspects, the sequence of the nucleic acid template molecule can be determined (or confirmed) by detecting and identifying the nucleotide that incorporates into the 3' end of the primer at steps (h) and (i).

In some aspects, in any of the methods for sequencing nucleic acid molecules, the binding of the plurality of first complexed polymerases with the plurality of multivalent molecules forms at least one avidity complex, the method comprising the steps: (a) binding a first nucleic acid primer, a first sequencing polymerase, and a first multivalent molecule to a first portion of a concatemer template molecule thereby forming a first binding complex, wherein a first nucleotide unit of the first multivalent molecule binds to the first sequencing polymerase; and (b) binding a second nucleic acid primer, a second sequencing polymerase, and the first multivalent molecule to a second portion of the same concatemer template molecule thereby forming a second binding complex, wherein a second nucleotide unit of the first multivalent molecule binds to the second sequencing polymerase, wherein the first and second binding complexes which include the same multivalent molecule forms an avidity complex. In some aspects, the first sequencing polymerase comprises any wild type or mutant polymerase described herein. In some aspects, the second sequencing polymerase comprises any wild type or mutant polymerase described herein. The concatemer template molecule comprises tandem repeat sequences of a sequence of interest and at least one universal sequencing primer binding site. The first and second nucleic acid primers can bind to a sequencing primer binding site along the concatemer template molecule. Exemplary multivalent molecules are shown in FIGS. 9-12.

In some aspects, in any of the methods for sequencing nucleic acid molecules, wherein the method includes binding the plurality of first complexed polymerases with the plurality of multivalent molecules to form at least one avidity complex, the method comprising the steps: (a) contacting the plurality of sequencing polymerases and the plurality of nucleic acid primers with different portions of a concatemer nucleic acid concatemer molecule to form at least first and second complexed polymerases on the same concatemer template molecule; (b) contacting a plurality of multivalent molecules to the at least first and second complexed polymerases on the same concatemer template molecule, under conditions suitable to bind a single multivalent molecule from the plurality to the first and second complexed polymerases, wherein at least a first nucleotide unit of the single multivalent molecule is bound to the first complexed polymerase which includes a first primer hybridized to a first portion of the concatemer template molecule thereby forming a first binding complex (e.g., first ternary complex), and wherein at least a second nucleotide unit of the single multivalent molecule is bound to the second complexed polymerase which includes a second primer hybridized to a second portion of the concatemer template molecule thereby forming a second binding complex (e.g., second ternary complex), wherein the contacting is conducted under a condition suitable to inhibit polymerase-catalyzed incorporation of the bound first and second nucleotide units in the first and second binding complexes, and wherein the first and second binding complexes which are bound to the same multivalent molecule forms an avidity complex; and (c) detecting the first and second binding complexes on the same concatemer template molecule, and (d) identifying the first nucleotide unit in the first binding complex thereby determining the sequence of the first portion of the concatemer template molecule, and identifying the second nucleotide unit in the second binding complex thereby determining the sequence of the second portion of the concatemer template molecule. In some aspects, the plurality of sequencing polymerases comprise any wild type or mutant sequencing polymerase described herein. The concatemer template molecule comprises tandem repeat sequences of a sequence of interest and at least one universal sequencing primer binding site. The plurality of nucleic acid primers can bind to a sequencing primer binding site along the concatemer template molecule. Exemplary multivalent molecules are shown in FIGS. 10-13.

Sequencing-by-Binding

Some aspects of the present disclosure provide methods for sequencing any of the immobilized template molecules described herein, wherein the sequencing methods comprise a sequencing-by-binding (SBB) procedure which employs non-labeled chain-terminating nucleotides. In some aspects, the sequencing-by-binding (SBB) method comprises the steps of (a) sequentially contacting a primed template nucleic acid with at least two separate mixtures under ternary complex stabilizing conditions, wherein the at least two separate mixtures each include a polymerase and a nucleotide, whereby the sequentially contacting results in the primed template nucleic acid being contacted, under the ternary complex stabilizing conditions, with nucleotide cognates for first, second and third base type base types in the template; (b) examining the at least two separate mixtures to determine whether a ternary complex formed; and (c) identifying the next correct nucleotide for the primed template nucleic acid molecule, wherein the next correct nucleotide is identified as a cognate of the first, second or third base type if ternary complex is detected in step (b), and wherein the next correct nucleotide is imputed to be a nucleotide cognate of a fourth base type based on the absence of a ternary complex in step (b); (d) adding a next correct nucleotide to the primer of the primed template nucleic acid after step (b), thereby producing an extended primer; and (e) repeating steps (a) through (d) at least once on the primed template nucleic acid that comprises the extended primer. Exemplary sequencing-by-binding methods are described in U.S. Pat. Nos. 10,246,744 and 10,731,141 (where the contents of both patents are hereby incorporated by reference in their entireties).

Methods for Sequencing using Phosphate-Chain Labeled Nucleotides

Some aspects of the present disclosure provide methods for sequencing using immobilized sequencing polymerases which bind non-immobilized template molecules, wherein the sequencing reactions are conducted with phosphate-chain labeled nucleotides. In some aspects, the sequencing methods comprise step (a): providing a support having a plurality of sequencing polymerases immobilized thereon. In some aspects, the sequencing polymerase comprises a processive DNA polymerase. In some aspects, the sequencing polymerase comprises a wild type or mutant DNA polymerase, including for example a Phi29 DNA polymerase. In some aspects, the support comprise a plurality of separate compartments and a sequencing polymerase is immobilized to the bottom of a compartment. In some aspects, the separate compartments comprise a silica bottom through which light can penetrate. In some aspects, the separate compartments comprise a silica bottom configured with a nanophotonic confinement structure comprising a hole in a metal cladding film (e.g., aluminum cladding film). In some aspects, the hole in the metal cladding has a small aperture, for example, approximately 70 nm. In some aspects, the height of the nanophotonic confinement structure is approximately 100 nm. In some aspects, the nanophotonic confinement structure comprises a zero mode waveguide (ZMW). In some aspects, the nanophotonic confinement structure contains a liquid.

In some aspects, the sequencing method further comprises step (b): contacting the plurality of immobilized sequencing polymerases with a plurality of single stranded circular nucleic acid template molecules and a plurality of oligonucleotide sequencing primers, under a condition suitable for individual immobilized sequencing polymerases to bind a single stranded circular template molecule, and suitable for individual sequencing primers to hybridize to individual single stranded circular template molecules, thereby generating a plurality of polymerase/template/primer complexes. In some aspects, the individual sequencing primers hybridize to a universal sequencing primer binding site on the single stranded circular template molecule.

In some aspects, the sequencing method further comprises step (c): contacting the plurality of polymerase/template/primer complexes with a plurality of phosphate chain labeled nucleotides each comprising an aromatic base, a five carbon sugar (e.g., ribose or deoxyribose), and phosphate chain comprising 3-20 phosphate groups, where the terminal phosphate group is linked to a detectable reporter moiety (e.g., a fluorophore). The first, second and third phosphate groups can be referred to as alpha, beta and gamma phosphate groups. In some aspects, a particular detectable reporter moiety which is attached to the terminal phosphate group corresponds to the nucleotide base (e.g., dATP, dGTP, dCTP, dTTP or dUTP) to permit detection and identification of the nucleo-base. In some aspects, the plurality of polymerase/template/primer complexes are contacted with the plurality of phosphate chain labeled nucleotides under a condition suitable for polymerase-catalyzed nucleotide incorporation. In some aspects, the sequencing polymerases are capable of binding a complementary phosphate chain labeled nucleotide and incorporating the complementary nucleotide opposite a nucleotide in a template molecule. In some aspect, the polymerase-catalyzed nucleotide incorporation reaction cleaves between the alpha and beta phosphate groups thereby releasing a multi-phosphate chain linked to a fluorophore.

In some aspects, the sequencing method further comprises step (d): detecting the fluorescent signal emitted by the phosphate chain labeled nucleotide that is bound by the sequencing polymerase, and incorporated into the terminal end of the sequencing primer. In some aspects, step (d) further comprises identifying the phosphate chain labeled nucleotide that is bound by the sequencing polymerase, and incorporated into the terminal end of the sequencing primer.

In some aspects, the sequencing method further comprises step (d): repeating steps (c)-(d) at least once. In some aspects, sequencing methods that employ phosphate chain labeled nucleotides can be conducted according to the methods described in U.S. Pat. Nos. 7,170,050; 7,302,146; and/or 7,405,281.

Sequencing Polymerases

Some aspects of the present disclosure provide methods for sequencing nucleic acid molecules, where any of the sequencing methods described herein employ at least one type of sequencing polymerase and a plurality of nucleotides, or employ at least one type of sequencing polymerase and a plurality of nucleotides and a plurality of multivalent molecules. In some aspects, the sequencing polymerase(s) is/are capable of incorporating a complementary nucleotide opposite a nucleotide in a template molecule. In some aspects, the sequencing polymerase(s) is/are capable of binding a complementary nucleotide unit of a multivalent molecule opposite a nucleotide in a template molecule. In some aspects, the plurality of sequencing polymerases comprise recombinant mutant polymerases.

Examples of suitable polymerases for use in sequencing with nucleotides and/or multivalent molecules include but are not limited to: Klenow DNA polymerase; *Thermus aquaticus* DNA polymerase I (Taq polymerase); KlenTaq polymerase; Candidatus altiarchaeales archaeon; Candidatus Hadarchaeum Yellowstonense; Hadesarchaea archaeon; Euryarchaeota archaeon; Thermoplasmata archaeon; *Thermococcus* polymerases such as *Thermococcus litoralis*, bacteriophage T7 DNA polymerase; human alpha, delta and epsilon DNA polymerases; bacteriophage polymerases such as T4, RB69 and phi29 bacteriophage DNA polymerases; *Pyrococcus furiosus* DNA polymerase (Pfu polymerase); *Bacillus subtilis* DNA polymerase III; *E. coli* DNA polymerase III alpha and epsilon; 9 degree N polymerase; reverse transcriptases such as HIV type M or O reverse transcriptases; avian myeloblastosis virus reverse transcriptase; Moloney Murine Leukemia Virus (MMLV) reverse transcriptase; or telomerase. Further non-limiting examples of DNA polymerases include those from various Archaea genera, such as, *Aeropyrum, Archaeoglobus, Desulfurococcus, Pyrobaculum, Pyrococcus, Pyrolobus, Pyrodictium, Staphylothermus, Stetteria, Sulfolobus, Thermococcus*, and *Vulcanisaeta* and the like or variants thereof, including such polymerases as are known in the art such as 9 degrees N, VENT, DEEP VENT, THERMINATOR, Pfu, KOD, Pfx, Tgo and RB69 polymerases.

Nucleotides

Some aspects of the present disclosure provide methods for sequencing nucleic acid molecules, where any of the sequencing methods described herein employ at least one nucleotide. The nucleotides comprise a base, sugar and at least one phosphate group. In some aspects, at least one nucleotide in the plurality comprises an aromatic base, a five carbon sugar (e.g., ribose or deoxyribose), and one or more phosphate groups (e.g., 1-10 phosphate groups). The plurality of nucleotides can comprise at least one type of nucleotide selected from a group consisting of dATP, dGTP, dCTP, dTTP and dUTP. The plurality of nucleotides can comprise at a mixture of any combination of two or more types of nucleotides selected from a group consisting of dATP, dGTP, dCTP, dTTP and/or dUTP. In some aspects, at least one nucleotide in the plurality is not a nucleotide analog. In some aspects, at least one nucleotide in the plurality comprises a nucleotide analog.

In some aspects, in any of the methods for sequencing nucleic acid molecules described herein, at least one nucleotide in the plurality of nucleotides comprise a chain of one, two or three phosphorus atoms where the chain is typically attached to the 5' carbon of the sugar moiety via an ester or phosphoramide linkage. In some aspects, at least one nucleotide in the plurality is an analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

In some aspects, in any of the methods for sequencing nucleic acid molecules described herein, at least one nucleotide in the plurality of nucleotides comprises a terminator nucleotide analog having a chain terminating moiety (e.g., blocking moiety) at the sugar 2' position, at the sugar 3' position, or at the sugar 2' and 3' position. In some aspects, the chain terminating moiety can inhibit polymerase-catalyzed incorporation of a subsequent nucleotide unit or free nucleotide in a nascent strand during a primer extension reaction. In some aspects, the chain terminating moiety is attached to the 3' sugar position where the sugar comprises a ribose or deoxyribose sugar moiety. In some aspects, the chain terminating moiety is removable/cleavable from the 3' sugar position to generate a nucleotide having a 3'OH sugar group which is extendible with a subsequent nucleotide in a polymerase-catalyzed nucleotide incorporation reaction. In some aspects, the chain terminating moiety comprises an alkyl group, alkenyl group, alkynyl group, allyl group, aryl group, benzyl group, azide group, amine group, amide group, keto group, isocyanate group, phosphate group, thio group, disulfide group, carbonate group, urea group, silyl or acetal group. In some aspects, the chain terminating moiety is cleavable/removable from the nucleotide, for example by reacting the chain terminating moiety with a chemical agent, pH change, light or heat. In some aspects, the chain terminating moieties alkyl, alkenyl, alkynyl and allyl are cleavable with tetrakis(triphenylphosphine)palladium(0) (Pd (PPh3)4) with piperidine, or with 2,3-Dichloro-5,6-dicyano-1,4-benzo-quinone (DDQ). In some aspects, the chain terminating moieties aryl and benzyl are cleavable with H2 Pd/C. In some aspects, the chain terminating moieties amine, amide, keto, isocyanate, phosphate, thio, disulfide are cleavable with phosphine or with a thiol group including beta-mercaptoethanol or dithiothritol (DTT). In some aspects, the chain terminating moiety carbonate is cleavable with potassium carbonate (K2CO3) in MeOH, with triethylamine in pyridine, or with Zn in acetic acid (AcOH). In some aspects, the chain terminating moieties urea and silyl are cleavable with tetrabutylammonium fluoride, pyridine-HF, with ammonium fluoride, or with triethylamine trihydrofluoride. In some aspects, the chain terminating moiety may be cleavable/removable with nitrous acid. In some aspects, a chain terminating moiety may be cleavable/removable using a solution comprising nitrite, such as, for example, a combination of nitrite with an acid such as acetic acid, sulfuric acid, or nitric acid. In some further aspects, said solution may comprise an organic acid.

In some aspects, in any of the methods for sequencing nucleic acid molecules described herein, at least one nucleotide in the plurality of nucleotides comprises a terminator nucleotide analog having a chain terminating moiety (e.g., blocking moiety) at the sugar 2' position, at the sugar 3' position, or at the sugar 2' and 3' position. In some aspects, the chain terminating moiety comprises an azide, azido or azidomethyl group. In some aspects, the chain terminating moiety comprises a 3'-O-azido or 3'-O-azidomethyl group. In some aspects, the chain terminating moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl)phosphine (THPP). In some aspects, the cleaving agent comprises 4-dimethylaminopyridine (4-DMAP). In some aspects, the chain terminating moiety comprising one or more of a 3'-O-amino group, a 3'-O-aminomethyl group, a 3'-O-methylamino group, or derivatives thereof may be cleaved with nitrous acid, through a mechanism utilizing nitrous acid, or using a solution comprising nitrous acid. In some aspects, the chain terminating moiety comprising one or more of a 3'-O-amino group, a 3'-O-aminomethyl group, a 3'-O-methylamino group, or derivatives thereof may be cleaved using a solution comprising nitrite. In some aspects, for example, nitrite may be combined with or contacted with an acid such as acetic acid, sulfuric acid, or nitric acid. In some further aspects, for example, nitrite may be combined with or contacted with an organic acid such as, for example, formic acid, acetic acid, propionic acid, butyric acid, isobutyric acid, or the like. In some aspects, the chain terminating moiety comprises a 3'-acetal moiety which can be cleaved with a palladium deblocking reagent (e.g., Pd(0)).

In some aspects, in any of the methods for sequencing nucleic acid molecules described herein, the nucleotide comprises a chain terminating moiety which is selected from a group consisting of 3'-deoxy nucleotides, 2',3'-dideoxy-nucleotides, 3'-methyl, 3'-azido, 3'-azidomethyl, 3'-O-azido-alkyl, 3'-O-ethynyl, 3'-O-aminoalkyl, 3'-O-fluoroalkyl, 3'-fluoromethyl, 3'-difluoromethyl, 3'-trifluoromethyl, 3'-sulfonyl, 3'-malonyl, 3'-amino, 3'-O-amino, 3'-sulfhydral, 3'-aminomethyl, 3'-ethyl, 3'butyl, 3'-tert butyl, 3'-Fluorenylmethyloxycarbonyl, 3' tert-Butyloxycarbonyl, 3'-O-alkyl hydroxylamino group, 3'-phosphorothioate, 3-O-benzyl, and 3'-O-benzyl, 3-acetal moiety or derivatives thereof.

In some aspects, in any of the methods for sequencing nucleic acid molecules described herein, the plurality of nucleotides comprises a plurality of nucleotides labeled with detectable reporter moiety. The detectable reporter moiety comprises a fluorophore. In some aspects, the fluorophore is attached to the nucleotide base. In some aspects, the fluorophore is attached to the nucleotide base with a linker which is cleavable/removable from the base. In some aspects, at least one of the nucleotides in the plurality is not labeled with a detectable reporter moiety. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleotide base.

In some aspects, in any of the methods for sequencing nucleic acid molecules described herein, the cleavable linker on the nucleotide base comprises a cleavable moiety comprising an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the cleavable linker on the base is cleavable/removable from the base by reacting the cleavable moiety with a chemical agent, pH change, light or heat. In some aspects, the cleavable moieties alkyl, alkenyl, alkynyl and allyl are cleavable with tetrakis(triphenylphosphine)palladium(0) (Pd(PPh3)4) with piperidine, or with 2,3-Dichloro-5,6-dicyano-1,4-benzo-quinone (DDQ). In some aspects, the cleavable moieties aryl and benzyl are cleavable with H2 Pd/C. In some aspects, the cleavable moieties amine, amide, keto, isocyanate, phosphate, thio, disulfide are cleavable with phosphine or with a thiol group including beta-mercaptoethanol or dithiothritol (DTT). In some aspects, the cleavable moiety carbonate is cleavable with potassium carbonate (K2CO3) in MeOH, with triethylamine in pyridine, or with Zn in acetic acid (AcOH). In some aspects, the cleavable moieties urea and silyl are cleavable with tetrabutylammonium fluoride, pyridine-HF, with ammonium fluoride, or with triethylamine trihydrofluoride.

In some aspects, in any of the methods for sequencing nucleic acid molecules described herein, the cleavable linker on the nucleotide base comprises cleavable moiety including an azide, azido or azidomethyl group. In some aspects, the cleavable moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl)

phosphine (THPP). In some aspects, the cleaving agent comprises 4-dimethylaminopyridine (4-DMAP).

In some aspects, in any of the methods for sequencing nucleic acid molecules described herein, the chain terminating moiety (e.g., at the sugar 2' and/or sugar 3' position) and the cleavable linker on the nucleotide base have the same or different cleavable moieties. In some aspects, the chain terminating moiety (e.g., at the sugar 2' and/or sugar 3' position) and the detectable reporter moiety linked to the base are chemically cleavable/removable with the same chemical agent. In some aspects, the chain terminating moiety (e.g., at the sugar 2' and/or sugar 3' position) and the detectable reporter moiety linked to the base are chemically cleavable/removable with different chemical agents.

Multivalent Molecules

Some aspects of the present disclosure provide methods for sequencing nucleic acid molecules, where any of the sequencing methods described herein employ at least one multivalent molecule. In some aspects, the multivalent molecule comprises a plurality of nucleotide arms attached to a core and having any configuration including a starburst, helter skelter, or bottle brush configuration (e.g., FIG. 9). The multivalent molecule comprises: (1) a core; and (2) a plurality of nucleotide arms which comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit. In some aspects, the nucleotide unit comprises a base, sugar and at least one phosphate group, and the linker is attached to the nucleotide unit through the base. In some aspects, the linker comprises an aliphatic chain or an oligo ethylene glycol chain where both linker chains having 2-6 subunits. In some aspects, the linker also includes an aromatic moiety. An exemplary nucleotide arm is shown in FIG. 13. Exemplary multivalent molecules are shown in FIGS. 9-12. An exemplary spacer is shown in FIG. 14 (top) and exemplary linkers are shown in FIG. 15 (bottom) and FIG. 15. Exemplary nucleotides attached to a linker are shown in FIGS. 16-19. An exemplary biotinylated nucleotide arm is shown in FIG. 20.

In some aspects, a multivalent molecule comprises a core attached to multiple nucleotide arms, and wherein the multiple nucleotide arms have the same type of nucleotide unit which is selected from a group consisting of dATP, dGTP, dCTP, dTTP and dUTP.

In some aspects, a multivalent molecule comprises a core attached to multiple nucleotide arms, where each arm includes a nucleotide unit. The nucleotide unit comprises an aromatic base, a five carbon sugar (e.g., ribose or deoxyribose), and one or more phosphate groups (e.g., 1-10 phosphate groups). The plurality of multivalent molecules can comprise one type multivalent molecule having one type of nucleotide unit selected from a group consisting of dATP, dGTP, dCTP, dTTP and dUTP. The plurality of multivalent molecules can comprise at a mixture of any combination of two or more types of multivalent molecules, where individual multivalent molecules in the mixture comprise nucleotide units selected from a group consisting of dATP, dGTP, dCTP, dTTP and/or dUTP.

In some aspects, the nucleotide unit comprises a chain of one, two or three phosphorus atoms where the chain is typically attached to the 5' carbon of the sugar moiety via an ester or phosphoramide linkage. In some aspects, at least one nucleotide unit is a nucleotide analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

In some aspects, the multivalent molecule comprises a core attached to multiple nucleotide arms, and wherein individual nucleotide arms comprise a nucleotide unit which is a nucleotide analog having a chain terminating moiety (e.g., blocking moiety) at the sugar 2' position, at the sugar 3' position, or at the sugar 2' and 3' position. In some aspects, the nucleotide unit comprises a chain terminating moiety (e.g., blocking moiety) at the sugar 2' position, at the sugar 3' position, or at the sugar 2' and 3' position. In some aspects, the chain terminating moiety can inhibit polymerase-catalyzed incorporation of a subsequent nucleotide unit or free nucleotide in a nascent strand during a primer extension reaction. In some aspects, the chain terminating moiety is attached to the 3' sugar position where the sugar comprises a ribose or deoxyribose sugar moiety. In some aspects, the chain terminating moiety is removable/cleavable from the 3' sugar position to generate a nucleotide having a 3'OH sugar group which is extendible with a subsequent nucleotide in a polymerase-catalyzed nucleotide incorporation reaction. In some aspects, the chain terminating moiety comprises an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the chain terminating moiety is cleavable/removable from the nucleotide unit, for example by reacting the chain terminating moiety with a chemical agent, pH change, light or heat. In some aspects, the chain terminating moieties alkyl, alkenyl, alkynyl and allyl are cleavable with tetrakis(triphenylphosphine)palladium(0) (Pd(PPh3)4) with piperidine, or with 2,3-Dichloro-5,6-dicyano-1,4-benzo-quinone (DDQ). In some aspects, the chain terminating moieties aryl and benzyl are cleavable with H2 Pd/C. In some aspects, the chain terminating moieties amine, amide, keto, isocyanate, phosphate, thio, disulfide are cleavable with phosphine or with a thiol group including beta-mercaptoethanol or dithiothritol (DTT). In some aspects, the chain terminating moiety carbonate is cleavable with potassium carbonate (K2CO3) in MeOH, with triethylamine in pyridine, or with Zn in acetic acid (AcOH). In some aspects, the chain terminating moieties urea and silyl are cleavable with tetrabutylammonium fluoride, pyridine-HF, with ammonium fluoride, or with triethylamine trihydrofluoride.

In some aspects, the nucleotide unit comprises a chain terminating moiety (e.g., blocking moiety) at the sugar 2' position, at the sugar 3' position, or at the sugar 2' and 3' position. In some aspects, the chain terminating moiety comprises an azide, azido or azidomethyl group. In some aspects, the chain terminating moiety comprises a 3'-O-azido or 3'-O-azidomethyl group. In some aspects, the chain terminating moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl) phosphine (THPP). In some aspects, the cleaving agent comprises 4-dimethylaminopyridine (4-DMAP).

In some aspects, the nucleotide unit comprising a chain terminating moiety which is selected from a group consisting of 3'-deoxy nucleotides, 2',3'-dideoxynucleotides, 3'-methyl, 3'-azido, 3'-azidomethyl, 3'-O-azidoalkyl, 3'-O-ethynyl, 3'-O-aminoalkyl, 3'-O-fluoroalkyl, 3'-fluoromethyl, 3'-difluoromethyl, 3'-trifluoromethyl, 3'-sulfonyl, 3'-malonyl, 3'-amino, 3'-O-amino, 3'-sulfhydral, 3'-aminomethyl, 3'-ethyl, 3'butyl, 3'-tert butyl, 3'-Fluorenylmethyloxycarbonyl, 3' tert-Butyloxycarbonyl, 3'-O-alkyl hydroxylamino group, 3'-phosphorothioate, and 3-O-benzyl, or derivatives thereof.

In some aspects, the multivalent molecule comprises a core attached to multiple nucleotide arms, wherein the nucleotide arms comprise a spacer, linker and nucleotide unit, and wherein the core, linker and/or nucleotide unit is labeled with detectable reporter moiety. In some aspects, the detectable reporter moiety comprises a fluorophore. In some aspects, a particular detectable reporter moiety (e.g., fluorophore) that is attached to the multivalent molecule can correspond to the base (e.g., dATP, dGTP, dCTP, dTTP or dUTP) of the nucleotide unit to permit detection and identification of the nucleotide base.

In some aspects, at least one nucleotide arm of a multivalent molecule has a nucleotide unit that is attached to a detectable reporter moiety. In some aspects, the detectable reporter moiety is attached to the nucleotide base. In some aspects, the detectable reporter moiety comprises a fluorophore. In some aspects, a particular detectable reporter moiety (e.g., fluorophore) that is attached to the multivalent molecule can correspond to the base (e.g., dATP, dGTP, dCTP, dTTP or dUTP) of the nucleotide unit to permit detection and identification of the nucleotide base.

In some aspects, the core of a multivalent molecule comprises an avidin-like or streptavidin-like moiety and the core attachment moiety comprises biotin. In some aspects, the core comprises a streptavidin-type or avidin-type moiety which includes an avidin protein, as well as any derivatives, analogs and other non-native forms of avidin that can bind to at least one biotin moiety. Other forms of avidin moieties include native and recombinant avidin and streptavidin as well as derivatized molecules, e.g. non-glycosylated avidin and truncated streptavidins. For example, avidin moiety includes de-glycosylated forms of avidin, bacterial streptavidin produced by *Streptomyces* (e.g., *Streptomyces avidinii*), as well as derivatized forms, for example, N-acyl avidins, e.g., N-acetyl, N-phthalyl and N-succinyl avidin, and the commercially-available products EXTRAVIDIN, CAPTAVIDIN, NEUTRAVIDIN and NEUTRALITE AVIDIN.

In some aspects, any of the methods for sequencing nucleic acid molecules described herein can include forming a binding complex, where the binding complex comprises (i) a polymerase, a nucleic acid template molecule duplexed with a primer, and a nucleotide, or the binding complex comprises (ii) a polymerase, a nucleic acid template molecule duplexed with a primer, and a nucleotide unit of a multivalent molecule. In some aspects, the binding complex has a persistence time of greater than about 0.1, 0.2, 0.3, 0.4, 0.5, 0.6, 0.7, 0.8, 0.9 or 1 second. The binding complex has a persistence time of greater than about 0.1-0.25 seconds, or about 0.25-0.5 seconds, or about 0.5-0.75 seconds, or about 0.75-1 second, or about 1-2 seconds, or about 2-3 seconds, or about 3-4 second, or about 4-5 seconds, and/or wherein the method is or may be carried out at a temperature of at or above 15° C., at or above 20° C., at or above 25° C., at or above 35° C., at or above 37° C., at or above 42° C. at or above 55° C. at or above 60° C., or at or above 72° C., or at or above 80° C., or within a range defined by any of the foregoing. The binding complex (e.g., ternary complex) remains stable until subjected to a condition that causes dissociation of interactions between any of the polymerase, template molecule, primer and/or the nucleotide unit or the nucleotide. For example, a dissociating condition comprises contacting the binding complex with any one or any combination of a detergent, EDTA and/or water. In some aspects, the present disclosure provides said method wherein the binding complex is deposited on, attached to, or hybridized to, a surface showing a contrast to noise ratio in the detecting step of greater than 20. In some aspects, the present disclosure provides said method wherein the contacting is performed under a condition that stabilizes the binding complex when the nucleotide or nucleotide unit is complementary to a next base of the template nucleic acid, and destabilizes the binding complex when the nucleotide or nucleotide unit is not complementary to the next base of the template nucleic acid.

Compaction Oligonucleotides

A compaction oligonucleotide comprises a single-stranded linear oligonucleotide having a 5' region that can hybridize to a first portion of a concatemer molecule and the compaction oligonucleotide having a 3' region that can hybridize to a second portion of the concatemer molecule (e.g., the same concatemer molecule). In some aspects, hybridization of the compaction oligonucleotides to individual concatemer molecules causes the concatemer molecule to collapse or fold into a DNA nanoball which is more compact in shape and size compared to a non-collapsed DNA molecule. A spot image of a DNA nanoball can be represented as a Gaussian spot and the size can be measured as a full width half maximum (FWHM). A smaller spot size as indicated by a smaller FWHM typically correlates with an improved image of the spot. In some aspects, the FWHM of a DNA nanoball spot can be about 10 um or smaller. The DNA nanoball can be a compact nucleic acid structure having a full width half maximum (FWHM) that is smaller compared to a concatemer that is not collapsed/folded into a DNA nanoball.

In some aspects, compaction oligonucleotides comprise a single stranded oligonucleotides comprising DNA, RNA, or a combination of DNA and RNA. The compaction oligonucleotides can be any length, including 20-150 nucleotides, or 30-100 nucleotides, or 40-80 nucleotides in length.

In some aspects, the compaction oligonucleotides comprises a 5' region and a 3' region, and optionally an intervening region between the 5' and 3' regions. The intervening region can be any length, for example about 2-20 nucleotides in length. The intervening region comprises a homopolymer having consecutive identical bases (e.g., AAA, GGG, CCC, TTT or UUU). The intervening region comprises a non-homopolymer sequence.

The 5' region of the compaction oligonucleotides can be wholly complementary or partially complementary along its length to a first portion of a concatemer molecule. The 3' region of the compaction oligonucleotides can be wholly complementary or partially complementary along its length to a second portion of a concatemer molecule. The 5' region of the compaction oligonucleotides can hybridize to a first universal sequence portion of a concatemer molecule. The 3' region of the compaction oligonucleotides can hybridize to a second universal sequence portion of a concatemer molecule. The 5' and 3' regions of the compaction oligonucleotide can hybridize to the concatemer to pull together distal portions of the concatemer causing compaction of the concatemer to form a DNA nanoball.

The 5' region of the compaction oligonucleotide can have the same sequence as the 3' region. The 5' region of the compaction oligonucleotide can have a sequence that is different from the 3' region. The 3' region of the compaction oligonucleotide can have a sequence that is a reverse sequence of the 5' region.

In some aspects sequence data may be derived through nanopore sequencing, which comprises sequencing of a nucleic acid by translocating said nucleic acid across a membrane, such as through a pore, and wherein sequence reads or base calls are made by measuring one or more signals during the translocation event, such as impedance, current, voltage, or capacitance. In some aspects, the identity of a nucleotide may be determined by distinctive electrical signatures, such as the timing, duration, extent, or lineshape of a current block, impedance change, voltage change, or capacitance change. Sequencing of nucleic acids by translocation across a membrane and/or through a pore does not foreclose alternative detection methods, such as optical, chemical, biochemical, fluorescent, luminescent, magnetic, electromagnetic, acoustic, or electroacoustic detection.

Supports and Low Non-Specific Coatings

In some aspects, the flow cell 112 in FIG. 1 can include a support, e.g., a solid support as disclosed herein. The present disclosure provides pairwise sequencing compositions and methods which employ a support comprising a plurality of oligonucleotide surface primers immobilized thereon. In some aspects, the support is passivated with a low non-specific binding coating. The surface coatings described herein exhibit very low non-specific binding to reagents typically used for nucleic acid capture, amplification and sequencing workflows, such as dyes, nucleotides, enzymes, and nucleic acid primers. The surface coatings exhibit low background fluorescence signals or high contrast-to-noise (CNR) ratios compared to conventional surface coatings.

The low non-specific binding coating comprises one layer or multiple layers (FIG. 20). In some aspects, the plurality of surface primers are immobilized to the low non-specific binding coating. In some aspects, at least one surface primer is embedded within the low non-specific binding coating. The low non-specific binding coating enables improved nucleic acid hybridization and amplification performance. In general, the supports comprise a substrate (or support structure), one or more layers of a covalently or non-covalently attached low-binding, chemical modification layers, e.g., silane layers, polymer films, and one or more covalently or non-covalently attached surface primers that can be used for tethering single-stranded nucleic acid library molecules to the support. In some aspects, the formulation of the coating, e.g., the chemical composition of one or more layers, the coupling chemistry used to cross-link the one or more layers to the support and/or to each other, and the total number of layers, may be varied such that non-specific binding of proteins, nucleic acid molecules, and other hybridization and amplification reaction components to the coating is minimized or reduced relative to a comparable monolayer. The formulation of the coating described herein may be varied such that non-specific hybridization on the coating is minimized or reduced relative to a comparable monolayer. The formulation of the coating may be varied such that non-specific amplification on the coating is minimized or reduced relative to a comparable monolayer. The formulation of the coating may be varied such that specific amplification rates and/or yields on the coating are maximized. Amplification levels suitable for detection are achieved in no more than 2, 3, 4, 5, 6, 7, 8, 9, 10, 15, 20, 25, 30, or more than 30 amplification cycles in some cases disclosed herein.

The support structure that comprises the one or more chemically-modified layers, e.g., layers of a low non-specific binding polymer, may be independent or integrated into another structure or assembly. For example, in some aspects, the support structure may comprise one or more surfaces within an integrated or assembled microfluidic flow cell. The support structure may comprise one or more surfaces within a microplate format, e.g., the bottom surface of the wells in a microplate. In some aspects, the support structure comprises the interior surface (such as the lumen surface) of a capillary. In some aspects, the support structure comprises the interior surface (such as the lumen surface) of a capillary etched into a planar chip.

The attachment chemistry used to graft a first chemically-modified layer to the surface of the support will generally be dependent on both the material from which the surface is fabricated and the chemical nature of the layer. In some aspects, the first layer may be covalently attached to the surface. In some aspects, the first layer may be non-covalently attached, e.g., adsorbed to the support through non-covalent interactions such as electrostatic interactions, hydrogen bonding, or van der Waals interactions between the support and the molecular components of the first layer. In either case, the support may be treated prior to attachment or deposition of the first layer. Any of a variety of surface preparation techniques known to those of skill in the art may be used to clean or treat the surface. For example, glass or silicon surfaces may be acid-washed using a Piranha solution (a mixture of sulfuric acid (H2SO4) and hydrogen peroxide ($H_2O_2$)), base treatment in KOH and NaOH, and/or cleaned using an oxygen plasma treatment method.

Silane chemistries constitute non-limiting approaches for covalently modifying the silanol groups on glass or silicon surfaces to attach more reactive functional groups (e.g., amines or carboxyl groups), which may then be used in coupling linker molecules (e.g., linear hydrocarbon molecules of various lengths, such as C6, C12, C18 hydrocarbons, or linear polyethylene glycol (PEG) molecules) or layer molecules (e.g., branched PEG molecules or other polymers) to the surface. Examples of suitable silanes that may be used in creating any of the disclosed low binding coatings include, but are not limited to, (3-Aminopropyl) trimethoxysilane (APTMS), (3-Aminopropyl) triethoxysilane (APTES), any of a variety of PEG-silanes (e.g., comprising molecular weights of 1K, 2K, 5K, 10K, 20K, etc.), amino-PEG silane (i.e., comprising a free amino functional group), maleimide-PEG silane, biotin-PEG silane, and the like.

Any of a variety of molecules known to those of skill in the art including, but not limited to, amino acids, peptides, nucleotides, oligonucleotides, other monomers or polymers, or combinations thereof may be used in creating the one or more chemically-modified layers on the support, where the choice of components used may be varied to alter one or more properties of the layers, e.g., the surface density of functional groups and/or tethered oligonucleotide primers, the hydrophilicity/hydrophobicity of the layers, or the three three-dimensional nature (i.e., "thickness") of the layer. Examples of polymers that may be used to create one or more layers of low non-specific binding material in any of the disclosed coatings include, but are not limited to, polyethylene glycol (PEG) of various molecular weights and branching structures, streptavidin, polyacrylamide, polyester, dextran, poly-lysine, and poly-lysine copolymers, or any combination thereof. Examples of conjugation chemistries that may be used to graft one or more layers of material (e.g. polymer layers) to the surface and/or to cross-link the layers to each other include, but are not limited to, biotin-streptavidin interactions (or variations thereof), his tag-Ni/NTA conjugation chemistries, methoxy ether conjugation chemistries, carboxylate conjugation chemistries, amine conjugation chemistries, NHS esters, maleimides, thiol, epoxy, azide, hydrazide, alkyne, isocyanate, and silane.

The low non-specific binding surface coating may be applied uniformly across the support. Alternatively, the surface coating may be patterned, such that the chemical modification layers are confined to one or more discrete regions of the support. For example, the coating may be patterned using photolithographic techniques to create an ordered array or random pattern of chemically-modified regions on the support. Alternately or in combination, the coating may be patterned using, e.g., contact printing and/or ink-jet printing techniques. In some aspects, an ordered array or random pattern of chemically-modified regions may comprise at least 1, 5, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10,000 or more discrete regions.

In some aspects, the low nonspecific binding coatings comprise hydrophilic polymers that are non-specifically adsorbed or covalently grafted to the support. Typically, passivation is performed utilizing poly(ethylene glycol) (PEG, also known as polyethylene oxide (PEO) or polyoxyethylene) or other hydrophilic polymers with different molecular weights and end groups that are linked to a support using, for example, silane chemistry. The end groups distal from the surface can include, but are not limited to, biotin, methoxy ether, carboxylate, amine, NHS ester, maleimide, and bis-silane. In some aspects, two or more layers of a hydrophilic polymer, e.g., a linear polymer, branched polymer, or multi-branched polymer, may be deposited on the surface. In some aspects, two or more layers may be covalently coupled to each other or internally crosslinked to improve the stability of the resulting coating. In some aspects, surface primers with different nucleotide sequences and/or base modifications (or other biomolecules, e.g., enzymes or antibodies) may be tethered to the resulting layer at various surface densities. In some aspects, for example, both surface functional group density and surface primer concentration may be varied to attain a desired surface primer density range. Additionally, surface primer density can be controlled by diluting the surface primers with other molecules that carry the same functional group. For example, amine-labeled surface primers can be diluted with amine-labeled polyethylene glycol in a reaction with an NHS-ester coated surface to reduce the final primer density. Surface primers with different lengths of linker between the hybridization region and the surface attachment functional group can also be applied to control surface density. Example of suitable linkers include poly-T and poly-A strands at the 5' end of the primer (e.g., 0 to 20 bases), PEG linkers (e.g., 3 to 20 monomer units), and carbon-chain (e.g., C6, C12, C18, etc.). To measure the primer density, fluorescently-labeled primers may be tethered to the surface and a fluorescence reading then compared with that for a dye solution of known concentration.

In some aspects, the low nonspecific binding coatings comprise a functionalized polymer coating layer covalently bound at least to a portion of the support via a chemical group on the support, a primer grafted to the functionalized polymer coating, and a water-soluble protective coating on the primer and the functionalized polymer coating. In some aspects, the functionalized polymer coating comprises a poly(N-(5-azidoacetamidylpentyl)acrylamide-co-acrylamide (PAZAM).

In order to scale primer surface density and add additional dimensionality to hydrophilic or amphoteric coatings, supports comprising multi-layer coatings of PEG and other hydrophilic polymers have been developed. By using hydrophilic and amphoteric surface layering approaches that include, but are not limited to, the polymer/co-polymer materials described below, it is possible to increase primer loading density on the support significantly. Traditional PEG coating approaches use monolayer primer deposition, which have been generally reported for single molecule applications, but do not yield high copy numbers for nucleic acid amplification applications. As described herein "layering" can be accomplished using traditional crosslinking approaches with any compatible polymer or monomer subunits such that a surface comprising two or more highly crosslinked layers can be built sequentially. Examples of suitable polymers include, but are not limited to, streptavidin, poly acrylamide, polyester, dextran, poly-lysine, and copolymers of poly-lysine and PEG. In some aspects, the different layers may be attached to each other through any of a variety of conjugation reactions including, but not limited to, biotin-streptavidin binding, azide-alkyne click reaction, amine-NHS ester reaction, thiol-maleimide reaction, and ionic interactions between positively charged polymer and negatively charged polymer. In some aspects, high primer density materials may be constructed in solution and subsequently layered onto the surface in multiple steps.

Examples of materials from which the support structure may be fabricated include, but are not limited to, glass, fused-silica, silicon, a polymer (e.g., polystyrene (PS), macroporous polystyrene (MPPS), polymethylmethacrylate (PMMA), polycarbonate (PC), polypropylene (PP), polyethylene (PE), high density polyethylene (HDPE), cyclic olefin polymers (COP), cyclic olefin copolymers (COC), polyethylene terephthalate (PET)), or any combination thereof. Various compositions of both glass and plastic support structures are contemplated.

The support structure may be rendered in any of a variety of geometries and dimensions known to those of skill in the art, and may comprise any of a variety of materials known to those of skill in the art. For example, the support structure may be locally planar (e.g., comprising a microscope slide or the surface of a microscope slide). Globally, the support structure may be cylindrical (e.g., comprising a capillary or the interior surface of a capillary), spherical (e.g., comprising the outer surface of a non-porous bead), or irregular (e.g., comprising the outer surface of an irregularly-shaped, non-porous bead or particle). In some aspects, the surface of the support structure used for nucleic acid hybridization and amplification may be a solid, non-porous surface. In some aspects, the surface of the support structure used for nucleic acid hybridization and amplification may be porous, such that the coatings described herein penetrate the porous surface, and nucleic acid hybridization and amplification reactions performed thereon may occur within the pores.

The support structure that comprises the one or more chemically-modified layers, e.g., layers of a low non-specific binding polymer, may be independent or integrated into another structure or assembly. For example, the support structure may comprise one or more surfaces within an integrated or assembled microfluidic flow cell. The support structure may comprise one or more surfaces within a microplate format, e.g., the bottom surface of the wells in a microplate. In some aspects, the support structure comprises the interior surface (such as the lumen surface) of a capillary. In some aspects the support structure comprises the interior surface (such as the lumen surface) of a capillary etched into a planar chip.

As noted, the low non-specific binding supports of the present disclosure exhibit reduced non-specific binding of proteins, nucleic acids, and other components of the hybridization and/or amplification formulation used for solid-phase nucleic acid amplification. The degree of non-specific binding exhibited by a given support surface may be assessed either qualitatively or quantitatively. For example, exposure of the surface to fluorescent dyes (e.g., cyanins such as Cy3, or Cy5, etc., fluoresceins, coumarins, rhodamines, etc. or other dyes disclosed herein), fluorescently-labeled nucleotides, fluorescently-labeled oligonucleotides, and/or fluorescently-labeled proteins (e.g. polymerases) under a standardized set of conditions, followed by a specified rinse protocol and fluorescence imaging may be used as a qualitative tool for comparison of non-specific binding on supports comprising different surface formulations. In some aspects, exposure of the surface to fluorescent dyes, fluorescently-labeled nucleotides, fluorescently-labeled oligonucleotides, and/or fluorescently-labeled proteins (e.g. polymerases) under a standardized set of conditions, followed by a specified rinse protocol and fluorescence imaging may be used as a quantitative tool for comparison of non-specific binding on supports comprising different surface formulations-provided that care has been taken to ensure that the fluorescence imaging is performed under conditions where fluorescence signal is linearly related (or related in a predictable manner) to the number of fluorophores on the support surface (e.g., under conditions where signal saturation and/or self-quenching of the fluorophore is not an issue) and suitable calibration standards are used. In some aspects, other techniques known to those of skill in the art, for example, radioisotope labeling and counting methods may be used for quantitative assessment of the degree to which non-specific binding is exhibited by the different support surface formulations of the present disclosure.

Some surfaces disclosed herein exhibit a ratio of specific to nonspecific binding of a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein. Some surfaces disclosed herein exhibit a ratio of specific to nonspecific fluorescence of a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein.

The degree of non-specific binding exhibited by the disclosed low-binding supports may be assessed using a standardized protocol for contacting the surface with a labeled protein (e.g., bovine serum albumin (BSA), streptavidin, a DNA polymerase, a reverse transcriptase, a helicase, a single-stranded binding protein (SSB), etc., or any combination thereof), a labeled nucleotide, a labeled oligonucleotide, etc., under a standardized set of incubation and rinse conditions, followed be detection of the amount of label remaining on the surface and comparison of the signal resulting therefrom to an appropriate calibration standard. In some aspects, the label may comprise a fluorescent label. In some aspects, the label may comprise a radioisotope. In some aspects, the label may comprise any other detectable label known to one of skill in the art. In some aspects, the degree of non-specific binding exhibited by a given support surface formulation may thus be assessed in terms of the number of non-specifically bound protein molecules (or nucleic acid molecules or other molecules) per unit area. In some aspects, the low-binding supports of the present disclosure may exhibit non-specific protein binding (or non-specific binding of other specified molecules, (e.g., cyanins such as Cy3, or Cy5, etc., fluoresceins, coumarins, rhodamines, etc. or other dyes disclosed herein)) of less than 0.001 molecule per µm2, less than 0.01 molecule per µm2, less than 0.1 molecule per µm2, less than 0.25 molecule per µm2, less than 0.5 molecule per µm2, less than 1 molecule per µm2, less than 10 molecules per µm2, less than 100 molecules per µm2, or less than 1,000 molecules per µm2. Those of skill in the art will realize that a given support surface of the present disclosure may exhibit non-specific binding falling anywhere within this range, for example, of less than 86 molecules per µm2. For example, some modified surfaces disclosed herein exhibit nonspecific protein binding of less than 0.5 molecule/m2 following contact with a 1 µM solution of Cy3 labeled streptavidin (GE Amersham) in phosphate buffered saline (PBS) buffer for 15 minutes, followed by 3 rinses with deionized water. Some modified surfaces disclosed herein exhibit nonspecific binding of Cy3 dye molecules of less than 0.25 molecules per µm2. In independent nonspecific binding assays, 1 µM labeled Cy3 SA (ThermoFisher), 1 µM Cy5 SA dye (ThermoFisher), 10 µM Aminoallyl-dUTP-ATTO-647N (Jena Biosciences), 10 µM Aminoallyl-dUTP-ATTO-Rho1 1 (Jena Biosciences), 10 µM Aminoallyl-dUTP-ATTO-Rho1 1 (Jena Biosciences), 10 µM 7-Propargylamino-7-deaza-dGTP-Cy5 (Jena Biosciences, and 10 µM 7-Propargylamino-7-deaza-dGTP-Cy3 (Jena Biosciences) were incubated on the low binding coated supports at 37° C. for 15 minutes in a 384 well plate format. Each well was rinsed 2-3× with 50 ul deionized RNase/DNase Free water and 2-3× with 25 mM ACES buffer pH 7.4. The 384 well plates were imaged on a GE Typhoon instrument using the Cy3, AF555, or Cy5 filter sets (according to dye test performed) as specified by the manufacturer at a PMT gain setting of 800 and resolution of 50-100 m. For higher resolution imaging, images were collected on an Olympus IX83 microscope (e.g., inverted fluorescence microscope) (Olympus Corp., Center Valley, Pa.) with a total internal reflectance fluorescence (TTRF) objective (100×, 1.5 NA, Olympus), a CCD camera (e.g., an Olympus EM-CCD monochrome camera, Olympus XM-10 monochrome camera, or an Olympus DP80 color and monochrome camera), an illumination source (e.g., an Olympus 100 W Hg lamp, an Olympus 75 W Xe lamp, or an Olympus U-HGLGPS fluorescence light source), and excitation wavelengths of 532 nm or 635 nm. Dichroic mirrors were purchased from Semrock (IDEX Health & Science, LLC, Rochester, N.Y.), e.g., 405, 488, 532, or 633 nm dichroic reflectors/beamsplitters, and band pass filters were chosen as 532 LP or 645 LP concordant with the appropriate excitation wavelength. Some modified surfaces disclosed herein exhibit nonspecific binding of dye molecules of less than 0.25 molecules per µm2. In some aspects, the coated support was immersed in a buffer (e.g., 25 mM ACES, pH 7.4) while the image was acquired.

In some aspects, the surfaces disclosed herein exhibit a ratio of specific to nonspecific binding of a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein. In some aspects, the surfaces disclosed herein exhibit a ratio of specific to nonspecific fluorescence signals for a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein.

The low-background surfaces consistent with the disclosure herein may exhibit specific dye attachment (e.g., Cy3 attachment) to non-specific dye adsorption (e.g., Cy3 dye adsorption) ratios of at least 4:1, 5:1, 6:1, 7:1, 8:1, 9:1, 10:1, 15:1, 20:1, 30:1, 40:1, 50:1, or more than 50 specific dye molecules attached per molecule nonspecifically adsorbed. Similarly, when subjected to an excitation energy, low-background surfaces consistent with the disclosure herein to which fluorophores, e.g., Cy3, have been attached may exhibit ratios of specific fluorescence signal (e.g., arising from Cy3-labeled oligonucleotides attached to the surface) to non-specific adsorbed dye fluorescence signals of at least 4:1, 5:1, 6:1, 7:1, 8:1, 9:1, 10:1, 15:1, 20:1, 30:1, 40:1, 50:1, or more than 50:1.

In some aspects, the degree of hydrophilicity (or "wettability" with aqueous solutions) of the disclosed support surfaces may be assessed, for example, through the measurement of water contact angles in which a small droplet of water is placed on the surface and its angle of contact with the surface is measured using, e.g., an optical tensiometer. In some aspects, a static contact angle may be determined. In some aspects, an advancing or receding contact angle may be determined. In some aspects, the water contact angle for the hydrophilic, low-binding support surfaced disclosed herein may range from about 0 degrees to about 30 degrees. In some aspects, the water contact angle for the hydrophilic, low-binding support surfaced disclosed herein may no more than 50 degrees, 40 degrees, 30 degrees, 25 degrees, 20 degrees, 18 degrees, 16 degrees, 14 degrees, 12 degrees, 10 degrees, 8 degrees, 6 degrees, 4 degrees, 2 degrees, or 1 degree. In many cases the contact angle is no more than 40 degrees. Those of skill in the art will realize that a given hydrophilic, low-binding support surface of the present disclosure may exhibit a water contact angle having a value of anywhere within this range.

In some aspects, the hydrophilic surfaces disclosed herein facilitate reduced wash times for bioassays, often due to reduced nonspecific binding of biomolecules to the low-binding surfaces. In some aspects, adequate wash steps may be performed in less than 60, 50, 40, 30, 20, 15, 10, or less than 10 seconds. For example, adequate wash steps may be performed in less than 30 seconds.

Some low-binding surfaces of the present disclosure exhibit significant improvement in stability or durability to prolonged exposure to solvents and elevated temperatures, or to repeated cycles of solvent exposure or changes in temperature. For example, the stability of the disclosed surfaces may be tested by fluorescently labeling a functional group on the surface, or a tethered biomolecule (e.g., an oligonucleotide primer) on the surface, and monitoring fluorescence signal before, during, and after prolonged exposure to solvents and elevated temperatures, or to repeated cycles of solvent exposure or changes in temperature. In some aspects, the degree of change in the fluorescence used to assess the quality of the surface may be less than 1%, 2%, 3%, 4%, 5%, 10%, 15%, 20%, or 25% over a time period of 1 minute, 2 minutes, 3 minutes, 4 minutes, 5 minutes, 10 minutes, 20 minutes, 30 minutes, 40 minutes, 50 minutes, 60 minutes, 2 hours, 3 hours, 4 hours, 5 hours, 6 hours, 7 hours, 8 hours, 9 hours, 10 hours, 15 hours, 20 hours, 25 hours, 30 hours, 35 hours, 40 hours, 45 hours, 50 hours, or 100 hours of exposure to solvents and/or elevated temperatures (or any combination of these percentages as measured over these time periods). In some aspects, the degree of change in the fluorescence used to assess the quality of the surface may be less than 1%, 2%, 3%, 4%, 5%, 10%, 15%, 20%, or 25% over 5 cycles, 10 cycles, 20 cycles, 30 cycles, 40 cycles, 50 cycles, 60 cycles, 70 cycles, 80 cycles, 90 cycles, 100 cycles, 200 cycles, 300 cycles, 400 cycles, 500 cycles, 600 cycles, 700 cycles, 800 cycles, 900 cycles, or 1,000 cycles of repeated exposure to solvent changes and/or changes in temperature (or any combination of these percentages as measured over this range of cycles).

In some aspects, the surfaces disclosed herein may exhibit a high ratio of specific signal to nonspecific signal or other background. For example, when used for nucleic acid amplification, some surfaces may exhibit an amplification signal that is at least 4, 5, 6, 7, 8, 9, 10, 15, 20, 30, 40, 50, 75, 100, or greater than 100 fold greater than a signal of an adjacent unpopulated region of the surface. Similarly, some surfaces exhibit an amplification signal that is at least 4, 5, 6, 7, 8, 9, 10, 15, 20, 30, 40, 50, 75, 100, or greater than 100 fold greater than a signal of an adjacent amplified nucleic acid population region of the surface.

In some aspects, fluorescence images of the disclosed low background surfaces when used in nucleic acid hybridization or amplification applications to create polonies of hybridized or clonally-amplified nucleic acid molecules (e.g., that have been directly or indirectly labeled with a fluorophore) exhibit contrast-to-noise ratios (CNRs) of at least 10, 20, 30, 40, 50, 60, 70, 80, 90, 100, 110, 120, 130, 140, 150, 160, 170, 180, 190, 20, 210, 220, 230, 240, 250, or greater than 250.

One or more types of primer may be attached or tethered to the support surface. In some aspects, the one or more types of adapters or primers may comprise spacer sequences, adapter sequences for hybridization to adapter-ligated target library nucleic acid sequences, forward amplification primers, reverse amplification primers, sequencing primers, and/or molecular barcoding sequences, or any combination thereof. In some aspects, 1 primer or adapter sequence may be tethered to at least one layer of the surface. In some aspects, at least 2, 3, 4, 5, 6, 7, 8, 9, 10, or more than 10 different primer or adapter sequences may be tethered to at least one layer of the surface.

In some aspects, the tethered adapter and/or primer sequences may range in length from about 10 nucleotides to about 100 nucleotides. In some aspects, the tethered adapter and/or primer sequences may be at least 10, at least 20, at least 30, at least 40, at least 50, at least 60, at least 70, at least 80, at least 90, or at least 100 nucleotides in length. In some aspects, the tethered adapter and/or primer sequences may be at most 100, at most 90, at most 80, at most 70, at most 60, at most 50, at most 40, at most 30, at most 20, or at most 10 nucleotides in length. Any of the lower and upper values described in this paragraph may be combined to form a range included within the present disclosure, for example, in some aspects the length of the tethered adapter and/or primer sequences may range from about 20 nucleotides to about 80 nucleotides. Those of skill in the art will recognize that the length of the tethered adapter and/or primer sequences may have any value within this range, e.g., about 24 nucleotides.

In some aspects, the resultant surface density of primers (e.g., capture primers) on the low binding support surfaces of the present disclosure may range from about 100 primer molecules per µm2 to about 100,000 primer molecules per µm2. In some aspects, the resultant surface density of primers on the low binding support surfaces of the present disclosure may range from about 1,000 primer molecules per µm2 to about 1,000,000 primer molecules per m2. In some aspects, the surface density of primers may be at least 1,000, at least 10,000, at least 100,000, or at least 1,000,000 molecules per µm2. In some aspects, the surface density of primers may be at most 1,000,000, at most 100,000, at most 10,000, or at most 1,000 molecules per µm2. Any of the lower and upper values described in this paragraph may be combined to form a range included within the present disclosure, for example, in some aspects the surface density of primers may range from about 10,000 molecules per µm2 to about 100,000 molecules per µm2. Those of skill in the art will recognize that the surface density of primer molecules may have any value within this range, e.g., about 455,000 molecules per µm2. In some aspects, the surface density of target library nucleic acid sequences initially hybridized to adapter or primer sequences on the support surface may be less than or equal to that indicated for the surface density of tethered primers. In some aspects, the surface density of clonally-amplified target library nucleic acid sequences hybridized to adapter or primer sequences on the support surface may span the same range as that indicated for the surface density of tethered primers.

Local densities as listed above do not preclude variation in density across a surface, such that a surface may comprise a region having an oligo density of, for example, 500,000/m2, while also comprising at least a second region having a substantially different local density.

In some aspects, the performance of nucleic acid hybridization and/or amplification reactions using the disclosed reaction formulations and low-binding supports may be assessed using fluorescence imaging techniques, where the contrast-to-noise ratio (CNR) of the images provides a key metric in assessing amplification specificity and non-specific binding on the support. CNR is commonly defined as: CNR=(Signal-Background)/Noise. The background term is commonly taken to be the signal measured for the interstitial regions surrounding a particular feature (diffraction limited spot, DLS) in a specified region of interest (ROI). While signal-to-noise ratio (SNR) is often considered to be a benchmark of overall signal quality, it can be shown that improved CNR can provide a significant advantage over SNR as a benchmark for signal quality in applications that require rapid image capture (e.g., sequencing applications for which cycle times must be minimized), as shown in the example below. At high CNR the imaging time required to reach accurate discrimination (and thus accurate base-calling in the case of sequencing applications) can be drastically reduced even with moderate improvements in CNR. Improved CNR in imaging data on the imaging integration time provides a method for more accurately detecting features such as clonally-amplified nucleic acid colonies on the support surface.

In most ensemble-based sequencing approaches, the background term is typically measured as the signal associated with 'interstitial' regions. In addition to "interstitial" background (Binter), "intrastitial" background (Bintra) exists within the region occupied by an amplified DNA colony. The combination of these two background signals dictates the achievable CNR, and subsequently directly impacts the optical instrument requirements, architecture costs, reagent costs, run-times, cost/genome, and ultimately the accuracy and data quality for cyclic array-based sequencing applications. The Binter background signal arises from a variety of sources; a few examples include auto-fluorescence from consumable flow cells, non-specific adsorption of detection molecules that yield spurious fluorescence signals that may obscure the signal from the ROI, the presence of non-specific DNA amplification products (e.g., those arising from primer dimers). In typical next generation sequencing (NGS) applications, this background signal in the current field-of-view (FOV) is averaged over time and subtracted. The signal arising from individual DNA colonies (i.e., (Signal)–B(interstial) in the FOV) yields a discernable feature that can be classified. In some aspects, the intrastitial background (B(intrastitial)) can contribute a confounding fluorescence signal that is not specific to the target of interest, but is present in the same ROI thus making it far more difficult to average and subtract.

Nucleic acid amplification on the low-binding coated supports described herein may decrease the B(interstitial) background signal by reducing non-specific binding, may lead to improvements in specific nucleic acid amplification, and may lead to a decrease in non-specific amplification that can impact the background signal arising from both the interstitial and intrastitial regions. In some aspects, the disclosed low-binding coated supports, optionally used in combination with the disclosed hybridization and/or amplification reaction formulations, may lead to improvements in CNR by a factor of 2, 5, 10, 100, 250, 500 or 1000-fold over those achieved using conventional supports and hybridization, amplification, and/or sequencing protocols. Although described here in the context of using fluorescence imaging as the read-out or detection mode, the same principles apply to the use of the disclosed low-binding coated supports and nucleic acid hybridization and amplification formulations for other detection modes as well, including both optical and non-optical detection modes.

The headings provided herein are not limitations of the various aspects of the disclosure, which aspects can be understood by reference to the specification as a whole.

Unless defined otherwise, technical and scientific terms used herein have meanings that are commonly understood by those of ordinary skill in the art unless defined otherwise. Generally, terminologies pertaining to techniques of molecular biology, nucleic acid chemistry, protein chemistry, genetics, microbiology, transgenic cell production, and hybridization described herein are those well-known and commonly used in the art. Techniques and procedures described herein are generally performed according to conventional methods well known in the art and as described in various general and more specific references that are cited and discussed throughout the instant specification. For example, see Sambrook et al., Molecular Cloning: A Laboratory Manual (Third ed., Cold Spring Harbor Laboratory Press, Cold Spring Harbor, N.Y. 2000). See also Ausubel et al., Current Protocols in Molecular Biology, Greene Publishing Associates (1992). The nomenclatures utilized in connection with, and the laboratory procedures and techniques described herein are those well-known and commonly used in the art.

Unless otherwise required by context herein, singular terms shall include pluralities and plural terms shall include the singular. Singular forms "a", "an" and "the", and singular use of any word, include plural referents unless expressly and unequivocally limited on one referent.

It is understood the use of the alternative term (e.g., "or") is taken to mean either one or both or any combination thereof of the alternatives.

The term "and/or" used herein is to be taken mean specific disclosure of each of the specified features or components with or without the other. For example, the term "and/or" as used in a phrase such as "A and/or B" herein is intended to include: "A and B"; "A or B"; "A" (A alone); and "B" (B alone). In a similar manner, the term "and/or" as used in a phrase such as "A, B, and/or C" is intended to encompass each of the following aspects: "A, B, and C"; "A, B, or C";

"A or C"; "A or B"; "B or C"; "A and B"; "B and C"; "A and C"; "A" (A alone); "B" (B alone); and "C" (C alone).

As used herein and in the appended claims, terms "comprising", "including", "having" and "containing", and their grammatical variants, as used herein are intended to be non-limiting so that one item or multiple items in a list do not exclude other items that can be substituted or added to the listed items. It is understood that wherever aspects are described herein with the language "comprising," otherwise analogous aspects described in terms of "consisting of" and/or "consisting essentially of" are also provided.

As used herein, the terms "about," "approximately," and "substantially" refer to a value or composition that is within an acceptable error range for the particular value or composition as determined by one of ordinary skill in the art, which will depend in part on how the value or composition is measured or determined, i.e., the limitations of the measurement system. For example, "about," "approximately," or "substantially" can mean within one or more than one standard deviation per the practice in the art. Alternatively, "about" or "approximately" can mean a range of up to 10% (i.e., ±10%) or more depending on the limitations of the measurement system. For example, about 5 mg can include any number between 4.5 mg and 5.5 mg. Furthermore, particularly with respect to biological systems or processes, the terms can mean up to an order of magnitude or up to 5-fold of a value. When particular values or compositions are provided in the instant disclosure, unless otherwise stated, the meaning of "about," "approximately," "substantially" should be assumed to be within an acceptable error range for that particular value or composition. Also, where ranges and/or subranges of values are provided, the ranges and/or subranges can include the endpoints of the ranges and/or subranges.

The term "polony" used herein refers to a nucleic acid library molecule can be clonally amplified in-solution or on-support to generate an amplicon that can serve as a template molecule for sequencing. In some aspects, a linear library molecule can be circularized to generate a circularized library molecule, and the circularized library molecule can be clonally amplified in-solution or on-support to generate a concatemer. In some aspects, the concatemer can serve as a nucleic acid template molecule which can be sequenced. The concatemer is sometimes referred to as a polony. In some aspects, a polony includes nucleotide strands.

The terms "peptide", "polypeptide" and "protein" and other related terms used herein are used interchangeably and refer to a polymer of amino acids and are not limited to any particular length. Polypeptides may comprise natural and non-natural amino acids. Polypeptides include recombinant or chemically-synthesized forms. Polypeptides also include precursor molecules that have not yet been subjected to post-translation modification such as proteolytic cleavage, cleavage due to ribosomal skipping, hydroxylation, methylation, lipidation, acetylation, SUMOylation, ubiquitination, glycosylation, phosphorylation and/or disulfide bond formation. These terms encompass native and artificial proteins, protein fragments and polypeptide analogs (such as muteins, variants, chimeric proteins and fusion proteins) of a protein sequence as well as post-translationally, or otherwise covalently or non-covalently, modified proteins.

The term "polymerase" and its variants, as used herein, comprises any enzyme that can catalyze polymerization of nucleotides (including analogs thereof) into a nucleic acid strand. Typically but not necessarily such nucleotide polymerization can occur in a template-dependent fashion. Typically, a polymerase comprises one or more active sites at which nucleotide binding and/or catalysis of nucleotide polymerization can occur. In some aspects, a polymerase includes other enzymatic activities, such as for example, 3' to 5' exonuclease activity or 5' to 3' exonuclease activity. In some aspects, a polymerase has strand displacing activity. A polymerase can include without limitation naturally occurring polymerases and any subunits and truncations thereof, mutant polymerases, variant polymerases, recombinant, fusion or otherwise engineered polymerases, chemically modified polymerases, synthetic molecules or assemblies, and any analogs, derivatives or fragments thereof that retain the ability to catalyze nucleotide polymerization (e.g., catalytically active fragment). In some aspects, a polymerase can be isolated from a cell, or generated using recombinant DNA technology or chemical synthesis methods. In some aspects, a polymerase can be expressed in prokaryote, eukaryote, viral, or phage organisms. In some aspects, a polymerase can be post-translationally modified proteins or fragments thereof. A polymerase can be derived from a prokaryote, eukaryote, virus or phage. A polymerase comprises DNA-directed DNA polymerase and RNA-directed DNA polymerase.

As used herein, the term "fidelity" refers to the accuracy of DNA polymerization by template-dependent DNA polymerase. The fidelity of a DNA polymerase is typically measured by the error rate (the frequency of incorporating an inaccurate nucleotide, i.e., a nucleotide that is not complementary to the template nucleotide). The accuracy or fidelity of DNA polymerization is maintained by both the polymerase activity and the 3'-5' exonuclease activity of a DNA polymerase.

As used herein, the term "binding complex" refers to a complex formed by binding together a nucleic acid duplex, a polymerase, and a free nucleotide or a nucleotide unit of a multivalent molecule, where the nucleic acid duplex comprises a nucleic acid template molecule hybridized to a nucleic acid primer. In the binding complex, the free nucleotide or nucleotide unit may or may not be bound to the 3' end of the nucleic acid primer at a position that is opposite a complementary nucleotide in the nucleic acid template molecule. A "ternary complex" is an example of a binding complex which is formed by binding together a nucleic acid duplex, a polymerase, and a free nucleotide or nucleotide unit of a multivalent molecule, where the free nucleotide or nucleotide unit is bound to the 3' end of the nucleic acid primer (as part of the nucleic acid duplex) at a position that is opposite a complementary nucleotide in the nucleic acid template molecule.

The term "persistence time" and related terms refers to the length of time that a binding complex remains stable without dissociation of any of the components, where the components of the binding complex include a nucleic acid template and nucleic acid primer, a polymerase, a nucleotide unit of a multivalent molecule or a free (e.g., unconjugated) nucleotide. The nucleotide unit or the free nucleotide can be complementary or non-complementary to a nucleotide residue in the template molecule. The nucleotide unit or the free nucleotide can bind to the 3' end of the nucleic acid primer at a position that is opposite a complementary nucleotide residue in the nucleic acid template molecule. The persistence time is indicative of the stability of the binding complex and strength of the binding interactions. Persistence time can be measured by observing the onset and/or duration of a binding complex, such as by observing a signal from a labeled component of the binding complex. For example, a labeled nucleotide or a labeled reagent comprising one or more nucleotides may be present in a binding complex, thus allowing the signal from the label to be detected during the persistence time of the binding complex. One exemplary label is a fluorescent label. The binding complex (e.g., ternary complex) remains stable until subjected to a condition that causes dissociation of interactions between any of the polymerase, template molecule, primer and/or the nucleotide unit or the nucleotide. For example, a dissociating condition comprises contacting the binding complex with any one or any combination of a detergent, EDTA and/or water.

The terms "nucleic acid", "polynucleotide" and "oligonucleotide" and other related terms used herein are used interchangeably and refer to polymers of nucleotides and are not limited to any particular length. Nucleic acids include recombinant and chemically-synthesized forms. Nucleic acids include DNA molecules (e.g., cDNA or genomic DNA), RNA molecules (e.g., mRNA), analogs of the DNA or RNA generated using nucleotide analogs (e.g., peptide nucleic acids and non-naturally occurring nucleotide analogs), and chimeric forms containing DNA and RNA. Nucleic acids can be single-stranded or double-stranded. Nucleic acids comprise polymers of nucleotides, where the nucleotides include natural or non-natural bases and/or sugars. Nucleic acids comprise naturally-occurring internucleosidic linkages, for example phosphodiester linkages. Nucleic acids comprise non-natural internucleoside linkages, including phosphorothioate, phosphorothiolate, or peptide nucleic acid (PNA) linkages. In some aspects, nucleic acids comprise a one type of polynucleotides or a mixture of two or more different types of polynucleotides.

The term "primer" and related terms used herein refers to an oligonucleotide, either natural or synthetic, that is capable of hybridizing with a DNA and/or RNA polynucleotide template to form a duplex molecule. Primers may have any length, but typically range from 4-50 nucleotides. A typical primer comprises a 5' end and 3' end. The 3' end of the primer can include a 3' OH moiety which serves as a nucleotide polymerization initiation site in a polymerase-mediated primer extension reaction. Alternatively, the 3' end of the primer can lack a 3' OH moiety, or can include a terminal 3' blocking group that inhibits nucleotide polymerization in a polymerase-mediated reaction. Any one nucleotide, or more than one nucleotide, along the length of the primer can be labeled with a detectable reporter moiety. A primer can be in solution (e.g., a soluble primer) or can be immobilized to a support (e.g., a capture primer).

The term "template nucleic acid", "template polynucleotide", "target nucleic acid" "target polynucleotide", "template strand" and other variations refer to a nucleic acid strand that serves as the basis nucleic acid molecule for generating a complementary nucleic acid strand. The template nucleic acid can be single-stranded or double-stranded, or the template nucleic acid can have single-stranded or double-stranded portions. The sequence of the template nucleic acid can be partially or wholly complementary to the sequence of the complementary strand. The template nucleic acid can be obtained from a naturally-occurring source, recombinant form, or chemically synthesized to include any type of nucleic acid analog. The template nucleic acid can be linear, circular, or other forms. The template nucleic acids can include an insert region having an insert sequence which is also known as a sequence of interest. The template nucleic acids can also include at least one adaptor sequence. The template nucleic acid can be a concatemer having two or tandem copies of a sequence of interest and at least one adaptor sequence. The insert region can be isolated in any form, including chromosomal, genomic, organellar (e.g., mitochondrial, chloroplast or ribosomal), recombinant molecules, cloned, amplified, cDNA, RNA such as precursor mRNA or mRNA, oligonucleotides, whole genomic DNA, obtained from fresh frozen paraffin embedded tissue, needle biopsies, cell free circulating DNA, or any type of nucleic acid library. The insert region can be isolated from any source including from organisms such as prokaryotes, eukaryotes (e.g., humans, plants and animals), fungus, viruses cells, tissues, normal or diseased cells or tissues, body fluids including blood, urine, serum, lymph, tumor, saliva, anal and vaginal secretions, amniotic samples, perspiration, semen, environmental samples, culture samples, or synthesized nucleic acid molecules prepared using recombinant molecular biology or chemical synthesis methods. The insert region can be isolated from any organ, including head, neck, brain, breast, ovary, cervix, colon, rectum, endometrium, gallbladder, intestines, bladder, prostate, testicles, liver, lung, kidney, esophagus, pancreas, thyroid, pituitary, thymus, skin, heart, larynx, or other organs. The template nucleic acid can be subjected to nucleic acid analysis, including sequencing and composition analysis.

When used in reference to nucleic acid molecules, the terms "hybridize" or "hybridizing" or "hybridization" or other related terms refers to hydrogen bonding between two different nucleic acids to form a duplex nucleic acid. Hybridization also includes hydrogen bonding between two different regions of a single nucleic acid molecule to form a self-hybridizing molecule having a duplex region. Hybridization can comprise Watson-Crick or Hoogstein binding to form a duplex double-stranded nucleic acid, or a double-stranded region within a nucleic acid molecule. The double-stranded nucleic acid, or the two different regions of a single nucleic acid, may be wholly complementary, or partially complementary.

Complementary nucleic acid strands need not hybridize with each other across their entire length. The complementary base pairing can be the standard A-T or C-G base pairing, or can be other forms of base-pairing interactions. Duplex nucleic acids can include mismatched base-paired nucleotides.

The term "nucleotides" and related terms refers to a molecule comprising an aromatic base, a five carbon sugar (e.g., ribose or deoxyribose), and at least one phosphate group. Canonical or non-canonical nucleotides are consistent with use of the term. The phosphate in some aspects comprises a monophosphate, diphosphate, or triphosphate, or corresponding phosphate analog. In some aspects, the nucleotide comprises 1, 2, 3, 4, 5, 6, 7, 8, 9 or 10 phosphate groups. The term "nucleoside" refers to a molecule comprising an aromatic base and a sugar.

Nucleotides (and nucleosides) typically comprise a hetero cyclic base including substituted or unsubstituted nitrogen-containing parent heteroaromatic ring which are commonly found in nucleic acids, including naturally-occurring, substituted, modified, or engineered variants, or analogs of the same. The base of a nucleotide (or nucleoside) is capable of forming Watson-Crick and/or Hoogstein hydrogen bonds with an appropriate complementary base. Exemplary bases include, but are not limited to, purines and pyrimidines such as: 2-aminopurine, 2,6-diaminopurine, adenine (A), etheno-adenine, N6-Δ2-isopentenyladenine (6iA), N6-Δ2-isopentenyl-2-methylthioadenine (2ms6iA), N6-methyladenine, guanine (G), isoguanine, N2-dimethylguanine (dmG), 7-methylguanine (7mG), 2-thiopyrimidine, 6-thioguanine (6sG), hypoxanthine and 06-methylguanine; 7-deaza-purines such as 7-deazaadenine (7-deaza-A) and 7-deazaguanine (7-deaza-G); pyrimidines such as cytosine (C), 5-propynylcytosine, isocytosine, thymine (T), 4-thiothymine (4sT), 5,6-dihydrothymine, O4-methylthymine, uracil (U), 4-thiouracil (4sU) and 5,6-dihydrouracil (dihydrouracil; D); indoles such as nitroindole and 4-methylindole; pyrroles such as nitropyrrole; nebularine; inosines; hydroxymethylcytosines; 5-methycytosines; base (Y); as well as methylated, glycosylated, and acylated base moieties; and the like. Additional exemplary bases can be found in Fasman, 1989, in "Practical Handbook of Biochemistry and Molecular Biology", pp. 385-394, CRC Press, Boca Raton, Fla.

Nucleotides (and nucleosides) typically comprise a sugar moiety, such as carbocyclic moiety (Ferraro and Gotor 2000 Chem. Rev. 100: 4319-48), acyclic moieties (Martinez, et al., 1999 Nucleic Acids Research 27: 1271-1274; Martinez, et al., 1997 Bioorganic & Medicinal Chemistry Letters vol. 7: 3013-3016), and other sugar moieties (Joeng, et al., 1993 J. Med. Chem. 36: 2627-2638; Kim, et al., 1993 J. Med. Chem. 36: 30-7; Eschenmosser 1999 Science 284:2118-2124; and U.S. Pat. No. 5,558,991). The sugar moiety comprises: ribosyl; 2'-deoxyribosyl; 3'-deoxyribosyl; 2',3'-dideoxyribosyl; 2',3'-didehydrodideoxyribosyl; 2'-alkoxyribosyl; 2'-azidoribosyl; 2'-aminoribosyl; 2'-fluororibosyl; 2'-mercaptoriboxyl; 2'-alkylthioribosyl; 3'-alkoxyribosyl; 3'-azidoribosyl; 3'-aminoribosyl; 3'-fluororibosyl; 3'-mercaptoriboxyl; 3'-alkylthioribosyl carbocyclic; acyclic or other modified sugars.

In some aspects, nucleotides comprise a chain of one, two or three phosphorus atoms where the chain is typically attached to the 5' carbon of the sugar moiety via an ester or phosphoramide linkage. In some aspects, the nucleotide is an analog having a phosphorus chain in which the phosphorus atoms are linked together with intervening O, S, NH, methylene or ethylene. In some aspects, the phosphorus atoms in the chain include substituted side groups including O, S or $BH_3$. In some aspects, the chain includes phosphate groups substituted with analogs including phosphoramidate, phosphorothioate, phosphordithioate, and O-methylphosphoroamidite groups.

When used in reference to nucleic acids, the terms "extend", "extending", "extension" and other variants, refers to incorporation of one or more nucleotides into a nucleic acid molecule. Nucleotide incorporation comprises polymerization of one or more nucleotides into the terminal 3' OH end of a nucleic acid strand, resulting in extension of the nucleic acid strand. Nucleotide incorporation can be conducted with natural nucleotides and/or nucleotide analogs. Typically, but not necessarily, nucleotide incorporation occurs in a template-dependent fashion. Any suitable method of extending a nucleic acid molecule may be used, including primer extension catalyzed by a DNA polymerase or RNA polymerase.

The term "reporter moiety", "reporter moieties" or related terms refers to a compound that generates, or causes to generate, a detectable signal. A reporter moiety is sometimes called a "label". Any suitable reporter moiety may be used, including luminescent, photoluminescent, electroluminescent, bioluminescent, chemiluminescent, fluorescent, phosphorescent, chromophore, radioisotope, electrochemical, mass spectrometry, Raman, hapten, affinity tag, atom, or an enzyme. A reporter moiety generates a detectable signal resulting from a chemical or physical change (e.g., heat, light, electrical, pH, salt concentration, enzymatic activity, or proximity events). A proximity event includes two reporter moieties approaching each other, or associating with each other, or binding each other. It is well known to one skilled in the art to select reporter moieties so that each absorbs excitation radiation and/or emits fluorescence at a wavelength distinguishable from the other reporter moieties to permit monitoring the presence of different reporter moieties in the same reaction or in different reactions. Two or more different reporter moieties can be selected having spectrally distinct emission profiles, or having minimal overlapping spectral emission profiles. Reporter moieties can be linked (e.g., operably linked) to nucleotides, nucleosides, nucleic acids, enzymes (e.g., polymerases or reverse transcriptases), or support (e.g., surfaces).

A reporter moiety (or label) comprises a fluorescent label or a fluorophore. Exemplary fluorescent moieties which may serve as fluorescent labels or fluorophores include, but are not limited to fluorescein and fluorescein derivatives such as carboxyfluorescein, tetrachlorofluorescein, hexachlorofluorescein, carboxynapthofluorescein, fluorescein isothiocyanate, NHS-fluorescein, iodoacetamidofluorescein, fluorescein maleimide, SAMSA-fluorescein, fluorescein thiosemicarbazide, carbohydrazinomethylthioacetyl-amino fluorescein, rhodamine and rhodamine derivatives such as TRITC, TMR, lissamine rhodamine, Texas Red, rhodamine B, rhodamine 6G, rhodamine 10, NHS-rhodamine, TMR-iodoacetamide, lissamine rhodamine B sulfonyl chloride, lissamine rhodamine B sulfonyl hydrazine, Texas Red sulfonyl chloride, Texas Red hydrazide, coumarin and coumarin derivatives such as AMCA, AMCA-NHS, AMCA-sulfo-NHS, AMCA-HPDP, DCIA, AMCE-hydrazide, BODIPY and derivatives such as BODIPY FL C3-SE, BODIPY 530/550 C3, BODIPY 530/550 C3-SE, BODIPY 530/550 C3 hydrazide, BODIPY 493/503 C3 hydrazide, BODIPY FL C3 hydrazide, BODIPY FL IA, BODIPY 530/551 IA, Br-BODIPY 493/503, Cascade Blue and derivatives such as Cascade Blue acetyl azide, Cascade Blue cadaverine, Cascade Blue ethylenediamine, Cascade Blue hydrazide, Lucifer Yellow and derivatives such as Lucifer Yellow iodoacetamide, Lucifer Yellow CH, cyanine and derivatives such as indolium based cyanine dyes, benzo-indolium based cyanine dyes, pyridium based cyanine dyes, thiozolium based cyanine dyes, quinolinium based cyanine dyes, imidazolium based cyanine dyes, Cy 3, Cy5, lanthanide chelates and derivatives such as BCPDA, TBP, TMT, BHHCT, BCOT, Europium chelates, Terbium chelates, Alexa Fluor dyes, DyLight dyes, Atto dyes, LightCycler Red dyes, CAL Flour dyes, JOE and derivatives thereof, Oregon Green dyes, WellRED dyes, IRD dyes, phycoerythrin and phycobilin dyes, Malachite green, stilbene, DEG dyes, NR dyes, near-infrared dyes and others known in the art such as those described in Haugland, Molecular Probes Handbook, (Eugene, Oreg.) 6th Edition; Lakowicz, Principles of Fluorescence Spectroscopy, 2nd Ed., Plenum Press New York (1999), or Hermanson, Bioconjugate Techniques, 2nd Edition, or derivatives thereof, or any combination thereof. Cyanine dyes may exist in either sulfonated or non-sulfonated forms, and consist of two indolenin, benzo-indolium, pyridium, thiozolium, and/or quinolinium groups separated by a polymethine bridge between two nitrogen atoms. Commercially available cyanine fluorophores include, for example, Cy3, (which may comprise 1-[6-(2,5-dioxopyrrolidin-1-yloxy)-6-oxohexyl]-2-(3-{1-[6-(2,5-dioxopyrrolidin-1-yloxy)-6-oxohexyl]-3,3-dimethyl-1,3-dihydro-2H-indol-2-ylidene}prop-1-en-1-yl)-3,3-dimethyl-3H-indolium or 1-[6-(2,5-dioxopyrrolidin-1-yloxy)-6-oxohexyl]-2-(3-{1-[6-(2,5-dioxopyrrolidin-1-yloxy)-6-oxohexyl]-3,3-dimethyl-5-sulfo-1,3-dihydro-2H-indol-2-ylidene}prop-1-en-1-yl)-3,3-dimethyl-3H-indolium-5-sulfonate), Cy5 (which may comprise 1-(6-((2,5-dioxopyrrolidin-1-yl)oxy)-6-oxohexyl)-2-((1E,3E)-5-((E)-

1-(6-((2,5-dioxopyrrolidin-1-yl)oxy)-6-oxohexyl)-3,3-dimethyl-5-indolin-2-ylidene)penta-1,3-dien-1-yl)-3,3-dimethyl-3H-indol-1-ium or 1-(6-((2,5-dioxopyrrolidin-1-yl)oxy)-6-oxohexyl)-2-((1E,3E)-5-((E)-1-(6-((2,5-dioxopyrrolidin-1-yl)oxy)-6-oxohexyl)-3,3-dimethyl-5-sulfoindolin-2-ylidene)penta-1,3-dien-1-yl)-3,3-dimethyl-3H-indol-1-ium-5-sulfonate), and Cy7 (which may comprise 1-(5-carboxypentyl)-2-[(1E,3E,5E,7Z)-7-(1-ethyl-1,3-dihydro-2H-indol-2-ylidene)hepta-1,3,5-trien-1-yl]-3H-indolium or 1-(5-carboxypentyl)-2-[(1E,3E,5E,7Z)-7-(1-ethyl-5-sulfo-1,3-dihydro-2H-indol-2-ylidene)hepta-1,3,5-trien-1-yl]-3H-indolium-5-sulfonate), where "Cy" stands for 'cyanine', and the first digit identifies the number of carbon atoms between two indolenine groups. Cy2 which is an oxazole derivative rather than indolenin, and the benzo-derivatized Cy3.5, Cy5.5 and Cy7.5 are exceptions to this rule.

In some aspects, the reporter moiety can be a FRET pair, such that multiple classifications can be performed under a single excitation and imaging step. As used herein, FRET may comprise excitation exchange (Forster) transfers, or electron-exchange (Dexter) transfers.

The terms "linked", "joined", "attached", and variants thereof comprise any type of fusion, bond, adherence or association between any combination of compounds or molecules that is of sufficient stability to withstand use in the particular procedure. The procedure can include but are not limited to: nucleotide transient-binding; nucleotide incorporation; de-blocking; washing; removing; flowing; detecting; imaging and/or identifying. Such linkage can comprise, for example, covalent, ionic, hydrogen, dipole-dipole, hydrophilic, hydrophobic, or affinity bonding, bonds or associations involving van der Waals forces, mechanical bonding, and the like. In some aspects, such linkage occurs intramolecularly, for example linking together the ends of a single-stranded or double-stranded linear nucleic acid molecule to form a circular molecule. In some aspects, such linkage can occur between a combination of different molecules, or between a molecule and a non-molecule, including but not limited to: linkage between a nucleic acid molecule and a solid surface; linkage between a protein and a detectable reporter moiety; linkage between a nucleotide and detectable reporter moiety; and the like. Some examples of linkages can be found, for example, in Hermanson, G., "Bioconjugate Techniques", Second Edition (2008); Aslam, M., Dent, A., "Bioconjugation: Protein Coupling Techniques for the Biomedical Sciences", London: Macmillan (1998); Aslam, M., Dent, A., "Bioconjugation: Protein Coupling Techniques for the Biomedical Sciences", London: Macmillan (1998).

The term "operably linked" and "operably joined" or related terms as used herein refers to juxtaposition of components. The juxtapositioned components can be linked together covalently. For example, two nucleic acid components can be enzymatically ligated together where the linkage that joins together the two components comprises phosphodiester linkage. A first and second nucleic acid component can be linked together, where the first nucleic acid component can confer a function on a second nucleic acid component. For example, linkage between a primer binding sequence and a sequence of interest forms a nucleic acid library molecule having a portion that can bind to a primer. In another example, a transgene (e.g., a nucleic acid encoding a polypeptide or a nucleic acid sequence of interest) can be ligated to a vector where the linkage permits expression or functioning of the transgene sequence contained in the vector. In some aspects, a transgene is operably linked to a host cell regulatory sequence (e.g., a promoter sequence) that affects expression of the transgene. In some aspects, the vector comprises at least one host cell regulatory sequence, including a promoter sequence, enhancer, transcription and/or translation initiation sequence, transcription and/or translation termination sequence, polypeptide secretion signal sequences, and the like. In some aspects, the host cell regulatory sequence controls expression of the level, timing and/or location of the transgene.

The term "adaptor" and related terms refers to oligonucleotides that can be operably linked (appended) to a target polynucleotide, where the adaptor confers a function to the co-joined adaptor-target molecule. Adaptors comprise DNA, RNA, chimeric DNA/RNA, or analogs thereof. Adaptors can include at least one ribonucleoside residue. Adaptors can be single-stranded, double-stranded, or have single-stranded and/or double-stranded portions. Adaptors can be configured to be linear, stem-looped, hairpin, or Y-shaped forms. Adaptors can be any length, including 4-100 nucleotides or longer. Adaptors can have blunt ends, overhang ends, or a combination of both. Overhang ends include 5' overhang and 3' overhang ends. The 5' end of a single-stranded adaptor, or one strand of a double-stranded adaptor, can have a 5' phosphate group or lack a 5' phosphate group. Adaptors can include a 5' tail that does not hybridize to a target polynucleotide (e.g., tailed adaptor), or adaptors can be non-tailed. An adaptor can include a sequence that is complementary to at least a portion of a primer, such as an amplification primer, a sequencing primer, or a capture primer (e.g., soluble or immobilized capture primers). Adaptors can include a random sequence or degenerate sequence. Adaptors can include at least one inosine residue. Adaptors can include at least one phosphorothioate, phosphorothiolate and/or phosphoramidate linkage. Adaptors can include a barcode sequence which can be used to distinguish polynucleotides (e.g., insert sequences) from different sample sources in a multiplex assay. Adaptors can include a unique identification sequence (e.g., unique molecular index, UMI; or a unique molecular tag) that can be used to uniquely identify a nucleic acid molecule to which the adaptor is appended. In some aspects, a unique identification sequence can be used to increase error correction and accuracy, reduce the rate of false-positive variant calls and/or increase sensitivity of variant detection. Adaptors can include at least one restriction enzyme recognition sequence, including any one or any combination of two or more selected from a group consisting of type I, type II, type III, type IV, type IIs or type IIB.

The term "universal sequence", "universal adaptor sequences" and related terms refers to a sequence in a nucleic acid molecule that is common among two or more polynucleotide molecules. For example, adaptors having the same universal sequence can be joined to a plurality of polynucleotides so that the population of co-joined molecules carry the same universal adaptor sequence. Examples of universal adaptor sequences include an amplification primer sequence, a sequencing primer sequence or a capture primer sequence (e.g., soluble or support-immobilized capture primers).

In some aspects, the support is solid, semi-solid, or a combination of both. In some aspects, the support is porous, semi-porous, non-porous, or any combination of porosity. In some aspects, the support can be substantially planar, concave, convex, or any combination thereof. In some aspects, the support can be cylindrical, for example comprising a capillary or interior surface of a capillary.

In some aspects, the surface of the support can be substantially smooth. In some aspects, the support can be regularly or irregularly textured, including bumps, etched, pores, three-dimensional scaffolds, or any combination thereof.

In some aspects, the support comprises a bead having any shape, including spherical, hemi-spherical, cylindrical, barrel-shaped, toroidal, disc-shaped, rod-like, conical, triangular, cubical, polygonal, tubular or wire-like.

The support can be fabricated from any material, including but not limited to glass, fused-silica, silicon, a polymer (e.g., polystyrene (PS), macroporous polystyrene (MPPS), polymethylmethacrylate (PMMA), polycarbonate (PC), polypropylene (PP), polyethylene (PE), high density polyethylene (HDPE), cyclic olefin polymers (COP), cyclic olefin copolymers (COC), polyethylene terephthalate (PET)), or any combination thereof. Various compositions of both glass and plastic substrates are contemplated.

In some aspects, the surface of the support is coated with one or more compounds to produce a passivated layer on the support. In some aspects, the support comprises a low non-specific binding surface that enable improved nucleic acid hybridization and amplification performance on the support. In general, the support may comprise one or more layers of a covalently or non-covalently attached low-binding, chemical modification layers, e.g., silane layers, polymer films, and one or more covalently or non-covalently attached oligonucleotides that may be used for immobilizing a plurality of nucleic acid template molecules to the support.

In some aspects, the degree of hydrophilicity (or "wettability" with aqueous solutions) of the surface coatings may be assessed, for example, through the measurement of water contact angles in which a small droplet of water is placed on the surface and its angle of contact with the surface is measured using, e.g., an optical tensiometer. In some aspects, a static contact angle may be determined. In some aspects, an advancing or receding contact angle may be determined. In some aspects, the water contact angle for the hydrophilic, low-binding support surfaced disclosed herein may range from about 0 degrees to about 30 degrees. In some aspects, the water contact angle for the hydrophilic, low-binding support surfaced disclosed herein may no more than 50 degrees, 40 degrees, 30 degrees, 25 degrees, 20 degrees, 18 degrees, 16 degrees, 14 degrees, 12 degrees, 10 degrees, 8 degrees, 6 degrees, 4 degrees, 2 degrees, or 1 degree. In many cases the contact angle is no more than 40 degrees. Those of skill in the art will realize that a given hydrophilic, low-binding support surface of the present disclosure may exhibit a water contact angle having a value of anywhere within this range.

The present disclosure provides a plurality (e.g., two or more) of nucleic acid templates immobilized to a support. In some aspects, the immobilized plurality of nucleic acid templates have the same sequence or have different sequences. In some aspects, individual nucleic acid template molecules in the plurality of nucleic acid templates are immobilized to a different site on the support. In some aspects, two or more individual nucleic acid template molecules in the plurality of nucleic acid templates are immobilized to a site on the support. In some aspects, the support comprises a plurality of sites arranged in an array. The term "array" refers to a support comprising a plurality of sites located at pre-determined locations on the support to form an array of sites. The sites can be discrete and separated by interstitial regions. In some aspects, the pre-determined sites on the support can be arranged in one dimension in a row or a column, or arranged in two dimensions in rows and columns. In some aspects, the plurality of pre-determined sites is arranged on the support in an organized fashion. In some aspects, the plurality of pre-determined sites is arranged in any organized pattern, including rectilinear, hexagonal patterns, grid patterns, patterns having reflective symmetry, patterns having rotational symmetry, or the like. The pitch between different pairs of sites can be that same or can vary. In some aspects, the support can have nucleic acid template molecules immobilized at a plurality of sites at a surface density of about 102-1015 sites per $mm^2$, or more, to form a nucleic acid template array. In some aspects, the support comprises at least 102 sites, at least 103 sites, at least 104 sites, at least 105 sites, at least 106 sites, at least 107 sites, at least 108 sites, at least 109 sites, at least 1010 sites, at least 1011 sites, at least 1012 sites, at least 1013 sites, at least 1014 sites, at least 1015 sites, or more, where the sites are located at pre-determined locations on the support. In some aspects, a plurality of pre-determined sites on the support (e.g., 102-1015 sites or more) are immobilized with nucleic acid templates to form a nucleic acid template array. In some aspects, the nucleic acid templates that are immobilized at a plurality of pre-determined sites by hybridization to immobilized surface capture primers, or the nucleic acid templates are covalently attached to the surface capture primers. In some aspects, the nucleic acid templates that are immobilized at a plurality of pre-determined sites, for example immobilized at 102-1015 sites or more. In some aspects, the nucleic acid templates that are immobilized at a plurality of sites on the support comprise linear or circular nucleic acid template molecules or a mixture of both linear and circular molecules. In some aspects, the immobilized nucleic acid templates are clonally-amplified to generate immobilized nucleic acid polonies at the plurality of pre-determined sites. In some aspects, individual immobilized nucleic acid template molecules comprise one copy of a target sequence of interest, or comprise concatemers having two or more tandem copies of a target sequence of interest.

In some aspects, a support comprising a plurality of sites located at random locations on the support is referred to herein as a support having randomly located sites thereon. The location of the randomly located sites on the support are not pre-determined. The plurality of randomly-located sites is arranged on the support in a disordered and/or unpredictable fashion. In some aspects, the support comprises at least 102 sites, at least 103 sites, at least 104 sites, at least 105 sites, at least 106 sites, at least 107 sites, at least 108 sites, at least 109 sites, at least 1010 sites, at least 1011 sites, at least 1012 sites, at least 1013 sites, at least 1014 sites, at least 1015 sites, or more, where the sites are randomly located on the support. In some aspects, a plurality of randomly located sites on the support (e.g., 102-1015 sites or more) are immobilized with nucleic acid templates to form a support immobilized with nucleic acid templates. In some aspects, the nucleic acid templates that are immobilized at a plurality of randomly located sites by hybridization to immobilized surface capture primers, or the nucleic acid templates are covalently attached to the surface capture primer. In some aspects, the nucleic acid templates that are immobilized at a plurality of randomly located sites, for example immobilized at 102-1015 sites or more. In some aspects, the nucleic acid templates that are immobilized at a plurality of sites on the support comprise linear or circular nucleic acid template molecules or a mixture of both linear and circular molecules. In some aspects, the immobilized nucleic acid templates are clonally-amplified to generate immobilized nucleic acid polonies at the plurality of randomly located sites. In some aspects, individual immobilized nucleic acid template molecules comprise one copy of a target sequence of interest, or comprise concatemers having two or more tandem copies of a target sequence of interest.

In some aspects, with respect to nucleic acid template molecules immobilized to pre-determined or random sites on the support, the plurality of immobilized nucleic acid template molecules on the support are in fluid communication with each other to permit flowing a solution of reagents (e.g., enzymes including polymerases, multivalent molecules, nucleotides, divalent cations and/or buffers and the like) onto the support so that the plurality of immobilized nucleic acid template molecules on the support can be reacted with the reagents in a massively parallel manner. In some aspects, the fluid communication of the plurality of immobilized nucleic acid template molecules can be used to conduct nucleotide binding assays and/or conduct nucleotide polymerization reactions (e.g., primer extension or sequencing) on the plurality of immobilized nucleic acid template molecules, and to conduct detection and imaging for massively parallel sequencing. In some aspects, the term "immobilized" and related terms refer to nucleic acid molecules or enzymes (e.g., polymerases) that are attached to the support at pre-determined or random locations, where the nucleic acid molecules or enzymes are attached directly to a support through covalent bond or non-covalent interaction, or the nucleic acid molecules or enzymes are attached to a coating on the support.

When used in reference to a low binding surface coating, one or more layers of a multi-layered surface coating may comprise a branched polymer or may be linear. Examples of suitable branched polymers include, but are not limited to, branched PEG, branched poly(vinyl alcohol) (branched PVA), branched poly(vinyl pyridine), branched poly(vinyl pyrrolidone) (branched PVP), branched), poly(acrylic acid) (branched PAA), branched polyacrylamide, branched poly (N-isopropylacrylamide) (branched PNIPAM), branched poly(methyl methacrylate) (branched PMA), branched poly (2-hydroxylethyl methacrylate) (branched PHEMA), branched poly(oligo(ethylene glycol) methyl ether methacrylate) (branched POEGMA), branched polyglutamic acid (branched PGA), branched poly-lysine, branched poly-glucoside, and dextran.

In some aspects, the branched polymers used to create one or more layers of any of the multi-layered surfaces disclosed herein may comprise at least 4 branches, at least 5 branches, at least 6 branches, at least 7 branches, at least 8 branches, at least 9 branches, at least 10 branches, at least 12 branches, at least 14 branches, at least 16 branches, at least 18 branches, at least 20 branches, at least 22 branches, at least 24 branches, at least 26 branches, at least 28 branches, at least 30 branches, at least 32 branches, at least 34 branches, at least 36 branches, at least 38 branches, or at least 40 branched.

Linear, branched, or multi-branched polymers used to create one or more layers of any of the multi-layered surfaces disclosed herein may have a molecular weight of at least 500, at least 1,000, at least 2,000, at least 3,000, at least 4,000, at least 5,000, at least 10,000, at least 15,000, at least 20,000, at least 25,000, at least 30,000, at least 35,000, at least 40,000, at least 45,000, or at least 50,000 daltons.

In some aspects, e.g., wherein at least one layer of a multi-layered surface comprises a branched polymer, the number of covalent bonds between a branched polymer molecule of the layer being deposited and molecules of the previous layer may range from about one covalent linkage per molecule and about 32 covalent linkages per molecule. In some aspects, the number of covalent bonds between a branched polymer molecule of the new layer and molecules of the previous layer may be at least 1, at least 2, at least 3, at least 4, at least 5, at least 6, at least 7, at least 8, at least 9, at least 10, at least 12, at least 14, at least 16, at least 18, at least 20, at least 22, at least 24, at least 26, at least 28, at least 30, or at least 32 covalent linkages per molecule.

Any reactive functional groups that remain following the coupling of a material layer to the surface may optionally be blocked by coupling a small, inert molecule using a high yield coupling chemistry. For example, in the case that amine coupling chemistry is used to attach a new material layer to the previous one, any residual amine groups may subsequently be acetylated or deactivated by coupling with a small amino acid such as glycine.

The number of layers of low non-specific binding material, e.g., a hydrophilic polymer material, deposited on the surface, may range from 1 to about 10. In some aspects, the number of layers is at least 1, at least 2, at least 3, at least 4, at least 5, at least 6, at least 7, at least 8, at least 9, or at least 10. In some aspects, the number of layers may be at most 10, at most 9, at most 8, at most 7, at most 6, at most 5, at most 4, at most 3, at most 2, or at most 1. Any of the lower and upper values described in this paragraph may be combined to form a range included within the present disclosure, for example, in some aspects the number of layers may range from about 2 to about 4. In some aspects, all of the layers may comprise the same material. In some aspects, each layer may comprise a different material. In some aspects, the plurality of layers may comprise a plurality of materials. In some aspects at least one layer may comprise a branched polymer. In some aspect, all of the layers may comprise a branched polymer.

One or more layers of low non-specific binding material may in some cases be deposited on and/or conjugated to the substrate surface using a polar protic solvent, a polar or polar aprotic solvent, a nonpolar solvent, or any combination thereof. In some aspects the solvent used for layer deposition and/or coupling may comprise an alcohol (e.g., methanol, ethanol, propanol, etc.), another organic solvent (e.g., acetonitrile, dimethyl sulfoxide (DMSO), dimethyl formamide (DMF), etc.), water, an aqueous buffer solution (e.g., phosphate buffer, phosphate buffered saline, 3-(N-morpholino)propanesulfonic acid (MOPS), etc.), or any combination thereof. In some aspects, an organic component of the solvent mixture used may comprise at least 1%, 5%, 10%, 15%, 20%, 25%, 30%, 35%, 40%, 45%, 50%, 55%, 60%, 70%, 75%, 80%, 85%, 90%, 95%, 98%, or 99% of the total, with the balance made up of water or an aqueous buffer solution. In some aspects, an aqueous component of the solvent mixture used may comprise at least 1%, 5%, 10%, 15%, 20%, 25%, 30%, 35%, 40%, 45%, 50%, 55%, 60%, 70%, 75%, 80%, 85%, 90%, 95%, 98%, or 99% of the total, with the balance made up of an organic solvent. The pH of the solvent mixture used may be less than 6, about 6, 6.5, 7, 7.5, 8, 8.5, 9, or greater than pH 9.

The term "branched polymer" and related terms refers to a polymer having a plurality of functional groups that help conjugate a biologically active molecule such as a nucleotide, and the functional group can be either on the side chain of the polymer or directly attaches to a central core or central backbone of the polymer. The branched polymer can have linear backbone with one or more functional groups coming off the backbone for conjugation. The branched polymer can also be a polymer having one or more sidechains, wherein the side chain has a site suitable for conjugation. Examples of the functional group include but are not limited to hydroxyl, ester, amine, carbonate, acetal, aldehyde, aldehyde hydrate, alkenyl, acrylate, methacrylate, acrylamide, active sulfone, hydrazide, thiol, alkanoic acid, acid halide, isocyanate, isothiocyanate, maleimide, vinylsulfone, dithiopyridine, vinylpyridine, iodoacetamide, epoxide, glyoxal, dione, mesylate, tosylate, and tresylate.

As used herein, the term "clonally amplified" and it variants refers to a nucleic acid template molecule that has been subjected to one or more amplification reactions either in-solution or on-support. In the case of in-solution amplified template molecules, the resulting amplicons are distributed onto the support. Prior to amplification, the template molecule comprises a sequence of interest and at least one universal adaptor sequence. In some aspects, clonal amplification comprises the use of a polymerase chain reaction (PCR), multiple displacement amplification (MDA), transcription-mediated amplification (TMA), nucleic acid sequence-based amplification (NASBA), strand displacement amplification (SDA), real-time SDA, bridge amplification, isothermal bridge amplification, rolling circle amplification (RCA), circle-to-circle amplification, helicase-dependent amplification, recombinase-dependent amplification, single-stranded binding (SSB) protein-dependent amplification, or any combination thereof.

As used herein, the term "sequencing" and its variants comprise obtaining sequence information from a nucleic acid strand, typically by determining the identity of at least some nucleotides (including their nucleobase components) within the nucleic acid template molecule. While in some aspects, "sequencing" a given region of a nucleic acid molecule includes identifying/reading each and every nucleotide within the region that is sequenced, in some aspects "sequencing" comprises methods whereby the identity of only some of the nucleotides in the region is determined, while the identity of some nucleotides remains undetermined or incorrectly determined. Any suitable method of sequencing may be used. In an exemplary aspect, sequencing can include label-free or ion based sequencing methods. In some aspects, sequencing can include labeled or dye-containing nucleotide or fluorescent based nucleotide sequencing methods. In some aspects, sequencing can include polony-based sequencing or bridge sequencing methods. In some aspects, sequencing includes massively parallel sequencing platforms that employ sequence-by-synthesis, sequence-by-hybridization or sequence-by-binding procedures. Examples of massively parallel sequence-by-synthesis procedures include polony sequencing, pyrosequencing (e.g., from 454 Life Sciences; U.S. Pat. Nos. 7,211,390, 7,244,559 and 7,264,929), chain-terminator sequencing (e.g., from Illumina; U.S. Pat. No. 7,566,537; Bentley 2006 Current Opinion Genetics and Development 16:545-552; and Bentley, et al., 2008 Nature 456:53-59, ion-sensitive sequencing (e.g., from Ion Torrent), probe-anchor ligation sequencing (e.g., Complete Genomics), DNA nanoball sequencing, nanopore DNA sequencing. Examples of single molecule sequencing include Heliscope single molecule sequencing, and single molecule real time (SMRT) sequencing from Pacific Biosciences (Levene, et al., 2003 Science 299(5607):682-686; Eid, et al., 2009 Science 323(5910): 133-138; U.S. Pat. Nos. 7,170,050; 7,302,146; and 7,405,281). An example of sequence-by-hybridization includes SOLiD sequencing (e.g., from Life Technologies; WO 2006/084132). An example of sequence-by-binding includes Omniome sequencing (e.g., U.S. Pat. No. 10,246,744).

It is to be appreciated that the Detailed Description section, and not any other section, is intended to be used to interpret the claims. Other sections may set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects may perform functional blocks, steps, operations, methods, etc. using orderings different from those described herein.

References herein to "one aspect," "an aspect," "an example aspect," "some aspects," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

While aspects of the present disclosure have been shown and described herein, it will be obvious to those skilled in the art that such aspects are provided by way of example only. The breadth and scope of this disclosure should not be limited by any of the above-described exemplary aspects, but should be defined only in accordance with the following claims and their equivalents. Numerous variations, changes, and substitutions will now occur to those skilled in the art without departing from the present disclosure. It should be understood that various alternatives to the aspects of the present disclosure described herein may be employed in practicing the present disclosure. It is intended that the following claims define the scope of the present disclosure and that methods and structures within the scope of these claims and their equivalents be covered thereby.

What is claimed is:

1. A method comprising:

providing a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence;

providing a second plurality of library molecules immobilized on the support, wherein each of the second plurality of library molecules comprise: a second insert sequence derived from a second sample source and a second sample index sequence, wherein the second sample index sequence comprises a second k-mer sequence and a second universal sample index sequence, the second universal sample index identifying the second sample source of the second insert sequence;

conducting, by a sequencing system, k cycles of sequencing reactions of the first and second k-mer sequences, thereby generating a first plurality of flow cell images;

determining, by a processor, for pixels of the first plurality of flow cell images, pixel intensities and a respective color purity of each of the pixel intensities; and determining, by the processor and before conducting one or more cycles of the sequencing reactions of the first or second insert sequence, a base calling template comprising base calling locations based on the pixel intensities and the respective color purity of the pixel intensities, wherein the base calling template is configured for registering a second plurality of flow cell images of the support in one or more cycles subsequent to the k cycles.

2. The method of claim 1, further comprising:
pooling the first and second plurality of library molecules; and
distributing the pooled library molecules onto the support and conducting an amplification reaction to generate a plurality of nucleic acid template molecules immobilized to the support, wherein the plurality of nucleic acid template molecules are clonally amplified from the first library molecules and the second library molecules.

3. The method of claim 1, wherein one or more of:
determining, by the processor, for the pixels of the first plurality of flow cell images, pixel intensities and the respective color purity of each of the pixel intensities; and
determining, by the processor, the base calling template comprising the base calling locations based on the pixel intensities and the respective color purity of the pixel intensities is before conducting any cycles of sequencing reactions of:
the first sample index sequence;
the first universal sample index sequence;
the second sample index sequence; and
the second universal sample index sequence.

4. The method of claim 1, wherein conducting the k cycles of sequencing reactions of the k-mer sequence and of a base position of the first universal sample index sequence is based on an order of sequencing of a sequencing run.

5. The method of claim 4, wherein the order of sequencing comprises:
sequencing the k-mer sequence; then
sequencing the first and second universal sample index sequences; and then
sequencing the first and second insert sequences.

6. The method of claim 1, wherein the first or second plurality of flow cell images are from 2, 3, or 4 different color channels.

7. The method of claim 1, wherein the first plurality of flow cell images from the k cycles comprises a balanced diversity of nucleotide bases of A, G, C and T/U among a plurality of nucleic acid template molecules immobilized on the support in each of the k cycles.

8. The method of claim 1, wherein the k-mer sequence comprises a random sequence of at least 2 or 3 nucleotide bases of A, G, C and T/U.

9. The method of claim 1, wherein the support is comprised in a flow cell device.

10. The method of claim 2, wherein a density of the nucleic acid template molecules on the support is $10^4$-$10^{12}$ per mm$^2$.

11. The method of claim 1, wherein conducting the k cycles of the sequencing reactions of the k-mer sequence comprises:
contacting polonies of nucleotide acid template molecules with a plurality of sequencing primers, a plurality of polymerases, and a mixture of different types of avidites, wherein each of the plurality of nucleic acid template molecules immobilized on the support corresponds to a polony.

12. The method of claim 1, wherein conducting k cycles of the sequencing reactions of the k-mer sequence comprises:
in each of the k cycles, acquiring, by an optical system, the first plurality of flow cell images comprising optical color signals emitted from nucleotide reagents that are bound to template molecules.

13. The method of claim 1, wherein k is an integer that is greater than 0 and less than 10.

14. The method of claim 2, wherein each of the base calling locations corresponds to a location of the plurality of immobilized template molecules.

15. The method of claim 1, wherein the second plurality of flow cell images comprises optical signals emitted from nucleotide reagents bound to an unbalanced diversity of nucleotide bases of A, G, C and T/U among a plurality of nucleic acid template molecules immobilized on the support in the one or more cycles subsequent to the k cycles.

16. The method of claim 15, wherein the unbalanced diversity of nucleotide bases of A, G, C and T/U among the plurality of nucleic acid template molecules comprises: a percentage of (1) a number of at least one type of nucleotide bases to (2) a total number of bases is less than 20%, 15%, 10%, or 5% in the one or more cycles.

17. The method of claim 1, further comprising:
registering, by the processor, the second plurality of flow cell images from the one or more subsequent flow cycles to the base calling template; and
performing, by the processor, base calling of the second plurality of flow cell images at the base calling locations in the base calling template using signals from the registered second plurality of flow cell images.

18. The method of claim 17, wherein registering the second plurality of flow cell images from the one or more subsequent flow cycles to the base calling template comprises:
generating coordinates of polonies in the second plurality of flow cell images in a common coordinate system as the base calling template.

19. A system comprising:
one or more hardware processors;
one or more data storage devices storing instructions executable by the one or more hardware processors that, when executed, cause the one or more hardware processors to perform operations, the operations comprising:
providing a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence;
providing a second plurality of library molecules immobilized on the support, wherein each of the second plurality of library molecules comprise: a second insert sequence derived from a second sample source and a second sample index sequence, wherein the second sample index sequence comprises a second k-mer sequence and a second universal sample index sequence, the second universal sample index identifying the second sample source of the second insert sequence;
conducting, by a sequencing system, k cycles of sequencing reactions of the first and second k-mer sequences, thereby generating a first plurality of flow cell images;

determining, by a processor, for pixels of the first plurality of flow cell images, pixel intensities and a respective color purity of each of the pixel intensities; and determining, by the processor and before conducting one or more cycles of the sequencing reactions of the first or second insert sequence, a base calling template comprising base calling locations based on the pixel intensities and the respective color purity of the pixel intensities, wherein the base calling template is configured for registering a second plurality of flow cell images of the support in one or more cycles subsequent to the k cycles.

20. One or more non-transitory computer storage media encoded with instructions executable by one or more hardware processors that, when executed, cause the one or more hardware processors to perform operations in sequencing data analysis, the operations comprising:

providing a first plurality of library molecules immobilized on a support, wherein each of the first plurality of library molecules comprise: a first insert sequence derived from a first sample source and a first sample index sequence, wherein the first sample index sequence comprises a first k-mer sequence and a first universal sample index sequence, the first universal sample index identifying the first sample source of the first insert sequence;

providing a second plurality of library molecules immobilized on the support, wherein each of the second plurality of library molecules comprise: a second insert sequence derived from a second sample source and a second sample index sequence, wherein the second sample index sequence comprises a second k-mer sequence and a second universal sample index sequence, the second universal sample index identifying the second sample source of the second insert sequence;

conducting, by a sequencing system, k cycles of sequencing reactions of the first and second k-mer sequences, thereby generating a first plurality of flow cell images;

determining, by a processor, for pixels of the first plurality of flow cell images, pixel intensities and a respective color purity of each of the pixel intensities; and determining, by the processor and before conducting one or more cycles of the sequencing reactions of the first or second insert sequence, a base calling template comprising base calling locations based on the pixel intensities and the respective color purity of the pixel intensities, wherein the base calling template is configured for registering a second plurality of flow cell images of the support in one or more cycles subsequent to the k cycles.

\* \* \* \* \*

SEQUENCE LISTING

```
Sequence total quantity: 7
SEQ ID NO: 1            moltype = AA  length = 12
FEATURE                 Location/Qualifiers
source                  1..12
                        mol_type = protein
                        organism = synthetic construct
SEQUENCE: 1
NNNGTAGGAG CC                                                                12

SEQ ID NO: 2            moltype = AA  length = 12
FEATURE                 Location/Qualifiers
source                  1..12
                        mol_type = protein
                        organism = synthetic construct
SEQUENCE: 2
NNNCCGCTGC TA                                                                12

SEQ ID NO: 3            moltype = AA  length = 12
FEATURE                 Location/Qualifiers
source                  1..12
                        mol_type = protein
                        organism = synthetic construct
SEQUENCE: 3
NNNAACAACA AG                                                                12

SEQ ID NO: 4            moltype = AA  length = 12
FEATURE                 Location/Qualifiers
source                  1..12
                        mol_type = protein
                        organism = synthetic construct
SEQUENCE: 4
NNNGGTGGTC TA                                                                12

SEQ ID NO: 5            moltype = AA  length = 12
FEATURE                 Location/Qualifiers
source                  1..12
                        mol_type = protein
                        organism = synthetic construct
SEQUENCE: 5
NNNTTGGCCA AC                                                                12

SEQ ID NO: 6            moltype = AA  length = 12
FEATURE                 Location/Qualifiers
source                  1..12
                        mol_type = protein
                        organism = synthetic construct
SEQUENCE: 6
NNNCAGGAGT GC                                                                12

SEQ ID NO: 7            moltype = AA  length = 12
FEATURE                 Location/Qualifiers
source                  1..12
                        mol_type = protein
                        organism = synthetic construct
SEQUENCE: 7
NNNATCACAC TA                                                                12
```